(12) United States Patent
Eklöf et al.

(10) Patent No.: US 12,557,000 B2
(45) Date of Patent: Feb. 17, 2026

(54) HANDLING OF COMPLETE MESSAGE AT CONDITION PSCELL ADDITION CHANGE

(71) Applicant: Telefonaktiebolaget LM Ericsson (publ), Stockholm (SE)

(72) Inventors: Cecilia Eklöf, Täby (SE); Icaro Leonardo Da Silva, Solna (SE)

(73) Assignee: TELEFONAKTIEBOLAGET LM ERICSSON, (Publ) Stockholm (SE)

( * ) Notice: Subject to any disclaimer, the term of this patent is extended or adjusted under 35 U.S.C. 154(b) by 378 days.

(21) Appl. No.: 18/029,981

(22) PCT Filed: Sep. 15, 2021

(86) PCT No.: PCT/EP2021/075356
§ 371 (c)(1),
(2) Date: Apr. 3, 2023

(87) PCT Pub. No.: WO2022/083947
PCT Pub. Date: Apr. 28, 2022

(65) Prior Publication Data
US 2023/0379776 A1 Nov. 23, 2023

Related U.S. Application Data

(60) Provisional application No. 63/104,474, filed on Oct. 22, 2020.

(51) Int. Cl.
*H04W 36/36* (2009.01)
*H04W 36/00* (2009.01)

(52) U.S. Cl.
CPC .... *H04W 36/362* (2023.05); *H04W 36/00692* (2023.05); *H04W 36/00838* (2023.05)

(58) Field of Classification Search
CPC .................. H04W 36/00837; H04W 36/362
See application file for complete search history.

(56) References Cited

U.S. PATENT DOCUMENTS

2022/0295318 A1\* 9/2022 Hwang ................ H04W 48/12

FOREIGN PATENT DOCUMENTS

| EP | 3920652 | \* | 8/2021 | ............ H04W 25/08 |
| EP | 3920652 A1 | | 12/2021 | |

(Continued)

OTHER PUBLICATIONS

International Search Report and Written Opinion of the International Searching Authority, PCT/EP2021/075356, mailed Feb. 2, 2022, 19 pages.

(Continued)

*Primary Examiner* — Myron Wyche
(74) *Attorney, Agent, or Firm* — Sage Patent Group

(57) ABSTRACT

A method of operating a master node includes determining to configure conditional PSCell addition or change (CPAC). A request is transmitted to a SN to prepare a conditional SN addition, a response therefrom confirms that a UE may be accepted unless a canceling message is later received. A RRC message is transmitted to the UE containing CPAC configurations for candidate target cell(s), where the RRC message contains condition(s) which the UE should monitor and message to be applied when condition fulfilled. Multiple MN or MCG related configurations are monitored for reception of messages from the UE. A message is received from the UE on one of the multiple MN or MCG related configurations monitored. The method detects which one of the multiple MN or MCG related configurations the UE has applied and responsively reconfigures the MN based on the detected one of the multiple MN or MCG related configurations.

18 Claims, 24 Drawing Sheets

(56) References Cited

FOREIGN PATENT DOCUMENTS

| WO | 2020128848 A1 | 6/2020 |
|---|---|---|
| WO | 2020155936 A1 | 8/2020 |

OTHER PUBLICATIONS

Ericsson, "CHO and MR-DC operation," 3GPP TSG-RAN WB2 #109e, R2-2003035, Electronic meeting, Apr. 20-30, 2020, 10 pages.
3GPP TS 38.331 v16.2.0 (Sep. 2020); 3rd Generation Partnership Project; Technical Specification Group Radio Access Network; NR; Radio Resource Control (RRC) protocol specification (Release 16); 921 pages.
3GPP TS 38.300 v16.3.0 (Sep. 2020); 3rd Generation Partnership Project; Technical Specification Group Radio Access Network; NR; NR and NG-RAN Overall Description; Stage 2 (Release 16); 148 pages.
3GPP TS 38.423 v16.3.0 (Sep. 2020); 3rd Generation Partnership Project; Technical Specification Group Radio Access Network; NG-RAN; Xn application protocol (XnAP) (Release 16); 451 pages.
3GPP TS 37.340 v16.3.0 (Sep. 2020); rd Generation Partnership Project; Technical Specification Group Radio Access Network; Evolved Universal Terrestrial Radio Access (E-UTRA) and NR; Multi-connectivity; Stage 2 (Release 16); 83 pages.
Taiwanese Office Action issued Jul. 18, 2022 for Taiwanese Patent Application No. 110137128, 47 pages (including English translation).
Intel Corporation, "Rel-17 Conditional PSCell Addition," 3GPP TSG-RAN WG2 Meeting #111-e, R2-2007237 Electronic Meeting, Aug. 17-28, 2020, 9 pages.
NEC, "Overview of conditional RSCell addition," 3GPP TSG-RAN WG2 #111e, R2-206976, Electronic meeting, Aug. 17-28, 2020, 87 pages.
Apple, "Discussion on conditional PSCell change and addition," 3GPP TSG-RAN WG2 Meeting #111-e, R2-2007089, Electronic, Aug. 17-28, 2020, 4 pages.

* cited by examiner

```
┌─────────────────────────────────────────────────────────┐
│ Receive a RRC message from a MN containing CPAC         │
│ configurations for one or multiple candidate target     │
│ cells  1900                                             │
└─────────────────────────────────────────────────────────┘
                            │
                            ▼
┌─────────────────────────────────────────────────────────┐
│ Transmit a heads-up indication to the MN on a last      │
│ applied configuration indicating that the at least one  │
│ condition has been fulfilled for reconfiguring          │
│ to a new configuration  1902                            │
└─────────────────────────────────────────────────────────┘
```

FIG. 19

```
┌─────────────────────────────────────────────────────────┐
│ Receive from the MN a confirmation that the heads-up    │
│ message has been received and that the UE may go-ahead  │
│ with reconfiguring to the new configuration  2000       │
└─────────────────────────────────────────────────────────┘
                            │
                            ▼
┌─────────────────────────────────────────────────────────┐
│ Transmit a message to the MN confirming that the        │
│ reconfiguring to the new configuration is completed     │
│ 2002                                                    │
└─────────────────────────────────────────────────────────┘
```

FIG. 20

```
┌─────────────────────────────────────────────────────────┐
│ Perform reconfiguration to the new configuration        │
│ responsive to receipt of the heads-up indication  2100  │
└─────────────────────────────────────────────────────────┘
```

FIG. 21

HANDLING OF COMPLETE MESSAGE AT CONDITION PSCELL ADDITION CHANGE

CROSS REFERENCE TO RELATED APPLICATIONS

This application is a 35 U.S.C. § 371 national stage application of PCT International Application No. PCT/EP2021/075356 filed on Sep. 15, 2021, which in turn claims domestic priority to U.S. Provisional Patent Application No. 63/104,474, filed on Oct. 22, 2020, the disclosures and content of which are incorporated by reference herein in their entirety.

TECHNICAL FIELD

The present disclosure relates generally to communications, and more particularly to communication methods and related devices and nodes supporting wireless communications.

BACKGROUND

Conditional Handover (CHO) Operations:

Two new work items for mobility enhancements in LTE and NR have started in 3GPP in release 16. The main objectives of the work items are to improve the robustness at handover and to decrease the interruption time at handover.

One problem related to robustness at handover is that the HO Command (RRCConnectionReconfiguration with mobilityControlInfo and RRCReconfiguration with a reconfigurationWithSync field) is normally sent when the radio conditions for the UE are already quite bad. That may lead to that the HO Command may not reach the UE in time if the message is segmented or there are retransmissions.

In LTE and NR, different solutions to increase mobility robustness have been discussed in the past. One solution discussed in NR is called "conditional handover" or "early handover command". In order to avoid the undesired dependence on the serving radio link upon the time (and radio conditions) where the UE should execute the handover, the possibility to provide RRC signaling for the handover to the UE earlier should be provided. To achieve this, it should be possible to associate the HO command with a condition e.g. based on radio conditions possibly similar to the ones associated to an A3 event, where a given neighbour becomes X db better than target. As soon as the condition is fulfilled, the UE executes the handover in accordance with the provided handover command.

Such a condition could e.g. be that the quality of the target cell or beam becomes X dB stronger than the serving cell. The threshold Y used in a preceding measurement reporting event should then be chosen lower than the one in the handover execution condition. This allows the serving cell to prepare the handover upon reception of an early measurement report and to provide the RRCConnectionReconfiguration with mobilityControlInfo at a time when the radio link between the source cell and the UE is still stable. The execution of the handover is done at a later point in time (and threshold) which is considered optimal for the handover execution.

FIG. 1 depicts an example with just a serving and a target cell. In practice there may often be many cells or beams that the UE reported as possible candidates based on its preceding RRM measurements. The network should then have the freedom to issue conditional handover commands for several of those candidates. The RRCConnectionReconfiguration for each of those candidates may differ e.g. in terms of the HO execution condition (RS to measure and threshold to exceed) as well as in terms of the RA preamble to be sent when a condition is met.

While the UE evaluates the condition, it should continue operating per its current RRC configuration, i.e., without applying the conditional HO command. When the UE determines that the condition is fulfilled, it disconnects from the serving cell, applies the conditional HO command and connects to the target cell. These steps are equivalent to the current, instantaneous handover execution.

Conditional handover is described in stage 2, TS 38.300 V16.3.0 (2020 Oct. 2) in chapter 9.2.3.4.

Conditional Handover:

A Conditional Handover (CHO) is defined as a handover that is executed by the UE when one or more handover execution conditions are met. The UE starts evaluating the execution condition(s) upon receiving the CHO configuration, and stops evaluating the execution condition(s) once the execution condition(s) is met.

The following principles apply to CHO:

The CHO configuration contains the configuration of CHO candidate cell(s) generated by the candidate gNB(s) and execution condition(s) generated by the source gNB.

An execution condition may consist of one or two trigger condition(s) (CHO events A3/A5, as defined in [12]). Only single RS type is supported and at most two different trigger quantities (e.g. RSRP and RSRQ, RSRP and SINR, etc.) can be configured simultaneously for the evaluation of CHO execution condition of a single candidate cell.

Before any CHO execution condition is satisfied, upon reception of HO command (without CHO configuration), the UE executes the HO procedure as described in clause 9.2.3.2, regardless of any previously received CHO configuration.

While executing CHO, i.e. from the time when the UE starts synchronization with target cell, UE does not monitor source cell.

CHO is not supported for NG-C based handover in this release of the specification.

C-Plane Handling:

As in intra-NR RAN handover, in intra-NR RAN CHO, the preparation and execution phase of the conditional handover procedure is performed without involvement of the 5GC; i.e. preparation messages are directly exchanged between gNBs. The release of the resources at the source gNB during the conditional handover completion phase is triggered by the target gNB. The figure below depicts the basic conditional handover scenario where neither the AMF nor the UPF changes. FIG. 2 illustrates Intra-AMF/UPF Conditional Handover (called FIG. 9.2.3.4.2-1 in specs).

The steps of FIG. 2 are explained below:

0/1. Same as step 0, 1 in FIG. 9.2.3.2.1-1 of section 9.2.3.2.1.

2. The source gNB decides to use CHO.

3. The source gNB issues a Handover Request message to one or more candidate gNBs.

4. Same as step 4 in FIG. 9.2.3.2.1-1 of section 9.2.3.2.1.

5. The candidate gNB sends HANDOVER REQUEST ACKNOWLEDGE message including configuration of CHO candidate cell to the source gNB.

6. The source gNB sends an RRCReconfiguration message to the UE, containing the configuration of CHO candidate cell(s) and CHO execution condition(s).

7. UE sends an RRCReconfigurationComplete message to the source gNB.

8. UE maintains connection with source gNB after receiving CHO configuration, and starts evaluating the CHO execution conditions for the candidate cell(s). If at least one CHO candidate cell satisfies the corresponding CHO execution condition, the UE detaches from the source gNB, applies the stored corresponding configuration for that selected candidate cell, synchronizes to that candidate cell and completes the RRC handover procedure by sending RRCReconfigurationComplete message to the target gNB. The UE releases stored CHO configurations after successful completion of RRC handover procedure.

Cancellation in Conditional Handover:

In 3GPP rel-16, the possibility for a candidate target node to cancel one or multiple candidate target cells already prepared for a CHO has been standardized. A new Conditional Handover Cancel procedure was added to 3GPP TS 38.423 V16.3.0 (2020 Oct. 2).

The Conditional Handover Cancel procedure is used to enable a target NG-RAN node to cancel an already prepared conditional handover.

The procedure uses UE-associated signalling.

Successful Operation:

FIG. 3 illustrates operations for conditional handover cancel, with successful operation. The target NG-RAN node initiates the procedure by sending the CONDITIONAL HANDOVER CANCEL message to the source NG-RAN node. The target NG-RAN node shall indicate the reason for cancelling the conditional handover by means of an appropriate cause value.

At the reception of the CONDITIONAL HANDOVER CANCEL message, the source NG-RAN node shall consider that the target NG-RAN node is about to remove any reference to, and release any resources previously reserved for candidate cells associated to the UE-associated signalling identified by the Source NG-RAN node UE XnAP ID IE and the Target NG-RAN node UE XnAP ID IE. If the Candidate Cells To Be Cancelled List IE is included in CONDITIONAL HANDOVER CANCEL message, the source NG-RAN node shall consider that only the resources reserved for the cells identified by the included NG-RAN CGI are about to be released.

Unsuccessful operation is not applicable.

Abnormal Conditions:

If the CONDITIONAL HANDOVER CANCEL message refers to a context that does not exist, the source NG-RAN node shall ignore the message.

If one or more candidate cells in the Candidate Cells To Be Cancelled List IE included in the CONDITIONAL HANDOVER CANCEL message were not prepared using the same UE-associated signaling connection, the source NG-RAN node shall ignore those non-associated candidate cells.

PSCell Addition:

The UE can be configured with Dual Connectivity, communicating both via an MCG (Master Cell Group) and an SCG (Secondary Cell Group). When the UE is configured with dual connectivity, the UE is configured with two MAC entities: one MAC entity for the MCG and one MAC entity for the SCG. In Multi-Radio Dual Connectivity (MR-DC) the cell groups are located in two different logical nodes, i.e. different NG-RAN nodes, possibly connected via a non-ideal backhaul, one providing NR access and the other one providing either E-UTRA or NR access. One node act as the MN (Master Node) and the other as the SN (Secondary Node). The MN and SN are connected via a network interface and at least the MN is connected to the core network. The operation in MR-DC involves different reconfiguration procedures, like secondary node addition, secondary node modification, secondary node release and secondary node change.

In the following, we show the signaling flow from TS 37.340 V16.3.0 (2020 Oct. 2) for the SN addition, leading to a PSCell Change addition.

SN Addition:

The Secondary Node (SN) Addition procedure is initiated by the MN and is used to establish a UE context at the SN in order to provide resources from the SN to the UE. For bearers requiring SCG radio resources, this procedure is used to add at least the initial SCG serving cell of the SCG. This procedure can also be used to configure an SN terminated MCG bearer (where no SCG configuration is needed).

FIG. 4 illustrates SN addition procedures. The steps of FIG. 4 are explained below.

Step 1. The MN decides to request the target SN to allocate resources for one or more specific PDU Sessions/ QoS Flows, indicating QoS Flows characteristics (QoS Flow Level QoS parameters, PDU session level TNL address information, and PDU session level Network Slice info). In addition, for bearers requiring SCG radio resources, MN indicates the requested SCG configuration information, including the entire UE capabilities and the UE capability coordination result. In this case, the MN also provides the latest measurement results for SN to choose and configure the SCG cell(s). The MN may request the SN to allocate radio resources for split SRB operation. In NGEN-DC and NR-DC, the MN always provides all the needed security information to the SN (even if no SN terminated bearers are setup) to enable SRB3 to be setup based on SN decision.

For MN terminated bearer options that require Xn-U resources between the MN and the SN, the MN provides Xn-U UL TNL address information. For SN terminated bearers, the MN provides a list of available DRB IDs. The S-NG-RAN node shall store this information and use it when establishing SN terminated bearers. The SN may reject the request.

For SN terminated bearer options that require Xn-U resources between the MN and the SN, the MN provides in step 1 a list of QoS flows per PDU Sessions for which SCG resources are requested to be setup upon which the SN decides how to map QoS flows to DRB.

NOTE 1: For split bearers, MCG and SCG resources may be requested of such an amount, that the QoS for the respective QoS Flow is guaranteed by the exact sum of resources provided by the MCG and the SCG together, or even more. For MN terminated split bearers, the MN decision is reflected in step 1 by the QoS Flow parameters signalled to the SN, which may differ from QoS Flow parameters received over NG.

NOTE 2: For a specific QoS flow, the MN may request the direct establishment of SCG and/or split bearers, i.e. without first having to establish MCG bearers. It is also allowed that all QoS flows can be mapped to SN terminated bearers, i.e. there is no QoS flow mapped to an MN terminated bearer.

Step 2. If the RRM entity in the SN is able to admit the resource request, it allocates respective radio resources and, dependent on the bearer type options, respective transport network resources. For bearers requiring SCG radio resources the SN triggers UE Random Access so that synchronization of the SN radio resource configuration can be performed. The SN decides for the PSCell and other SCG SCells and provides the new SCG radio resource configuration to the MN within an SN RRC configuration message contained in the SN Addition Request Acknowledge message. In case of bearer options that require Xn-U resources between the MN and the SN, the SN provides Xn-U TNL address information for the respective DRB, Xn-U UL TNL address information for SN terminated bearers, Xn-U DL TNL address information for MN terminated bearers. For SN terminated bearers, the SN provides the NG-U DL TNL address information for the respective PDU Session and security algorithm. If SCG radio resources have been requested, the SCG radio resource configuration is provided.

NOTE 3: In case of MN terminated bearers, transmission of user plane data may take place after step 2.

NOTE 4: In case of SN terminated bearers, data forwarding and the SN Status Transfer may take place after step 2.

NOTE 5: For MN terminated NR SCG bearers for which PDCP duplication with CA is configured the MN allocates 2 separate Xn-U bearers.

For SN terminated NR MCG bearers for which PDCP duplication with CA is configured the SN allocates 2 separate Xn-U bearers.

Step 2a. For SN terminated bearers using MCG resources, the MN provides Xn-U DL TNL address information in the Xn-U Address Indication message.

Step 3. The MN sends the MN RRC reconfiguration message to the UE including the SN RRC configuration message, without modifying it.

Step 4. The UE applies the new configuration and replies to MN with MN RRC reconfiguration complete message, including an SN RRC response message for SN, if needed. In case the UE is unable to comply with (part of) the configuration included in the MN RRC reconfiguration message, it performs the reconfiguration failure procedure.

Step 5. The MN informs the SN that the UE has completed the reconfiguration procedure successfully via SN Reconfiguration Complete message, including the SN RRC response message, if received from the UE.

Step 6. If configured with bearers requiring SCG radio resources, the UE performs synchronization towards the PSCell configured by the SN. The order the UE sends the MN RRC reconfiguration complete message and performs the Random Access procedure towards the SCG is not defined. The successful RA procedure towards the SCG is not required for a successful completion of the RRC Connection Reconfiguration procedure.

Step 7. If PDCP termination point is changed to the SN for bearers using RLC AM, and when RRC full configuration is not used, the MN sends the SN Status Transfer.

Step 8. For SN terminated bearers or QoS flows moved from the MN, dependent on the characteristics of the respective bearer or QoS flow, the MN may take actions to minimize service interruption due to activation of MR-DC (Data forwarding).

Steps 9-12. If applicable, the update of the UP path towards the 5GC is performed via a PDU Session Path Update procedure.

Conditional PSCell Change (CPC) Rel-16

A solution for Conditional PSCell Change (CPC) procedure was standardized in Rel-16. Therein a UE operating in Multi-Radio Dual Connectivity (MR-DC) receives in a conditional reconfiguration one or multiple RRC Reconfiguration(s) (e.g. an RRCReconfiguration message) containing an SCG configuration (e.g. an secondaryCellGroup of IE CellGroupConfig) with a reconfigurationWithSync that is stored and associated to an execution condition (e.g. a condition like an A3/A5 event configuration), so that one of the stored messages is only applied upon the fulfillment of the execution condition e.g. associated with the serving PSCell, upon which the UE would perform PSCell change (in case it find a neighbour cell that is better than the current SpCell of the SCG).

In rel-16 CPC will be supported, but in rel-17 also PSCell Addition will be included, i.e. Conditional PSCell Addition/Change (CPAC). In rel-16 only intra-SN CPC without MN involvement is standardized. Inter SN PSCell CPC and CPC with MN involvement will be included in rel-17.

The following are the agreements related to the procedure:

Agreements

0 We will prioritize work in SN-initiated PSCell change for conditional PSCell change.

1 Maintain Rel-15 principle that only one PScell is active at a time even with conditional PScell change.

2 For conditional PScell change, A3/A5 execution condition should be supported.

3 For conditional SN change, the source SN configuration can be used as the reference in generation of delta signalling for the candidate SNs.

4 Both the execution condition and the configuration for the candidate PSCell (as a container) can be included in the RRCReconfiguration message generated by the SN for intra-SN conditional PSCell change initiated by the SN (without MN involvement).

5 SRB1 can be used in all cases. SRB3 may be used to transmit conditional PScell change configuration to the UE for intra-SN change without MN involvement.

6 limit to intra-SN change without MN involvement (i.e. no MN reconfiguration or decision needed but SRB1 can be used) in Rel-16.

Same as for CHO, the following were agreed for CPC.

1. Usage of CPAC is decided by the network. The UE evaluates when the condition is valid.

2. Support configuration of one or more candidate cells for CPAC;

FFS how many candidate cells (UE and network impacts should be clarified). FFS whether the number of candidate cells for CPAC different from that of CHO.

3. Allow having multiple triggering conditions (using "and") for CPAC execution of a single candidate cell. Only single RS type per CPAC candidate is supported. At most two triggering quantities (e.g. RSRP and RSRQ, RSRP and SINR, etc.) can be configured simultaneously. FFS on UE capability 4. Define an execution condition for conditional PSCell change by the measurement identity which identifies a measurement configuration 5. Cell level quality is used as baseline for Conditional NR PSCell change execution condition;

g. Only single RS type (SSB or CSI-RS) per candidate PSCell is supported for PSCell change.

h. At most two triggering quantities (e.g. RSRP and RSRQ, RSRP and SINR, etc.) can be configured simultaneously. FFS on UE capability.

i. TTT is supported for CPAC execution condition (as per legacy configuration)

6. No additional optimizations with multi-beam operation are introduced to improve RACH performance for conditional PSCell change completion with multi-beam operation.

7. For FR1 and FR2, leave it up to UE implementation to select the candidate PSCell if more than one candidate cell meets the triggering condition. UE may consider beam information in this.

8. UE is not required to continue evaluating the triggering condition of other candidate PSCell(s) during conditional SN execution.

Agreements (RAN2#109e)
1) Similar to CHO, the following applies to CPC-intra-SN configuration
   Reuse the RRCReconfiguration/RRCConnectionReconfiguration procedure to signal CPC-intra-SN configuration to UE.
   The MN is not allowed to alter any content of the configuration from the SN which is carried in an RRC container.
   Multiple candidate PSCells can be sent in either one or multiple RRC messages.
   Use add/mod list+release list to configure multiple candidate PSCells.
   CPC-intra-SN execution condition and/or candidate PSCell configuration can be updated by the SN (i.e. by modifying the existing CPC-intra-SN configuration).
2) Once the CPC-intra-SN procedure is executed successfully, the UE releases all CPC-intra-SN configurations stored on the UE side.
3) Upon the successful completion of conventional PSCell change procedure, the UE releases all CPC-intra-SN configurations.
4) The SCG failure information procedure can be used for CPC-intra-SN procedure failure (due to RLF, T304-like timer expiry or compliance check failure).
5) FFS: In case of SRB3, the MN is not informed of CPC-intra-SN execution by the UE.
6) If SRB3 is not configured, the UE first informs the MN that the message has been received. Then the UE needs to provide the CPC complete message to the SN via the MN upon CPC execution.
7) CPC reuses the IE defined for CHO. The field name of the IE could be changed to reflect that the IE is used for both CHO and CPC.

S1_1: While executing CPC procedure, the UE continues to receive RRC reconfiguration from the MN. However, the UE should finalise the ongoing CPC execution before processing the RRC message received from the MN (same as in the conventional PSCell change). i.e. legacy behaviour and no specific UE requirement.

S1_2: As in legacy PSCell change, the UE sends RRCReconfigurationComplete to the MN at execution of CPC when no SRB3 is configured and the MN informs the SN. i.e the complete message to MN includes an embedded complete message to the SN.

S1_3: The UE sends RRCReconfigurationComplete to the MN at configuration of CPC when no SRB3 is configured and the MN informs the SN. i.e. the complete message to the MN includes an embedded complete message to the SN.

S1_4. Upon RLF on PCell during the execution of Conditional PSCell change for intra-SN change without MN involvement, the UE supports the Rel-16 MR-DC procedures, i.e. performs connection re-establishment procedure without any fast MCG link recovery.

S1_5: Support of CHO and CPC-intra-SN configuration simultaneously is not considered in Rel-16. Leave it up to the network solution to ensure there is no simultaneous CHO and CPC configuration.

S2_6: Reconfirm the use of SCG failure information upon declaring SCG failure in the procedure of the conditional PSCell change.

S2_7. When the conditional PSCell configuration received over SRB3 is invalid, UE initiates SCG failure information procedure to report to the MN about the SN change failure due to invalid configuration (legacy procedure).

S2_9. Like CHO, UE shall follow the below procedures for handling the T310 and T304 timers during conditional PSCell addition/change procedure for EN-DC, NGEN-DC, NR-DC cases:
   UE shall not stop MN T310 or SN T310 and shall not start T304 when it receives configuration of a CPC-intra-SN
   The timer T310 (SN only in case of SN Change) is stopped and timer T304-like is started when the UE begins execution of a CPC-intra-SN.

S3_11. UE checks the validity of conditional PSCell change execution criteria configuration immediately on receiving the conditional PSCell change RRC Reconfiguration message, either embedded in the MN RRC message over SRB1 or received over SRB3 (same as CHO).

S3_12. Introduce no specification changes regarding compliance checking of embedded Reconfiguration message containing configuration of conditional PSCell candidate (same as for CHO).

S2_8 UE performs connection re-establishment procedure or actions upon going to RRC_IDLE (legacy procedure) when the conditional PSCell configuration received over SRB1 is invalid, i.e. UE cannot comply with the embedded PSCell configuration for intra-SN Change.

Agreements (RAN2#109bis-e)
1 The UE does not inform the MN when CPC execution condition is fulfilled and the UE starts executing CPC, when CPC configuration is provided over SRB3.
2 A threshold parameter is not introduced to determine PCell quality for execution of CPC.
3 Upon transmission of SCG failure information to the network, the UE stops evaluating the CPC execution criteria according to the current CPC configuration until a response is received from the network.
4 Whether the UE continue measurements for candidate PSCells configured for execution condition upon CPC failure is left to the UE implementation.
5 The content of FailureReportSCG for CPC procedure failure should include failureType, measResultFreqList and measuResultSCG-Failure. These parameters are set according to the exiting SCGFailureInformation procedure. (same as legacy)
7 Use ULInformationTransferMRDC instead of RRCReconfigurationComplete message to inform the network of CPC execution when no SRB3 is configured and the MN informs the SN, i.e. ULInformationTransferMRDC message to MN includes an embedded RRCReconfigurationComplete message to the SN. This applies to both NR MN and LTE MN. (change of previous agreement).

Agreements
1 If CPC configuration is not released by network, the UE autonomously releases the stored CPC configuration upon the SCG release.
2 measID and reportConfig associated with CPC config, and measObject(s) only associated to CPC shall be autonomously removed by UE when SCG is released.

4 Support of CPC configuration (CPC condition+CPC reconfiguration) in legacy HO command or CPC configuration in CPC configuration should not be considered in Rel-16.

As described above, in rel-16 only the case intra-SN case without MN involvement for CPC is supported, i.e. where S-SN and T-SN are the same node in picture 10.5.1-2 from TS 37.340. That means that the cell is changed, but both the old and the new cell are in the same node.

In rel-17 the remaining scenarios are standardized. These are:
Conditional PSCell Addition (MN initiated)
MN initiated intra-SN Conditional PSCell Change
MN initiated inter-SN Conditional PSCell Change
SN-initiated inter-SN Conditional PSCell Change Potential problems that may arise with use of existing solutions are described below.

SUMMARY

Some embodiments of the present disclosure directed to a method of operating a master node (MN) in a wireless communication network. The method includes determining to configure conditional PSCell addition or change, CPAC. The method includes transmitting a request to a secondary node, SN, to prepare a conditional SN addition. The method receives from the SN a response to the conditional SN addition request confirming that a user equipment, UE, may be accepted unless a canceling message is later received. The method transmits a radio resource control, RRC, message to the UE containing CPAC configurations for one or multiple candidate target cells, wherein the RRC message contains at least one condition which the UE should monitor and message to be applied when the at least one condition is fulfilled. The method monitors multiple MN or master cell group, MCG, related configurations for reception of messages from the UE. The method receives a message from the UE on one of the multiple MN or MCG related configurations that have been monitored. The method detects which one of the multiple MN or MCG related configurations the UE has applied and responsively reconfigures the MN based on the detected one of the multiple MN or MCG related configurations.

Some other embodiments of the present disclosure directed to another method of operating a MN in a wireless communication network. The method determines to configure conditional PSCell addition or change, CPAC. The method transmits a request to a secondary node, SN, to prepare a conditional SN addition. The method receives from the SN a response to the conditional SN addition request confirming that a user equipment, UE, may be accepted unless a canceling message is later received. The method transmits a radio resource control, RRC, message to the UE containing CPAC configurations for one or multiple candidate target cells, wherein the RRC message contains at least one condition which the UE should monitor and message to be applied when the at least one condition is fulfilled. The method receives a heads-up indication from the UE on a last applied configuration indicating that the at least one condition has been fulfilled for reconfiguring to a new configuration.

Some other embodiments of the present disclosure directed to a method of operating a user equipment (UE) in a wireless communication network. The method includes receiving a radio resource control, RRC, message from a master node, MN, containing conditional PSCell addition or change, CPAC, configurations for one or multiple candidate target cells, wherein the RRC message contains at least one condition which the UE should monitor and message to be applied when the at least one condition is fulfilled. The method transmits a heads-up indication to the MN on a last applied configuration indicating that the at least one condition has been fulfilled for reconfiguring to a new configuration.

Some other embodiments of the present disclosure directed to another method of operating a MN in a wireless communication network. The method includes determining to configure conditional PSCell addition or change, CPAC. The method transmits a request to a secondary node, SN, to prepare a conditional SN addition. The method receives from the SN a response to the conditional SN addition request confirming that a user equipment, UE, may be accepted unless a canceling message is later received. The method transmits a radio resource control, RRC, message to the UE containing CPAC configurations for one or multiple candidate target cells, wherein the RRC message contains at least one condition which the UE should monitor and message to be applied when the at least one condition is fulfilled, and wherein the message to be applied includes a SN configuration. The method receives a RRC reconfiguration complete message from a target SN and responsively reconfiguring the MN to a new configuration based on the receipt of the RRC reconfiguration complete message.

Some other embodiments of the present disclosure directed to another method of operating a UE in a wireless communication network. The method includes receiving a radio resource control, RRC, message from a master node, MN, containing conditional PSCell addition or change, CPAC, configurations for one or multiple candidate target cells, wherein the RRC message contains at least one condition which the UE should monitor and message to be applied when the at least one condition is fulfilled, and wherein the message to be applied includes a SN configuration. The method transmits a RRC reconfiguration complete message to a target secondary node, SN, based on the at least one condition being fulfilled.

Some other embodiments of the present disclosure directed to another method of operating a MN in a wireless communication network. The method includes determining to configure conditional PSCell addition or change, CPAC. The method transmits a request to a secondary node, SN, to prepare a conditional SN addition. The method receives from the SN a response to the conditional SN addition request confirming that a user equipment, UE, may be accepted unless a canceling message is later received. The method transmits a radio resource control, RRC, message to the UE containing CPAC configurations for one or multiple candidate target cells, wherein the RRC message contains at least one condition which the UE should monitor and message to be applied when the at least one condition is fulfilled, and wherein the message to be applied includes a SN configuration. The method receives a RRC reconfiguration complete message from the UE on an old configuration and responsively reconfiguring the MN to a new configuration based on the receipt of the RRC reconfiguration complete message.

Some other embodiments of the present disclosure directed to another method of operating a UE in a wireless communication network. The method includes receiving a radio resource control, RRC, message from the network containing conditional PSCell addition or change, CPAC, configurations for one or multiple candidate target cells, wherein the RRC message contains at least one condition which the UE should monitor and message to be applied when the at least one condition is fulfilled, and wherein the message to be applied includes a SN configuration. The method transmits a RRC reconfiguration complete message to the network using an old configuration and then reconfiguring to a new configuration.

Some other embodiments of the present disclosure directed to a MN in a wireless communication network. The MN includes processing circuitry and memory coupled to the processing circuitry and having instructions stored therein that are executable by the processing circuitry to cause the master node to perform operations. The operations include determining to configure conditional PSCell addition or change, CPAC. The operations further include transmitting a request to a secondary node, SN, to prepare a conditional SN addition, and receiving from the SN a response to the conditional SN addition request confirming that a user equipment, UE, may be accepted unless a canceling message is later received. The operations further include transmitting a radio resource control, RRC, message to the UE containing CPAC configurations for one or multiple candidate target cells, wherein the RRC message contains at least one condition which the UE should monitor and message to be applied when the at least one condition is fulfilled. The operations further include monitoring multiple MN or master cell group, MCG, related configurations for reception of messages from the UE, and receiving a message from the UE on one of the multiple MN or MCG related configurations that have been monitored. The operations further include detecting which one of the multiple MN or MCG related configurations the UE has applied and responsively reconfiguring the MN based on the detected one of the multiple MN or MCG related configurations.

Some other embodiments of the present disclosure directed to a MN in a wireless communication network, where the master node is adapted to perform operations which include determining to configure conditional PSCell addition or change, CPAC. The operations further include transmitting a request to a secondary node, SN, to prepare a conditional SN addition. The operations further include receiving from the SN a response to the conditional SN addition request confirming that a user equipment, UE, may be accepted unless a canceling message is later received. The operations further include transmitting a radio resource control, RRC, message to the UE containing CPAC configurations for one or multiple candidate target cells, wherein the RRC message contains at least one condition which the UE should monitor and message to be applied when the at least one condition is fulfilled. The operations further include monitoring multiple MN or master cell group, MCG, related configurations for reception of messages from the UE, receiving a message from the UE on one of the multiple MN or MCG related configurations that have been monitored, and detecting which one of the multiple MN or MCG related configurations the UE has applied and responsively reconfiguring the MN based on the detected one of the multiple MN or MCG related configurations.

Some other embodiments of the present disclosure directed to a computer program product comprising a non-transitory storage medium including program code to be executed by processing circuitry of a MN operating in a wireless communication network, whereby execution of the program code causes the MN to perform operations which include determining to configure conditional PSCell addition or change, CPAC. The operations further include transmitting a request to a secondary node, SN, to prepare a conditional SN addition. The operations further include receiving from the SN a response to the conditional SN addition request confirming that a user equipment, UE, may be accepted unless a canceling message is later received. The operations further include transmitting a radio resource control, RRC, message to the UE containing CPAC configurations for one or multiple candidate target cells, wherein the RRC message contains at least one condition which the UE should monitor and message to be applied when the at least one condition is fulfilled. The operations further include monitoring multiple MN or master cell group, MCG, related configurations for reception of messages from the UE, receiving a message from the UE on one of the multiple MN or MCG related configurations that have been monitored, and detecting which one of the multiple MN or MCG related configurations the UE has applied and responsively reconfiguring the MN based on the detected one of the multiple MN or MCG related configurations.

Some other embodiments of the present disclosure directed to another MN in a wireless communication network, where the MN includes processing circuitry and memory coupled to the processing circuitry and having instructions stored therein that are executable by the processing circuitry to cause the master node to perform operations. The operations include determining to configure conditional PSCell addition or change, CPAC, and transmitting a request to a secondary node, SN, to prepare a conditional SN addition. The operations further include receiving from the SN a response to the conditional SN addition request confirming that a user equipment, UE, may be accepted unless a canceling message is later received. The operations further include transmitting a radio resource control, RRC, message to the UE containing CPAC configurations for one or multiple candidate target cells, wherein the RRC message contains at least one condition which the UE should monitor and message to be applied when the at least one condition is fulfilled. The operations further include receiving a heads-up indication from the UE on a last applied configuration indicating that the at least one condition has been fulfilled for reconfiguring to a new configuration.

Some other embodiments of the present disclosure directed to another MN in a wireless communication network. The MN is adapted to perform operations including determining to configure conditional PSCell addition or change, CPAC, and transmitting a request to a secondary node, SN, to prepare a conditional SN addition. The operations include receiving from the SN a response to the conditional SN addition request confirming that a user equipment, UE, may be accepted unless a canceling message is later received. The operations include transmitting a radio resource control, RRC, message to the UE containing CPAC configurations for one or multiple candidate target cells, wherein the RRC message contains at least one condition which the UE should monitor and message to be applied when the at least one condition is fulfilled. The operations include receiving a heads-up indication from the UE on a last applied configuration indicating that the at least one condition has been fulfilled for reconfiguring to a new configuration.

Some other embodiments of the present disclosure directed to another computer program product comprising a non-transitory storage medium including program code to be executed by processing circuitry of a MN operating in a wireless communication network, whereby execution of the program code causes the UE to perform operations that include determining to configure conditional PSCell addition or change, CPAC, and transmitting a request to a secondary node, SN, to prepare a conditional SN addition. The operations further include receiving from the SN a response to the conditional SN addition request confirming that a user equipment, UE, may be accepted unless a canceling message is later received. The operations further include transmitting a radio resource control, RRC, message to the UE containing CPAC configurations for one or multiple candidate target cells, wherein the RRC message contains at least one condition which the UE should monitor and message to be applied when the at least one condition is fulfilled. The operations further include receiving a heads-up indication from the UE on a last applied configuration indicating that the at least one condition has been fulfilled for reconfiguring to a new configuration.

Some other embodiments of the present disclosure directed to another UE in a wireless communication network. The UE includes processing circuitry and memory coupled to the processing circuitry and having instructions stored therein that are executable by the processing circuitry to cause the UE to perform operations. The operations include receiving a radio resource control, RRC, message from a master node, MN, containing conditional PSCell addition or change, CPAC, configurations for one or multiple candidate target cells, wherein the RRC message contains at least one condition which the UE should monitor and message to be applied when the at least one condition is fulfilled. The operations include transmitting a heads-up indication to the MN on a last applied configuration indicating that the at least one condition has been fulfilled for reconfiguring to a new configuration.

Some other embodiments of the present disclosure directed to another UE in a wireless communication network, where the UE is adapted to perform operations that include receiving a radio resource control, RRC, message from a master node, MN, containing conditional PSCell addition or change, CPAC, configurations for one or multiple candidate target cells, wherein the RRC message contains at least one condition which the UE should monitor and message to be applied when the at least one condition is fulfilled. The operations include transmitting a heads-up indication to the MN on a last applied configuration indicating that the at least one condition has been fulfilled for reconfiguring to a new configuration.

Some other embodiments of the present disclosure directed to another computer program product comprising a non-transitory storage medium including program code to be executed by processing circuitry of a UE operating in a wireless communication network, whereby execution of the program code causes the UE to perform operations. The operations include receiving a radio resource control, RRC, message from a MN containing conditional PSCell addition or change, CPAC, configurations for one or multiple candidate target cells, wherein the RRC message contains at least one condition which the UE should monitor and message to be applied when the at least one condition is fulfilled. The operations include transmitting a heads-up indication to the MN on a last applied configuration indicating that the at least one condition has been fulfilled for reconfiguring to a new configuration.

Some other embodiments of the present disclosure directed to another MN in a wireless communication network, where the MN includes processing circuitry and memory coupled to the processing circuitry and having instructions stored therein that are executable by the processing circuitry to cause the master node to perform operations which include determining to configure conditional PSCell addition or change, CPAC, and transmitting a request to a secondary node, SN, to prepare a conditional SN addition. The operations include receiving from the SN a response to the conditional SN addition request confirming that a user equipment, UE, may be accepted unless a canceling message is later received. The operations include transmitting a radio resource control, RRC, message to the UE containing CPAC configurations for one or multiple candidate target cells, wherein the RRC message contains at least one condition which the UE should monitor and message to be applied when the at least one condition is fulfilled, and wherein the message to be applied includes a SN configuration. The operations include receiving a RRC reconfiguration complete message from a target SN and responsively reconfiguring the MN to a new configuration based on the receipt of the RRC reconfiguration complete message.

Some other embodiments of the present disclosure directed to another MN in a wireless communication network, where the master node is adapted to perform operations that include determining to configure conditional PSCell addition or change, CPAC, and transmitting a request to a secondary node, SN, to prepare a conditional SN addition. The operations further include receiving from the SN a response to the conditional SN addition request confirming that a user equipment, UE, may be accepted unless a canceling message is later received. The operations include transmitting a radio resource control, RRC, message to the UE containing CPAC configurations for one or multiple candidate target cells, wherein the RRC message contains at least one condition which the UE should monitor and message to be applied when the at least one condition is fulfilled, and wherein the message to be applied includes a SN configuration. The operations include receiving a RRC reconfiguration complete message from a target SN and responsively reconfiguring the MN to a new configuration based on the receipt of the RRC reconfiguration complete message.

Some other embodiments of the present disclosure directed to another computer program product comprising a non-transitory storage medium including program code to be executed by processing circuitry of a MN operating in a wireless communication network, whereby execution of the program code causes the UE to perform operations that include determining to configure conditional PSCell addition or change, CPAC, and transmitting a request to a secondary node, SN, to prepare a conditional SN addition. The operations include receiving from the SN a response to the conditional SN addition request confirming that a user equipment, UE, may be accepted unless a canceling message is later received. The operations include transmitting a radio resource control, RRC, message to the UE containing CPAC configurations for one or multiple candidate target cells, wherein the RRC message contains at least one condition which the UE should monitor and message to be applied when the at least one condition is fulfilled, and wherein the message to be applied includes a SN configuration. The operations include receiving a RRC reconfiguration complete message from a target SN and responsively reconfiguring the MN to a new configuration based on the receipt of the RRC reconfiguration complete message.

Some other embodiments of the present disclosure directed to another UE in a wireless communication network, where the UE includes processing circuitry and memory coupled to the processing circuitry and having instructions stored therein that are executable by the processing circuitry to cause the UE to perform operations that include receiving a radio resource control, RRC, message from a master node, MN, containing conditional PSCell addition or change, CPAC, configurations for one or multiple candidate target cells, wherein the RRC message contains at least one condition which the UE should monitor and message to be applied when the at least one condition is fulfilled, and wherein the message to be applied includes a SN configuration. The operations include transmitting a RRC reconfiguration complete message to a target secondary node, SN, based on the at least one condition being fulfilled.

Some other embodiments of the present disclosure directed to another UE a wireless communication network, where the UE adapted to perform operations that include receiving a radio resource control, RRC, message from a MN containing conditional PSCell addition or change, CPAC, configurations for one or multiple candidate target cells, wherein the RRC message contains at least one condition which the UE should monitor and message to be applied when the at least one condition is fulfilled, and wherein the message to be applied includes a SN configuration. The operations include transmitting a RRC reconfiguration complete message to a target secondary node, SN, based on the at least one condition being fulfilled.

Some other embodiments of the present disclosure directed to another computer program product comprising a non-transitory storage medium including program code to be executed by processing circuitry of a UE operating in a wireless communication network, whereby execution of the program code causes the UE to perform operations. The operations include receiving a radio resource control, RRC, message from a master node, MN, containing conditional PSCell addition or change, CPAC, configurations for one or multiple candidate target cells, wherein the RRC message contains at least one condition which the UE should monitor and message to be applied when the at least one condition is fulfilled, and wherein the message to be applied includes a SN configuration. The operations include transmitting a RRC reconfiguration complete message to a target secondary node, SN, based on the at least one condition being fulfilled.

Some other embodiments of the present disclosure directed to another MN in a wireless communication network, where the MN includes processing circuitry and memory coupled to the processing circuitry and having instructions stored therein that are executable by the processing circuitry to cause the master node to perform operations. The operations include determining to configure conditional PSCell addition or change, CPAC, and transmitting a request to a secondary node, SN, to prepare a conditional SN addition. The operations include receiving from the SN a response to the conditional SN addition request confirming that a user equipment, UE, may be accepted unless a canceling message is later received. The operations include transmitting a radio resource control, RRC, message to the UE containing CPAC configurations for one or multiple candidate target cells, wherein the RRC message contains at least one condition which the UE should monitor and message to be applied when the at least one condition is fulfilled, and wherein the message to be applied includes a SN configuration. The operations include receiving a RRC reconfiguration complete message from the UE on an old configuration and responsively reconfiguring the MN to a new configuration based on the receipt of the RRC reconfiguration complete message.

Some other embodiments of the present disclosure directed to another MN in a wireless communication network, where the master node is adapted to perform operations that include determining to configure conditional PSCell addition or change, CPAC, and transmitting a request to a secondary node, SN, to prepare a conditional SN addition. The operations include receiving from the SN a response to the conditional SN addition request confirming that a user equipment, UE, may be accepted unless a canceling message is later received. The operations include transmitting a radio resource control, RRC, message to the UE containing CPAC configurations for one or multiple candidate target cells, wherein the RRC message contains at least one condition which the UE should monitor and message to be applied when the at least one condition is fulfilled, and wherein the message to be applied includes a SN configuration. The operations include receiving a RRC reconfiguration complete message from the UE on an old configuration and responsively reconfiguring the MN to a new configuration based on the receipt of the RRC reconfiguration complete message.

Some other embodiments of the present disclosure directed to another computer program product comprising a non-transitory storage medium including program code to be executed by processing circuitry of a master node operating in a wireless communication network, whereby execution of the program code causes the UE to perform operations. The operations include determining to configure conditional PSCell addition or change, CPAC, and transmitting a request to a secondary node, SN, to prepare a conditional SN addition. The operations include receiving from the SN a response to the conditional SN addition request confirming that a user equipment, UE, may be accepted unless a canceling message is later received, and transmitting a radio resource control, RRC, message to the UE containing CPAC configurations for one or multiple candidate target cells, wherein the RRC message contains at least one condition which the UE should monitor and message to be applied when the at least one condition is fulfilled, and wherein the message to be applied includes a SN configuration. The operations include receiving a RRC reconfiguration complete message from the UE on an old configuration and responsively reconfiguring the MN to a new configuration based on the receipt of the RRC reconfiguration complete message.

Some other embodiments of the present disclosure directed to another UE in a wireless communication network, where the UE includes processing circuitry and memory coupled to the processing circuitry and having instructions stored therein that are executable by the processing circuitry to cause the UE to perform operations. The operations include receiving a radio resource control, RRC, message from the network containing conditional PSCell addition or change, CPAC, configurations for one or multiple candidate target cells, wherein the RRC message contains at least one condition which the UE should monitor and message to be applied when the at least one condition is fulfilled, and wherein the message to be applied includes a SN configuration. The operations include transmitting a RRC reconfiguration complete message to the network using an old configuration and then reconfiguring to a new configuration.

Some other embodiments of the present disclosure directed to another UE in a wireless communication network, where the UE is adapted to perform operations that include receiving a radio resource control, RRC, message from the network containing conditional PSCell addition or change, CPAC, configurations for one or multiple candidate target cells, wherein the RRC message contains at least one condition which the UE should monitor and message to be applied when the at least one condition is fulfilled, and wherein the message to be applied includes a SN configuration. The operations include transmitting a RRC reconfiguration complete message to the network using an old configuration and then reconfiguring to a new configuration.

Some other embodiments of the present disclosure directed to another computer program product comprising a non-transitory storage medium including program code to be executed by processing circuitry of a UE operating in a wireless communication network, whereby execution of the program code causes the UE to perform operations. The operations include receiving a radio resource control, RRC, message from the network containing conditional PSCell addition or change, CPAC, configurations for one or multiple candidate target cells, wherein the RRC message contains at least one condition which the UE should monitor and message to be applied when the at least one condition is fulfilled, and wherein the message to be applied includes a SN configuration. The operations include transmitting a RRC reconfiguration complete message to the network using an old configuration and then reconfiguring to a new configuration.

Potential advantages that may be provided by one or more of the embodiments of the present disclosure can include that it possible for a Master Node (MN) to transmit to the UE, an MN reconfiguration at the same time as configuring a conditional reconfiguration for a Secondary Node (SN). This is an advantage as the new configuration that is applied in the SN when the condition(s) is fulfilled may also impact the MN configuration. Another potential advantage is that some of the network implementation for the legacy SN addition and SN change (PScell Addition and PScell change) can be used, namely the reception of messages from the UE only according to the UE latest configuration. And, only applying a new MN/MCG configuration (i.e. start monitoring messages from the UE according to the new configure MN/MCG configuration) when the heads up message is received. A cost of that is the additional signaling and specifications that needs to be defined for the heads up message.

It is noted that aspects described with respect to one embodiment may be incorporated in different embodiments although not specifically described relative thereto. That is, all embodiments and/or features of any embodiments can be combined in any way and/or combination. Moreover, other master nodes, UEs, computer program products, and corresponding methods according to embodiments will be or become apparent to one with skill in the art upon review of the following drawings and detailed description. It is intended that all such other master, UEs, computer program products, and corresponding methods be included within this description and protected by the accompanying claims.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 19-21 are flowcharts of methods of operating a UE in a wireless communication network in accordance with some embodiments;

DETAILED DESCRIPTION

Figure 1:
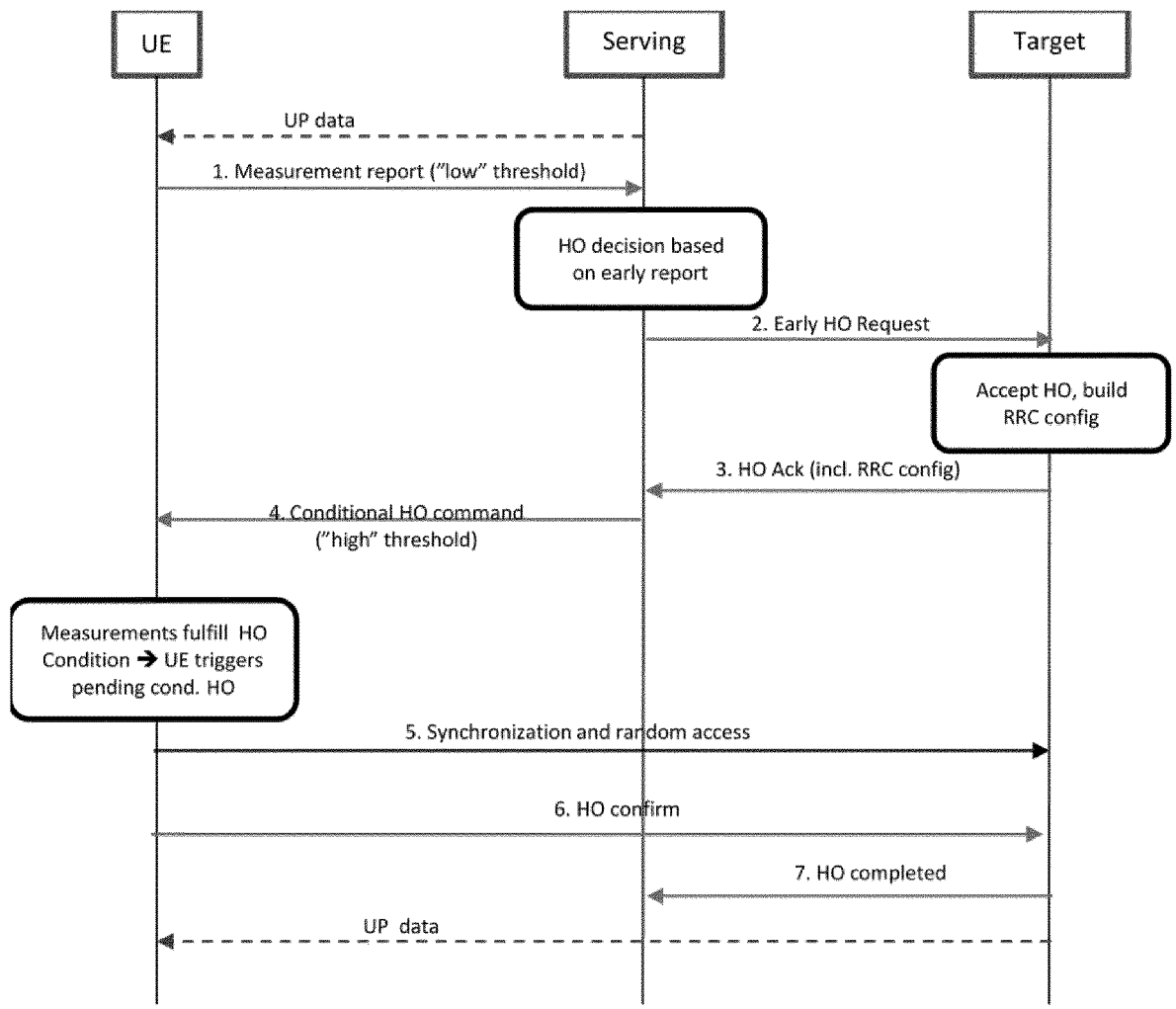
FIG. 1 depicts an example with just a serving and a target cell. In practice there may often be many cells or beams that the UE reported as possible candidates based on its preceding RRM measurements.
Figure 2:
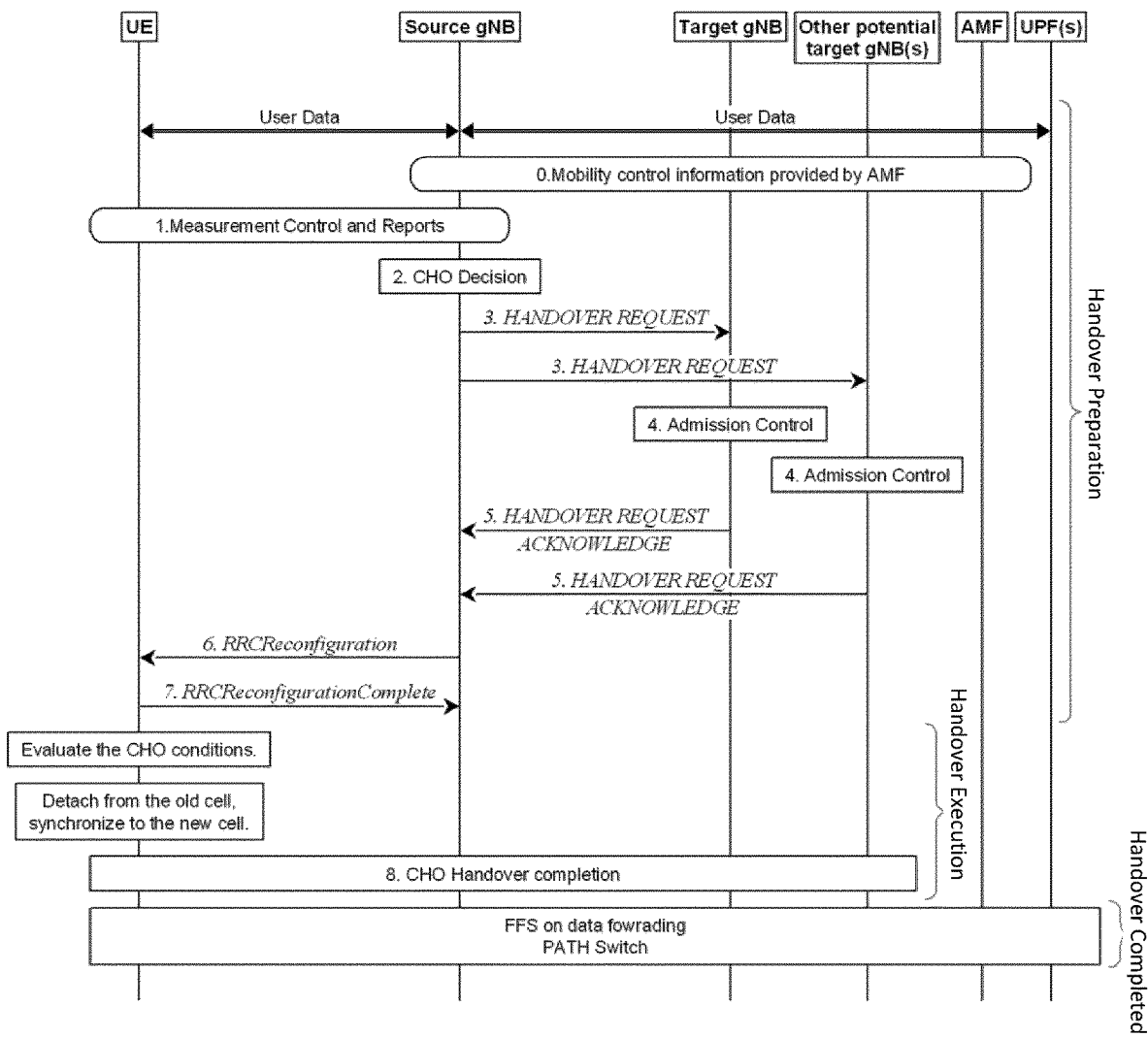
FIG. 2 illustrates Intra-AMF/UPF Conditional Handover.
Figure 3:
FIG. 3 illustrates operations for conditional handover cancel, with successful operation.
Figure 4:
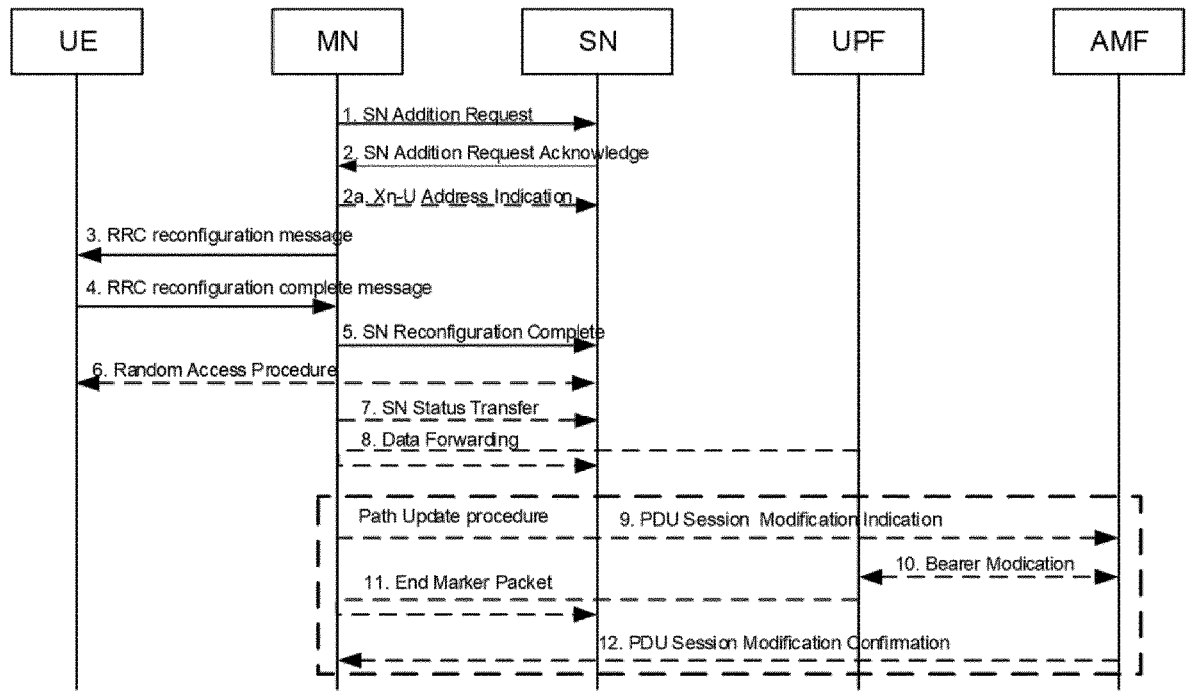
FIG. 4 illustrates SN addition procedures.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Potential problems that may arise with use of existing solutions are described below.

Problems can arise with new scenarios to be supported in Rel-17, namely which is when the UE is not operating in Multi-Radio Dual Connectivity (MR-DC), i.e. having a connection with only one node (e.g. an NG-RAN gNodeB), and is configured with one or multiple conditional PSCell (SN) Addition configurations (in RRC terms, these would be one or more conditional reconfiguration associated to one or more target candidate PSCell); or when the UE is operating in MR-DC and is configured with one or multiple conditional PSCell (SN) Change configurations (in RRC terms, these would be one or more conditional reconfiguration associated to one or more target candidate PSCell).

In legacy PSCell Addition, as described in above, the MN transmits an SN Addition Request and obtains from a target SN an SN Addition Request Ack with an SCG configuration in the container, containing an RRCReconfiguration with the reconfiguration with sync for the SCG. The MN then encapsulates that RRCReconfiguration (e.g. as an MR-DC related field, like nr-scg) within another RRCReconfiguration* message (in MN format) to be provided to the UE via the MN, that also contains MN/MCG related configurations. In other words, upon performing PSCell Addition the UE may also re-configure MN/MCG related configurations. For example, it might be a typical/possible scenario that the network wants to change the PDCP to an NR PDCP when configuring EN-DC i.e. when UE in LTE as MN receives an RRCConnectionReconfiguration* for adding NR as an SCG. Or, the MN/MCG related measConfig may need to be updated with new measurement gap configurations and/or the removal of events for SN Addition (like B1, A2, A4, etc.). Or, security keys need to be updated upon reception of that message e.g. if PDCP is relocated and/or bearers are re-configured. In legacy PSCell Addition, when the MN transmits that RRCReconfiguration* in MN format including the SCG RRC Reconfiguration (RRCReconfiguration**) the MN starts to monitor SRB1 receptions according to the new configuration that is expected to be applied by the UE. A similar scenario occurs in the legacy PSCell Change, i.e., the MN may want to re-configure some MN/MCG-related configurations upon a PSCell Change. One example may be an MN security key refresh upon SN PDCP change, upon PSCell change with SN change.

As in legacy PSCell Addition and PSCell Change, it is quite likely that the MN would like to make some kind of reconfiguration when an SN is added or changed e.g. if an SN is added, the MN would likely want to reconfigure bearers, so that the SN can handle parts of the traffic, e.g. MN bearers could be reconfigured to split bearers. As explained above, in existing solutions for SN addition or SN change (which leads to a PSCell Addition and PSCell change at the UE), the reconfiguration of the MN is done at the same time as adding or changing the SN, which is not problematic as shown above.

However, in Rel-17 when Conditional PSCell Addition (CPA) or inter-SN Conditional PSCell Change (CPC) is standardized, the SN is added or changed at a later point in time, not when the MN send the RRC message to the UE. That means that the MN cannot reconfigure itself when it sends the reconfiguration message to the UE. This causes problems as the MN cannot know when it should perform the reconfiguration. If the MN configuration is different depending on which SN that is added or changed to, the MN can also not know to which configuration it should reconfigure.

In CPA or CPC the configuration is not the problematic: the MN transmits the SN Addition Request to a target candidate (including an indication this is conditional, i.e., for CPA) and upon reception of the SCG RRC Reconfiguration (RRCReconfiguration**) the MN creates the message in MN format to be applied upon execution, including MN/MCG-related re-configuration i.e. RRCReconfiguration*, and includes the RRCReconfiguration** SCG RRC Reconfiguration within, as an SCG container. That RRCReconfiguration* is the message to be applied upon execution and associated with the execution condition configuration (one or two measIds) for the associated target candidate, the goes within the CPA or CPC configuration (i.e. the ConditionalReconfiguration IE) within the message the UE received when it was configuration for CPA or CPC.

Figure 5:
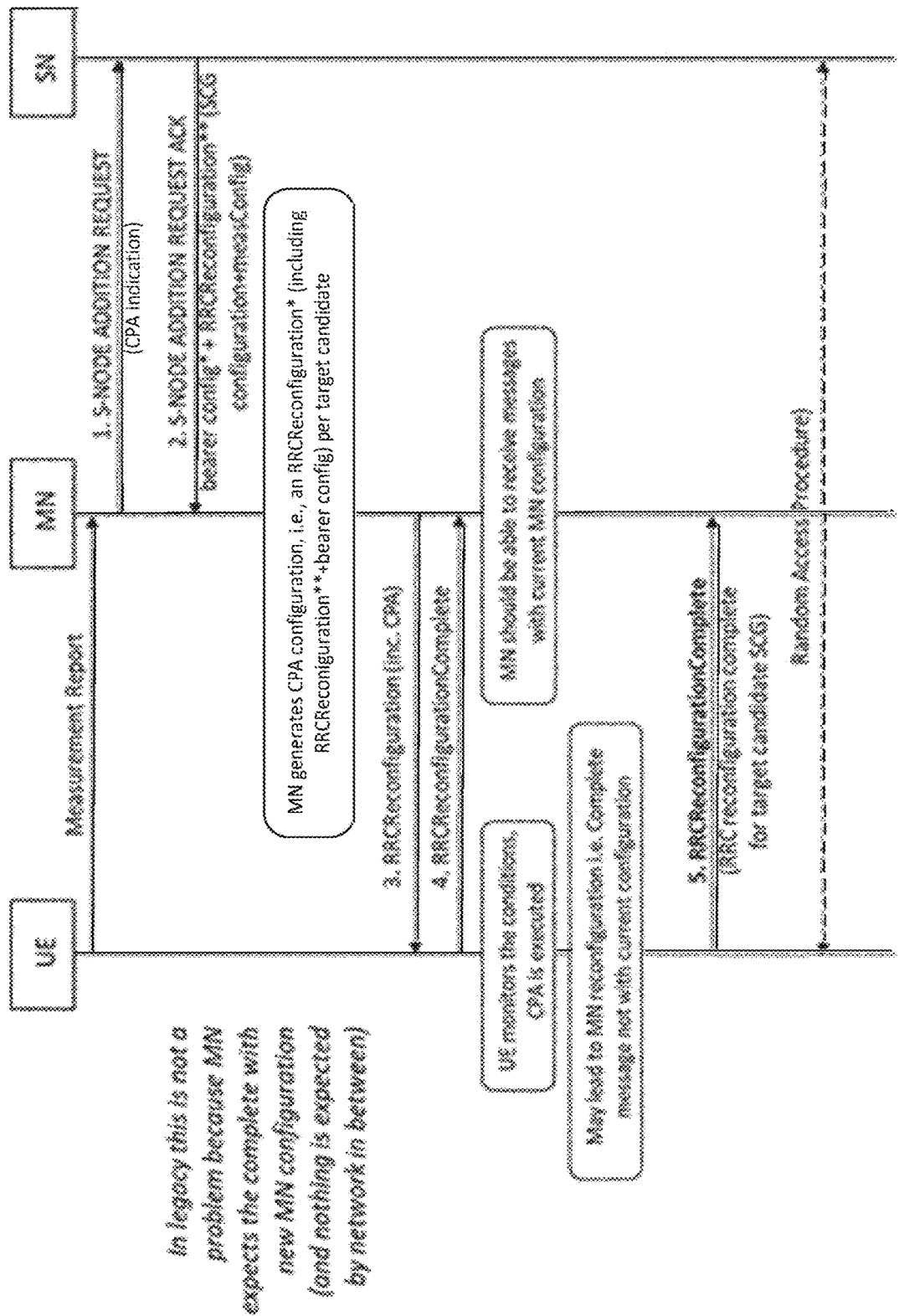
FIG. 5 illustrates a procedure in which a problem can arise during operation.

The problem occurs because while the UE monitors the possible fulfillment of execution conditions for CPA or CPC, the UE may need to send messages to the network e.g. assistance information, Measurement Reports, which would be sent according to the latest MN/MCG related configuration when the UE was configured with CPC or CPA, and not according to the new MN/MCG-related configuration in the RRCReconfiguration* that is to be applied upon execution only. However, one of these messages the UE sends may be an RRCReconfigurationComplete* which is transmitted by the UE to the MN when a condition for CPA or CPC is fulfilled. This problem is illustrated in FIG. 5, particularly, when the MN generates CPA configuration, i.e., an RRCReconfiguration*.

If that problem is not resolved, the network would not be able to receive the RRCReconfigurationComplete*. Hence, CPA and CPC execution do not work properly, and every CPA or CPC execution would lead to a failure, where the MN is not able to comprehend that CPA or CPA is being executed.

Or, if network monitors the new configuration, the network would not be able to receive any other message from the UE than an RRCReconfigurationComplete*. That may also lead to failures, as the message may be a measurement report with new candidates for a PSCell Change, while the current PSCell if close to a failure and conditions are not fulfilled for the currently configured candidates. Additionally, another issue exists if each RRCReconfiguration* differs from target candidate to target candidate, which might be possible a different target candidate SNs may have a different set of capabilities so that the MN/MCG related re-configuration to be applied upon CPA or CPC is different for different target candidates.

Overview of some proposed solutions addressing one or more of the above described problems.

Some embodiments of the present disclosure are directed to various solutions for how a network node, typically a Master Node (MN), can manage that a reconfiguration, including reconfiguration of the MN, requested to the UE is not executed when the reconfiguration message is sent, but at a later point in time, comprising methods on network nodes and on a wireless terminal (also called a User Equipment—UE) capable of operating in Multi-Radio Dual Connectivity (MR-DC) User Equipment (UE).

These embodiments include at least the configuration of conditional PSCell (SN) addition (CPA) and conditional PSCell (SN) change (CPC) including reconfiguration of the MN needed when the condition(s) for the CPAC are fulfilled.

Immediate MN Reconfiguration:

One possibility to solve the problem described above, in a network implementation manner, is that the MN reconfigures itself when it configures CPA or CPA. In other words, the MN determines an MN/MCG-related configuration to have in RRCReconfiguration* (to be applied by the UE upon execution) and monitors the reception from that UE (for re-configured bearers e.g. SRB1) according to that re-configuration.

In one option, the network includes these configurations already in the RRCReconfiguration message that contains the CPA or CPC configuration (i.e. the IE ConditionalReconfiguration). Hence, RRCReconfiguration* does not need to contain any MN/MCG related configurations (or anything that changes the way MN monitor messages from the UE).

In another option, the UE autonomously applies the MCG/MN-related parts of the RRCReconfiguration* within the CPA or CPC configuration.

MN Monitoring Multiple UE Configurations:

Some embodiments are directed to operations and method executed by a Master Node (MN), which include any one or more of the following:
 1. Determine to configure CPAC;
 2. Transmit a request to a Secondary Node (MN) to prepare a conditional SN addition (CPAC);
 3. Receive from the SN a response to the conditional SN addition request confirming that a UE may be accepted unless a canceling message is later received;
 4. Transmit an RRC message, e.g. RRCReconfiguration, to the UE containing a CPAC configuration for one or multiple candidate target cells (e.g. ConditionalReconfiguration IE). The RRC message contains the condition(s) which the UE should monitor and the message to be applied when the condition(s) are fulfilled;
 5. Monitor multiple MN/MCG related configurations for reception of messages from the UE; the current MN configuration, and the, possibly different, configurations that the UE will apply when one of the execution condition(s) are fulfilled and RRCReconfiguration* is applied;
 6. Receive a message from the UE, e.g. an RRCReconfigurationComplete message on one of the multiple configurations that have been monitored e.g. first or second.
 7. Detect which of the configurations that the UE has applied and reconfigure itself to that configuration. In one alternative solution, receiving an indication from the UE, which of the configurations that the UE has applied. The indication could comprise the conditional reconfiguration ID or the target cell.

Restriction of MN Configurations:

Some other embodiments are directed to operations and method executed by a Master Node (MN), which include any one or more of the following:
 1. Determine to configure CPAC;
 2. Transmit a request to a Secondary Node (MN) to prepare a conditional SN addition (CPAC);
 3. Receive from the SN a response to the conditional SN addition request confirming that a UE may be accepted unless a canceling message is later received;
 4. Transmit an RRC message, e.g. RRCReconfiguration, to the UE containing a CPAC configuration for one or multiple candidate target cells. The RRC message contains the condition(s) which the UE should monitor and the message to be applied when the condition(s) are fulfilled; The message to be applied includes a reconfiguration of the current MN/MCG configuration and the SN configuration; The possible MN reconfigurations are restricted, so that the MN can understand messages from the UE received both on the old and the new configuration.
 5. Receive a message from the UE, e.g. an RRCReconfigurationComplete message on one of the configurations that have been monitored;
 6. Detect which of the configurations that the UE has applied and reconfigure itself to that configuration.

Transmission of Heads-Up Message from the UE:

Some other embodiments are directed to operations and method executed by a Master Node (MN), which include any one or more of the following:
 1. Determine to configure CPAC;
 2. Transmit a request to a Secondary Node (MN) to prepare a conditional SN addition (CPA);
 3. Receive from the SN a response to the conditional SN addition request confirming that a UE may be accepted unless a canceling message is later received;
 4. Transmit an RRC message, e.g. RRCReconfiguration, to the UE containing CPA configurations for one or multiple candidate target cells. The RRC message contains the condition(s) which the UE should monitor and the message to be applied when the condition(s) are fulfilled; The message to be applied includes the SN configuration and it may contain reconfiguration of the current MN configuration;
 5. Receive a heads-up indication from the UE on the old configuration, that the condition(s) have been fulfilled and that it is time to reconfigure to the new configuration;
 6. Transmit, to the UE, a confirmation that the heads-up message has been received and that the UE may go-ahead with the reconfiguration;
 7. Receive a message from the UE, e.g. an RRCReconfigurationComplete message, confirming that the reconfiguration to the new configuration is completed;
 8. In an alternative solution, receive a heads-up indication from the UE, e.g. an RRCReconfigurationComplete message on the old configuration, performing the reconfiguration to the new MN configuration, while the UE is doing the same reconfiguration after having waited a certain period of time.

Transmission of Complete Message Via Target SN:

Some other embodiments are directed to operations and method executed by a Master Node (MN), which include any one or more of the following:
1. Determine to configure CPA;
2. Transmit a request to a Secondary Node (MN) to prepare a conditional SN addition (CPA);
3. Receive from the SN a response to the conditional SN addition request confirming that a UE may be accepted unless a canceling message is later received;
4. Transmit an RRC message, e.g. RRCReconfiguration, to the UE containing CPAC configurations for one or multiple candidate target cells. The RRC message contains the condition(s) which the UE should monitor and the message to be applied when the condition(s) are fulfilled; The message to be applied includes the SN configuration and it may contain reconfiguration of the current MN configuration;
5. Receive an RRCReconfigurationComplete message from a target SN and reconfiguring to the new configuration upon reception of the message.

Transmission of Complete Message on Old Configuration:

Some other embodiments are directed to operations and method executed by a Master Node (MN), which include any one or more of the following:

The invention comprises a method executed by a Master Node (MN) the method comprising:
1. Determine to configure CPAC;
2. Transmit a request to a Secondary Node (MN) to prepare a conditional SN addition (CPA);
3. Receive from the SN a response to the conditional SN addition request confirming that a UE may be accepted unless a canceling message is later received;
4. Transmit an RRC message, e.g. RRCReconfiguration, to the UE containing CPAC configurations for one or multiple candidate target cells. The RRC message contains the condition(s) which the UE should monitor and the message to be applied when the condition(s) are fulfilled; The message to be applied includes the SN configuration and it may contain reconfiguration of the current MN configuration;
5. Receive an RRCReconfigurationComplete message from the UE on the old configuration. Reconfiguring to the new configuration upon reception of the RRCReconfigurationComplete.

Transmission of Complete Message on Old Configuration with an Embedded Complete Message on New Configuration:

Some other embodiments are directed to operations and method executed by a Master Node (MN), which include any one or more of the following:
1. Determine to configure CPAC;
2. Transmitting a request to a Secondary Node (MN) to prepare a conditional SN addition (CPA);
3. Receiving from the SN a response to the conditional SN addition request confirming that a UE may be accepted unless a canceling message is later received;
4. Transmitting an RRC message, e.g. RRCReconfiguration, to the UE containing CPAC configurations for one or multiple candidate target cells. The RRC message contains the condition(s) which the UE should monitor and the message to be applied when the condition(s) are fulfilled; The message to be applied includes the SN configuration and it may contain reconfiguration of the current MN configuration;
5. Receiving an RRCReconfigurationComplete message from the UE on the old configuration with an embedded RRCReconfigurationComplete on the new configuration. Reconfiguring to the new configuration upon reception of the RRCReconfigurationComplete.

Potential advantages that may be provided by one or more of these or other embodiments of the present disclose can include that it possible for a Master Node (MN) to transmit to the UE, an MN reconfiguration at the same time as configuring a conditional reconfiguration for a Secondary Node (SN). This is an advantage as the new configuration that is applied in the SN when the condition(s) is fulfilled may also impact the MN configuration.

Example wireless device, radio access network (RAN) node, and core network (CN) node are now described which may be part of a communications system that is configured to operate in accordance with one or more embodiments of the present disclosure. The various embodiments are then described in further detail below.

Figure 6:
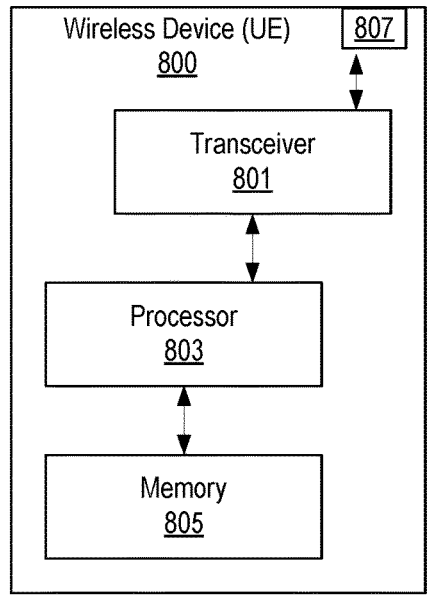
FIG. 6 is a block diagram illustrating a wireless device ("UE") according to some embodiments of inventive concepts.

FIG. 6 is a block diagram illustrating elements of a wireless device 800 (also referred to as a mobile terminal, a mobile communication terminal, a wireless communication device, a wireless terminal, mobile device, a wireless communication terminal, a user equipment ("UE"), a user equipment node/terminal/device, etc.) configured to provide wireless communication according to embodiments of inventive concepts. (Wireless device 800 may be provided, for example, as discussed below with respect to wireless device 4110 of FIG. 26.) As shown, wireless device UE may include an antenna 807 (e.g., corresponding to antenna 4111 of FIG. 26), and transceiver circuitry 801 (also referred to as a transceiver, e.g., corresponding to interface 4114 of FIG. 26) including a transmitter and a receiver configured to provide uplink and downlink radio communications with a base station(s) (e.g., corresponding to network node 4160 of FIG. 26, also referred to as a RAN node) of a radio access network. Wireless device UE may also include processing circuitry 803 (also referred to as a processor, e.g., corresponding to processing circuitry 4120 of FIG. 26) coupled to the transceiver circuitry, and memory circuitry 805 (also referred to as memory, e.g., corresponding to device readable medium 4130 of FIG. 26) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that separate memory circuitry is not required. Wireless device UE may also include an interface (such as a user interface) coupled with processing circuitry 803, and/or wireless device UE may be incorporated in a vehicle.

As discussed herein, operations of wireless device UE may be performed by processing circuitry 803 and/or transceiver circuitry 801. For example, processing circuitry 803 may control transceiver circuitry 801 to transmit communications through transceiver circuitry 801 over a radio interface to a radio access network node (also referred to as a base station) and/or to receive communications through transceiver circuitry 801 from a RAN node over a radio interface. Moreover, modules may be stored in memory circuitry 805, and these modules may provide instructions so that when instructions of a module are executed by processing circuitry 803, processing circuitry 803 performs respective operations (e.g., operations discussed below with respect to Example Embodiments relating to wireless devices).

Figure 7:
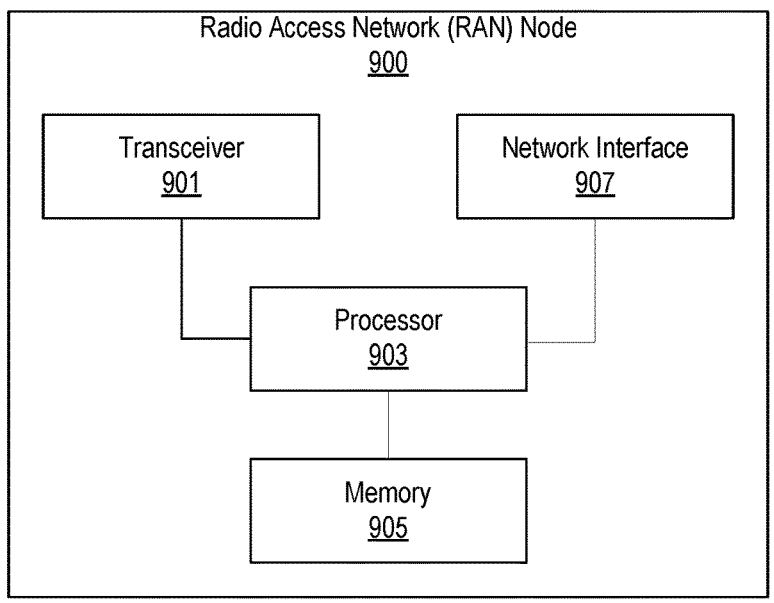
FIG. 7 is a block diagram illustrating a radio access network ("RAN") node according to some embodiments of inventive concepts.

FIG. 7 is a block diagram illustrating elements of a radio access network RAN node 900 (also referred to as a network node, base station, eNodeB/eNB, gNodeB/gNB, etc.) of a Radio Access Network ("RAN") configured to provide cellular communication according to embodiments of inventive concepts. (RAN node 900 may be provided, for example, as discussed below with respect to network node 4160 of FIG. 26.) As shown, the RAN node may include transceiver circuitry 901 (also referred to as a transceiver, e.g., corresponding to portions of interface 4190 of FIG. 26) including a transmitter and a receiver configured to provide uplink and downlink radio communications with mobile terminals. The RAN node may include network interface circuitry 907 (also referred to as a network interface, e.g., corresponding to portions of interface 4190 of FIG. 26) configured to provide communications with other nodes (e.g., with other base stations) of the RAN and/or core network CN. The network node may also include processing circuitry 903 (also referred to as a processor, e.g., corresponding to processing circuitry 4170) coupled to the transceiver circuitry, and memory circuitry 905 (also referred to as memory, e.g., corresponding to device readable medium 4180 of FIG. 26) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that a separate memory circuitry is not required.

As discussed herein, operations of the RAN node may be performed by processing circuitry 903, network interface 907, and/or transceiver 901. For example, processing circuitry 903 may control transceiver 901 to transmit downlink communications through transceiver 901 over a radio interface to one or more mobile terminals or mobile UEs and/or to receive uplink communications through transceiver 901 from one or more mobile terminals or mobile UEs over a radio interface. Similarly, processing circuitry 903 may control network interface 907 to transmit communications through network interface 907 to one or more other network nodes and/or to receive communications through network interface from one or more other network nodes. Moreover, modules may be stored in memory 905, and these modules may provide instructions so that when instructions of a module are executed by processing circuitry 903, processing circuitry 903 performs respective operations (e.g., operations discussed below with respect to Example Embodiments relating to RAN nodes).

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 8:
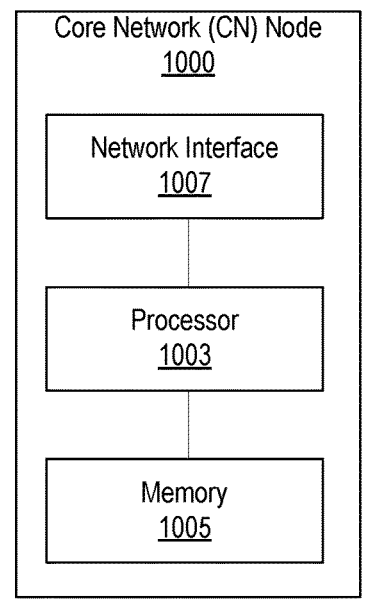
FIG. 8 is a block diagram illustrating a CN ("CN") node according to some embodiments of inventive concepts.

FIG. 8 is a block diagram illustrating elements of a core network CN node (e.g., an SMF node, an AMF node, etc.) of a communication network configured to provide cellular communication according to embodiments of inventive concepts. As shown, the CN node may include network interface circuitry 1007 (also referred to as a network interface) configured to provide communications with other nodes of the core network and/or the radio access network RAN. The CN node may also include a processing circuitry 1003 (also referred to as a processor) coupled to the network interface circuitry, and memory circuitry 1005 (also referred to as memory) coupled to the processing circuitry. The memory circuitry 1005 may include computer readable program code that when executed by the processing circuitry 1003 causes the processing circuitry to perform operations according to embodiments disclosed herein. According to other embodiments, processing circuitry 1003 may be defined to include memory so that a separate memory circuitry is not required.

As discussed herein, operations of the CN node may be performed by processing circuitry 1003 and/or network interface circuitry 1007. For example, processing circuitry 1003 may control network interface circuitry 1007 to transmit communications through network interface circuitry 1007 to one or more other network nodes and/or to receive communications through network interface circuitry from one or more other network nodes. Moreover, modules may be stored in memory 1005, and these modules may provide instructions so that when instructions of a module are executed by processing circuitry 1003, processing circuitry 1003 performs respective operations (e.g., operations discussed below with respect to Example Embodiments relating to core network nodes).

As explained above, some embodiments are directed to a first network node operating as a Master Node (MN), e.g. having a Master Cell Group (MCG) configured to the UE and/or an MN-terminated bearer. The MN may be a gNodeB, or a Central Unit gNodeB (CU-gNB) or an eNodeB, or a Central Unit eNodeB (CU-gNB), or any network node and/or network function. Some other embodiments are directed to a second network node operating as a Secondary Node (SN), or Source Secondary Node (S-SN) e.g. having a Secondary Cell Group (SCG) pre-configured (i.e. not connected to) to the UE. The SN may be a gNodeB, or a Central Unit gNodeB (CU-gNB) or an eNodeB, or a Central Unit eNodeB (CU-gNB), or any network node and/or network function. Notice that MN, S-SN and T-SN may be from the same or different Radio Access Technologies (and possibly be associated to different Core Network nodes).

The terms "Secondary Node (SN)", or target SN, are used herein to refer to a target candidate SN, or a network node associated to a target candidate PSCell that is being configured.

The term "Master Node (MN)" is referred to herein also as a MN to be, or a network node that has configured a UE connected to it with CPA. The term "to be" refers to the fact that when CPA is prepared the UE is not yet operating in MR-DC, so strictly speaking one might say this is not yet operating as a MN in the same way as in legacy MR-DC, since the UE is still in single connectivity until it executes CPA.

"MN generated CPA" corresponds to a procedure wherein the node connected to the UE in single connectivity (to become a Master Node—MN upon CPA execution) determines to configure conditional PSCell Addition (CPA) and The document refers to a candidate SN, or SN candidate, or an SN, as the network node (e.g. gNodeB) that is prepared during the CPA procedure and that can create an RRC Reconfiguration message with an SCG configuration (e.g. RRCReconfiguration**) to be provided to the UE and stored, with an execution condition, wherein the UE only applies the message upon the fulfillment of the execution condition. That candidate SN is associated to one or multiple PSCell candidate cell(s) that the UE can be configured with. The UE then can execute the condition and accesses one of these candidate cells, associated to a candidate SN that becomes the SN or simply the SN after execution (i.e. upon fulfillment of the execution condition).

The document refers to a Conditional PSCell Addition (CPA) configuration and procedures (like CPA execution), most of the time to refer to the procedure from the UE perspective. Other terms may be considered as synonyms such as conditional reconfiguration, or Conditional Configuration (since the message that is stored and applied upon fulfillment of a condition is an RRCReconfiguration or RRCConnectionReconfiguration). Terminology wise, one could also interpret conditional handover (CHO) in a broader sense, also covering CPA (Conditional PSCell Addition) procedures. The document refers to a Conditional SN Addition most of the time to refer to the procedure from the UE perspective, to refer to procedures between network nodes wherein a node requests a target candidate SN to configure a conditional PSCell Addition (CPA) for at least one of its associated cells (cell associated to the target candidate SN).

The document refers to CPAC as a way to refer to either a Conditional PSCell Addition (CPA) or a Conditional PSCell Change (CPC).

The configuration of CPA can be done using the same IEs as conditional handover, which may be called at some point conditional configuration or conditional reconfiguration. The principle for the configuration is the same with configuring triggering/execution condition(s) and a reconfiguration message to be applied when the triggering condition(s) are fulfilled. The configuration IEs from TS 38.331 V16.2.0 (2020 Oct. 7):

ConditionalReconfiguration

The IE ConditionalReconfiguration is used to add, modify and release the configuration of conditional configuration.

| ConditionalReconfiguration information element |
| --- |
| -- ASN1START<br>-- TAG-CONDITIONALRECONFIGURATION-START<br>ConditionalReconfiguration-r16 ::=    SEQUENCE {<br>  attemptCcondReconfig-r16        ENUMERATED {true}<br>OPTIONAL, -- Need N<br>  condConfigToRemoveList-r16    CondConfigToRemoveList-r16<br>OPTIONAL, -- Need N<br>  condConfigToAddModList-r16    CondConfigToAddModList-r16<br>OPTIONAL, -- Need N<br>  ...<br>}<br>CondConfigToRemoveList-r16 :: =    SEQUENCE (SIZE (1..<br>maxNrofCondCells)) OF CondConfigId-r16<br>-- TAG-CONDITIONALRECONFIGURATION-STOP<br>-- ASN1STOP |

| ConditionalReconfiguration field descriptions |
| --- |
| condConfigToAddModList<br>List of the configuration of candidate SpCells to be added or modified for CHO or CPC.<br>condConfigToRemoveList<br>List of the configuration of candidate SpCells to be removed. When the network removes the stored conditional configuration for a candidate cell, the network releases the measIDs associated to the condExecutionCond if it is not used by the condExecutionCond of other candidate cells.<br>-   CondConfigId<br>The IE CondConfigId is used to identify a CHO or CPC configuration. |

| CondConfigId information element |
| --- |
| -- ASN1START<br>-- TAG-CONDCONFIGID-START |

| -continued |
| --- |
| CondConfigId-r16 ::=    INTEGER (1.. maxNrofCond-Cells)<br>-- TAG-CONDCONFIGID-STOP<br>-- ASN1STOP<br>-   CondConfigToAddModList<br>The IE CHO-Config ToAddModList concerns a list of conditional configurations to add or modify, with for each entry the cho-ConfigId and the associated condExecutionCond and condRRCReconfig. |

| CondConfigToAddModList information element |
| --- |
| -- ASN1START<br>-- TAG-CONDCONFIGTOADDMODLIST-START<br>CondConfigToAddModList-r16 ::=      SEQUENCE (SIZE (1..<br>maxNrofCondCells)) OF CondConfigToAddMod-r16<br>CondConfigToAddMod-r16 ::=      SEQUENCE {<br>  condConfigId-r16              CondConfigId-r16,<br>  condExecutionCond-r16         SEQUENCE (SIZE (1..2)) OF<br>MeasId OPTIONAL, -- Need S<br>  condRRCReconfig-r16           OCTET STRING<br>(CONTAINING RRCReconfiguration) OPTIONAL, -- Need S<br>  ...<br>}<br>-- TAG-CONDCONFIGTOADDMODLIST-STOP<br>-- ASN1STOP |

| CondConfigToAddMod field descriptions |
| --- |
| condExecutionCond<br>The execution condition that needs to be fulfilled in order to trigger the execution of a conditional configuration. The field is mandatory present when a condConfigId is being added. Otherwise, when the condRRCReconfig associated to a condConfigId is being modified it is optionally present and the UE uses the stored value if the field is absent.<br>condRRCReconfig<br>The RRCReconfiguration message to be applied when the condition(s) are fulfilled. The field is mandatory present when a condConfigId is being added. Otherwise, when the condExecutionCond associated to a condConfigId is being modified it is optionally present and the UE uses the stored value if the field is absent. |

Embodiments are now described in further detail that provide solutions for how to manage that an MN reconfiguration is performed at the same time as conditional addition of change of SN is executed, where the MN generated the message for the conditional reconfiguration.

Immediate MN Reconfiguration:

One possibility to solve the problem described above is that the MN reconfigures when it configures CPAC. That means that it already when CPAC is configured changes to the configuration suitable to have upon CPAC execution, and also instructs the UE to do so. However, that may work only in a limited amount of cases and it therefore not sufficient to solve the problem described above.

In one option, the network includes these configurations already in the RRCReconfiguration message that contains the CPA or CPC configuration (i.e. the IE ConditionalReconfiguration). Hence, RRCReconfiguration* does not need to contain any MN/MCG related configurations (or anything that changes the way MN monitor messages from the UE).

In another option, the UE autonomously applies the MCG/MN-related parts of the RRCReconfiguration* within the CPA or CPC configuration.

Figure 9:
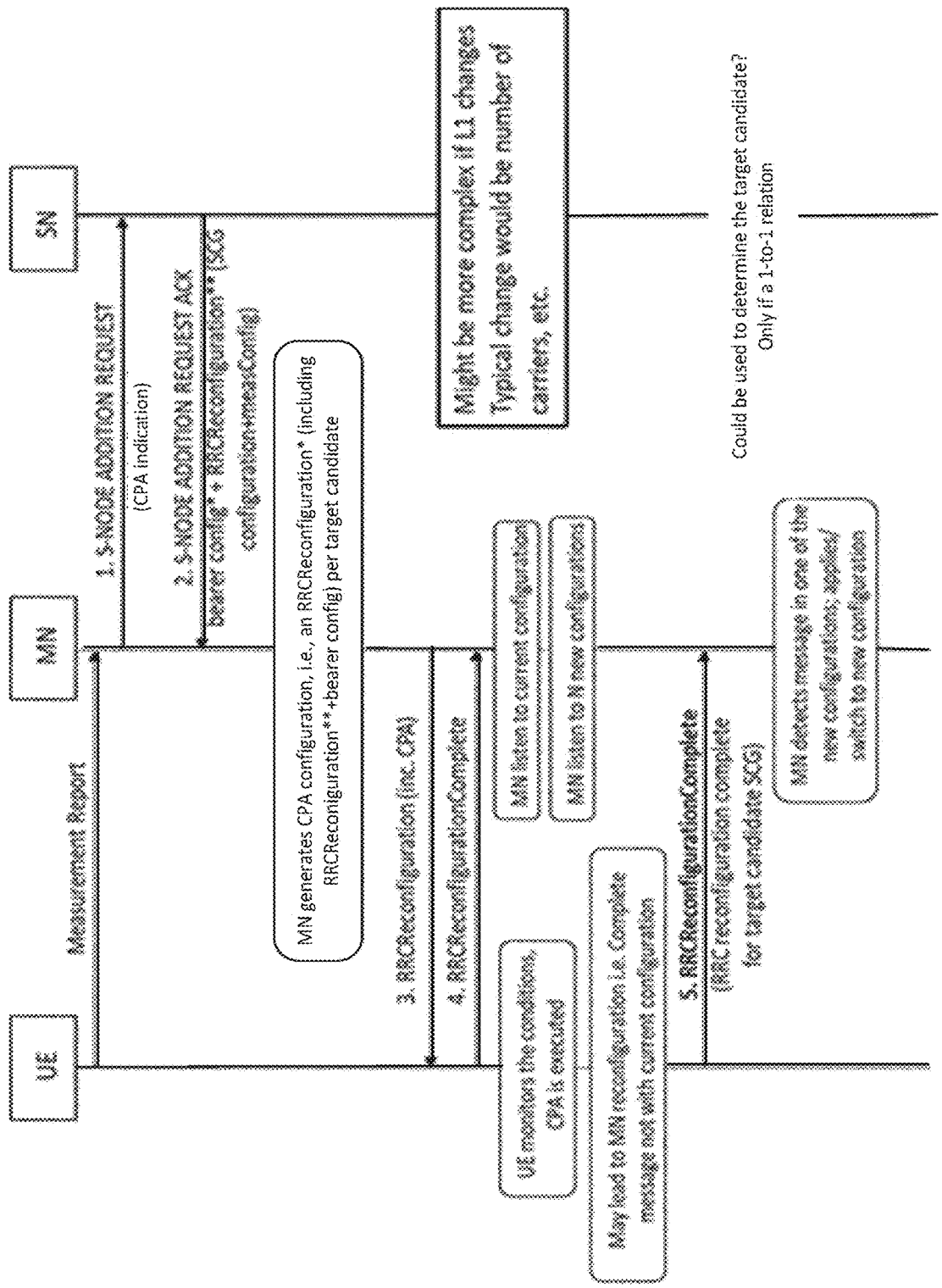
FIG. 9 illustrates MN monitoring multiple UE configurations in accordance with some embodiments of the present disclosure.

MN Monitoring Multiple UE Configurations:

According to this optional embodiments the MN generates the RRC message, e.g. RRCReconfiguration, containing the condition(s) which the UE should monitor and the message to be applied when the condition(s) are fulfilled. The RRC message also contains a reconfiguration of the current MN configuration. After having transmitted the message to the UE, the MN starts monitoring a multiple of configurations. The configurations are the current configuration and one or more configurations that the UE will apply when the condition(s) are fulfilled. FIG. 9 illustrates MN monitoring multiple UE configurations in accordance with some embodiments of the present disclosure.

Some embodiments are directed to operations and method executed by a Master Node (MN), which include any one or more of the following:
1. Determine to configure CPAC;
2. Transmit a request to a Secondary Node (MN) to prepare a conditional SN addition (CPAC);
3. Receive from the SN a response to the conditional SN addition request confirming that a UE may be accepted unless a canceling message is later received;
4. Transmit an RRC message, e.g. RRCReconfiguration, to the UE containing CPAC configurations for one or multiple candidate target cells (e.g. ConditionalReconfiguration IE). The RRC message contains the condition(s) which the UE should monitor and the message to be applied when the condition(s) are fulfilled;
The message to be applied includes a reconfiguration of the current MN configuration and the SN configuration (e.g. an RRCReconfiguration* including as its SCG reconfiguration an RRCReconfiguration**), wherein RRCReconfiguration may contain a first MN/MCG related configuration and wherein RRCReconfiguration* (per target candidate) may contain a second MN/MCG related configuration;
5. Monitor of multiple MN/MCG related configurations for reception of messages from the UE; the current MN configuration, and the, possibly different, configurations that the UE will apply when one of the execution condition(s) are fulfilled and RRCReconfiguration* is applied;
The current MN configuration corresponds to the configuration according to the latest RRCReconfiguration the MN is aware the UE has applied. That is, according to the previous step, the first MN/MCG related configuration.
The configurations that the UE will apply when one of the execution condition(s) are fulfilled and RRCReconfiguration* is applied corresponds to the second MN/MCG related configuration.
6. Receive a message from the UE, e.g. an RRCReconfigurationComplete message on one of the multiple configurations that have been monitored e.g. first or second.
7. Detect which of the configurations that the UE has applied and reconfigure itself to that configuration. In one alternative solution, receiving an indication from the UE, which of the configurations that the UE has applied. The indication could comprise the conditional reconfiguration ID or the target cell;
These embodiments may be performed as part of network implementation and may not require specification updates.

Figure 15:
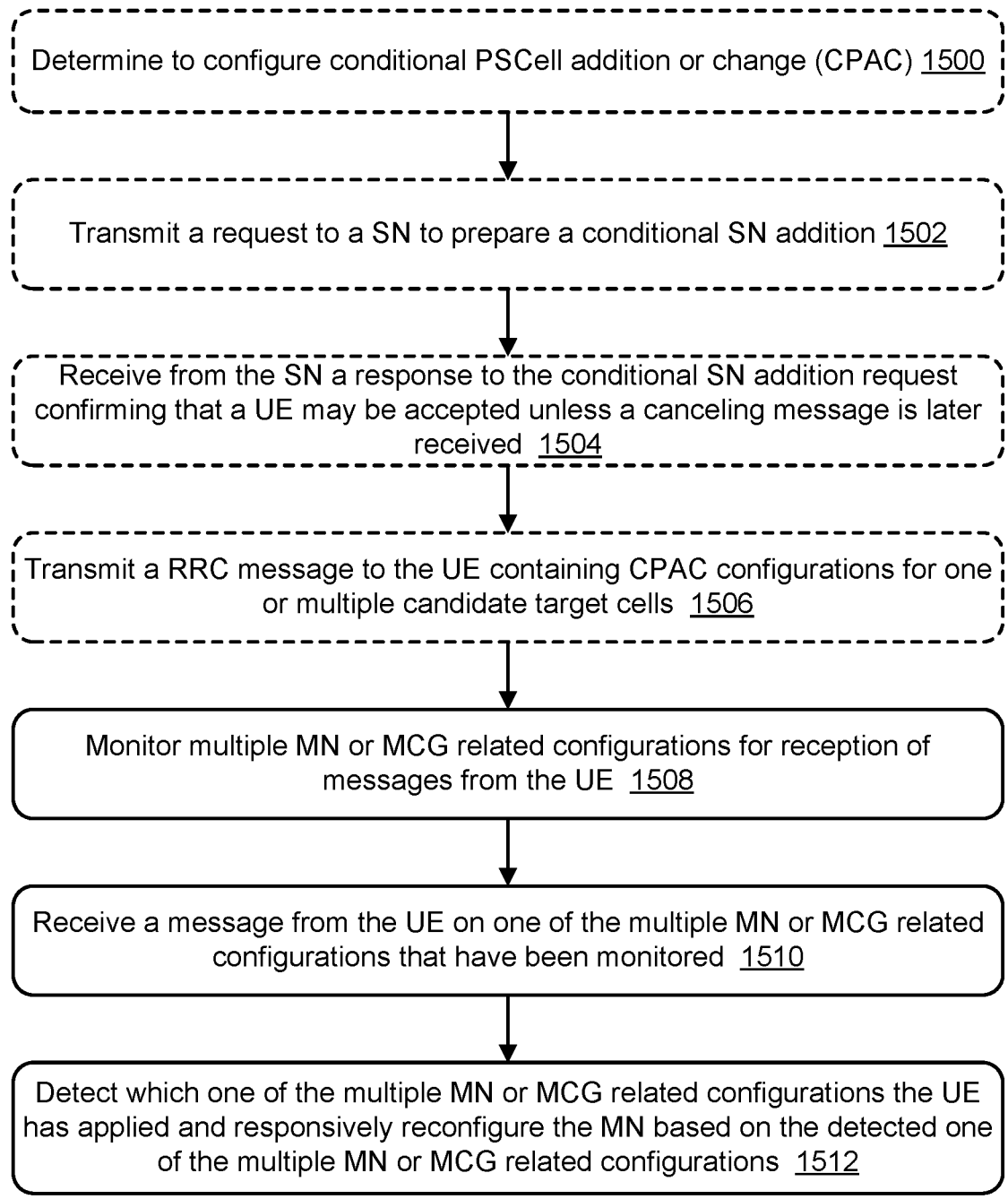
FIGS. 15-18 are flowchart of methods of operating a master node (MN) in a wireless communication network in accordance with some embodiments.

FIG. 15 is a flowchart of a corresponding method of operating a master node (MN) in a wireless communication network in accordance with some embodiments. Referring to FIG. 15, the method may include determining (1500) to configure conditional PSCell addition or change (CPAC), transmitting (1502) a request to a secondary node (SN) to prepare a conditional SN addition, and receiving (1504) from the SN a response to the conditional SN addition request confirming that a UE may be accepted unless a canceling message is later received. The method may further include transmitting (1506) a radio resource control (RRC) message to the UE containing CPAC configurations for one or multiple candidate target cells, where the RRC message contains at least one condition which the UE should monitor and message to be applied when the at least one condition is fulfilled. The steps 1500-1506 are optional.

The method includes monitoring (1508) multiple MN or master cell group (MCG) related configurations for reception of messages from the UE. The method further includes receiving (1510) a message from the UE on one of the multiple MN or MCG related configurations that have been monitored. The method further includes detecting (1512) which one of the multiple MN or MCG related configurations the UE has applied and responsively reconfiguring the MN based on the detected one of the multiple MN or MCG related configurations.

In a further embodiment, the method may further include receiving an indication from the UE indicating which one of the multiple MN or MCG related configurations the UE has applied. The detecting (1512) of which one of the multiple MN or MCG related configurations the UE has applied can then be performed based on the indication from the UE. The indication from the UE may identify a conditional reconfiguration ID or a target cell.

In another further embodiment, one of the multiple MN or MCG related configurations monitored by the MN corresponds to a configuration according to a latest RRCReconfiguration the MN is aware the UE has applied, and another one of the multiple MN or MCG related configurations monitored by the MN corresponds to a configuration that the UE will apply when an execution condition is fulfilled and RRCReconfiguration* is applied.

In another further embodiment, the other one of the multiple MN or MCG related configurations monitored by the MN corresponds to a second MN or MCG related configuration.

Restriction of MN Configurations:

In some other embodiments the MN generates the RRC message, e.g. RRCReconfiguration, containing the condition(s) which the UE should monitor and the message to be applied when the condition(s) are fulfilled. The RRC message also contains a reconfiguration of the current MN configuration. The MN reconfigurations are restricted so that the MN can always understand the RRCReconfigurationComplete message, even if it is still using the old configuration itself until the Complete message is received. After having received the Complete message, the MN reconfigures itself to the new configuration.

Figure 10:
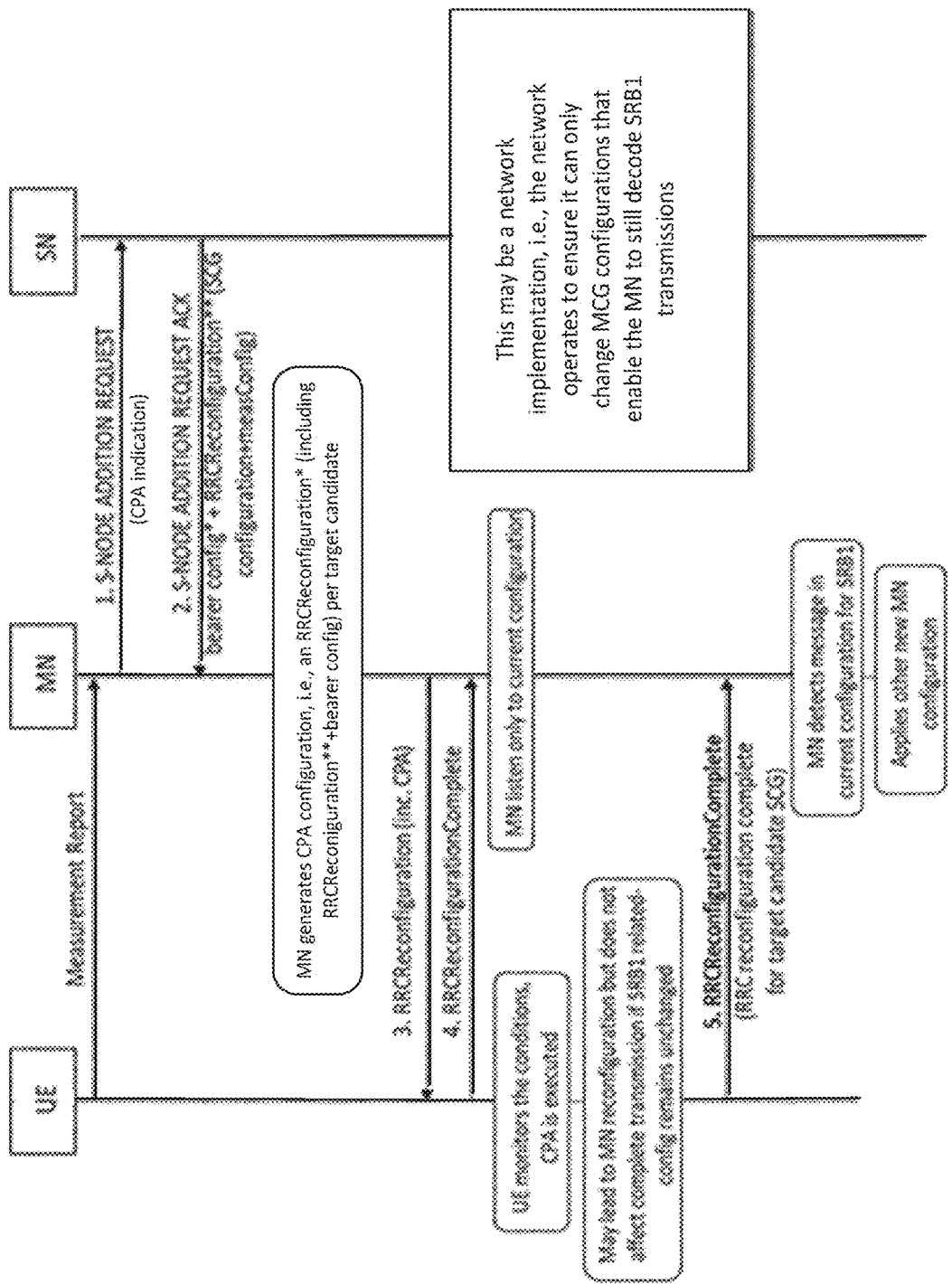
FIG. 10 illustrates restriction of possible MN configurations in accordance with some embodiments of the present disclosure.

FIG. 10 illustrates restriction of possible MN configurations in accordance with some embodiments of the present disclosure.

Some embodiments are directed to operations and method executed by a Master Node (MN), which include any one or more of the following:
1. Determine to configure CPAC;
2. Transmit a request to a Secondary Node (MN) to prepare a conditional SN addition (CPAC);
3. Receive from the SN a response to the conditional SN addition request confirming that a UE may be accepted unless a canceling message is later received;
4. Transmit an RRC message, e.g. RRCReconfiguration, to the UE containing CPAC configurations for one or multiple candidate target cells. The RRC message contains the condition(s) which the UE should monitor and the message to be applied when the condition(s) are fulfilled; The message to be applied includes a reconfiguration of the current MN configuration and the SN configuration; The possible MN reconfigurations are restricted, so that the MN can understand messages from the UE received both on the old and the new configuration, as the MN cannot know when the conditions are fulfilled. The restrictions may e.g. consist of not reconfiguring SRB1, not reconfiguring layer 1 parameters. The restrictions may be described in TS 38.331, or it may completely rely on network implementation;

5. Receive a message from the UE, e.g. an RRCReconfigurationComplete message on one of the configurations that have been monitored;
6. Detect which of the configurations that the UE has applied and reconfigure itself to that configuration.

These embodiments may be part of network implementation and may not require specification updates.

With further reference to the flowchart of FIG. 15, this embodiment can include the optional steps of 1500-1506. The embodiment includes steps 1508-1512. In contrast to the previous description of step 1506, in this embodiment the RRC message to be applied is a reconfiguration of the current MN or MCG configuration and the SN configuration. The possible MN reconfigurations are restricted, so that the MN can understand messages from the UE received both on the old and the new configuration.

Heads-Up Message from the UE to the MN:

According to some other embodiments, the MN generates the RRC message, e.g. RRCReconfiguration, containing the condition(s) which the UE should monitor and the message to be applied when the condition(s) are fulfilled. The RRC message also contains a reconfiguration of the current MN configuration. In this option there are no restrictions on what the MN is allowed to reconfigure and the MN also does not have to monitor several configurations, which increases the flexibility of how the MN can be re-configured but reduces the complexity of having to monitor multiple candidate configurations. These embodiments rely on the UE sending a heads-up message when the condition(s) are fulfilled, wherein that heads up message is transmitted with the UE's current configuration (the configuration the MN is monitoring). That heads up message may include an indication of which message is going to be applied by the UE shortly (or has been applied by the UE shortly) so that the network is aware that any follow up message from that UE is according to this newly indicated configuration. That indication may be a target candidate cell information (like a target candidate cell identifier) or a conditional reconfiguration identifier, or an RRC transaction identifier.

The MN receives the heads up message, and based on that, it determines which configuration the UE will use to transmit follow up message(s). Then, MN performs the reconfiguration according to that determined configuration. An option is that the MN confirms/acknowledges to the UE that it may go ahead with the reconfiguration. This handshakes ensures that the UE and the network are synced in when the reconfiguration is done.

One advantage is that some of the network implementation for the legacy SN addition and SN change (PSCell Addition and PSCell change) can be used, namely the reception of messages from the UE only according to the UE latest configuration. And, only applying a new MN/MCG configuration (i.e. start monitoring messages from the UE according to the new configure MN/MCG configuration) when the heads up message is received. A cost of that is the additional signaling and specifications that needs to be defined for the heads up message.

Figure 11:
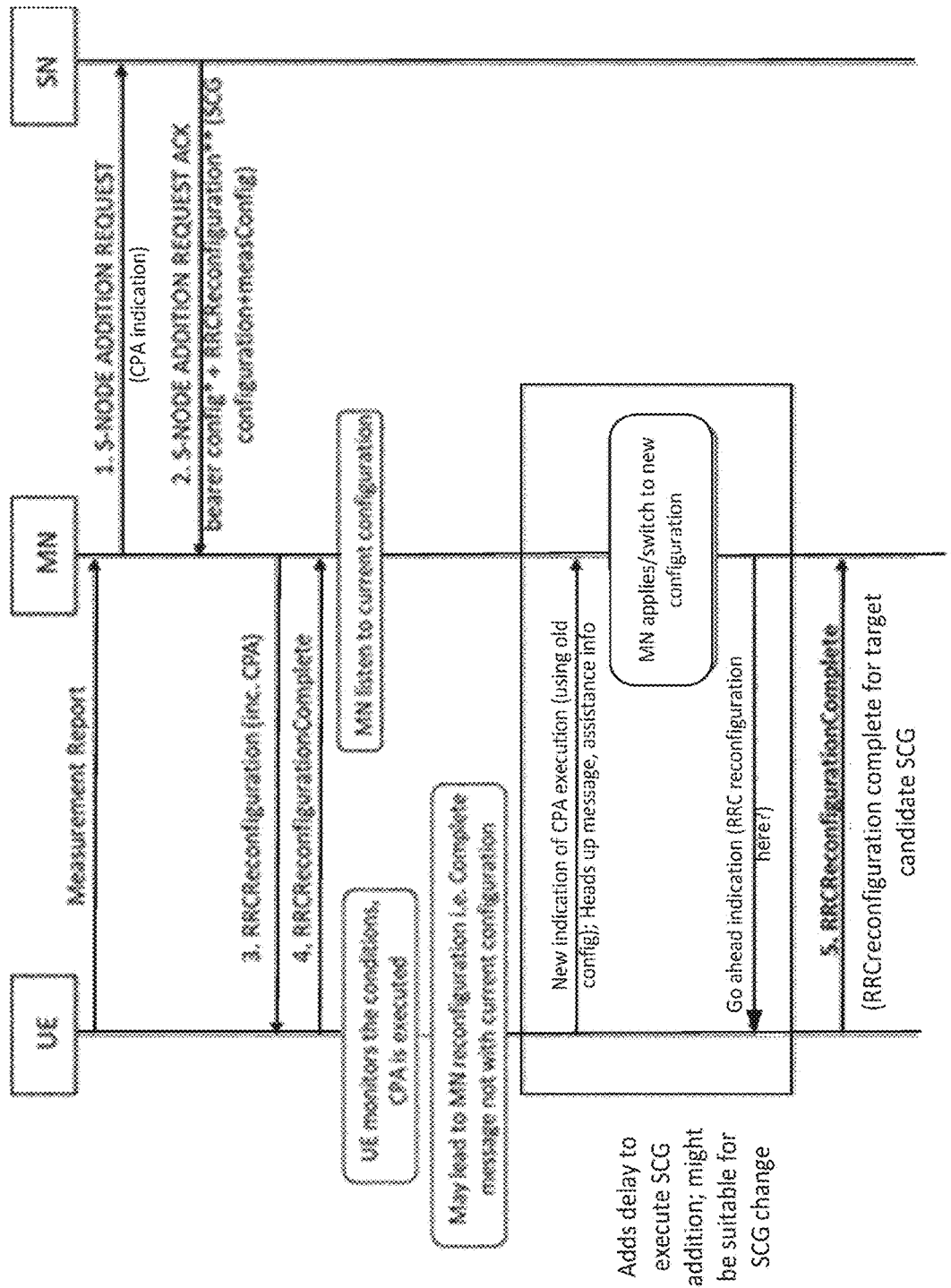
FIG. 11 illustrates a heads-up message from the UE to the MN in accordance with some embodiments.

FIG. 11 illustrates a heads-up message from the UE to the MN in accordance with some embodiments.

Some embodiments are directed to operations and method executed by a Master Node (MN), which include any one or more of the following:

1. Determine to configure CPAC;
2. Transmit a request to a Secondary Node (MN) to prepare a conditional SN addition (CPAC);
3. Receive from the SN a response to the conditional SN addition request confirming that a UE may be accepted unless a canceling message is later received;
4. Transmit an RRC message, e.g. RRCReconfiguration, to the UE containing CPAC configurations for one or multiple candidate target cells. The RRC message contains the condition(s) which the UE should monitor and the message to be applied when the condition(s) are fulfilled; The message to be applied includes the SN configuration and it may contain reconfiguration of the current MN configuration;
   The message to be applied includes a reconfiguration of the current MN configuration and the SN configuration (e.g. an RRCReconfiguration* including as its SCG reconfiguration an RRCReconfiguration**), wherein RRCReconfiguration may contain a first MN/MCG related configuration and wherein RRCReconfiguration* (per target candidate) may contain a second MN/MCG related configuration;
5. Receive a heads-up indication from the UE on the old configuration (can be called UE's current configuration, the latest applied configuration related to MN/MCG), that the condition(s) have been fulfilled and that it is time to reconfigure to the new configuration. The heads-up indication may be implemented as a new RRC message, as a new IE in existing RRC message, e.g. UEAssistanceInformation, MeasurementReport or as a MAC Control Element (MAC CE) etc.;
6. Transmit, to the UE, a confirmation that the heads-up message has been received and that the UE may go-ahead with the reconfiguration. The confirmation may be the layer 2 acknowledgement to the heads-up message, an RRC message or a MAC CE. In one option, the MN sends the MN reconfiguration here instead, e.g. in RRCReconfiguration, instead of in the RRC message containing the conditional reconfiguration;
7. Receive a message from the UE, e.g. an RRCReconfigurationComplete message, confirming that the reconfiguration to the new configuration is completed. The RRCReconfigurationComplete may be a reply to an embedded RRCReconfiguration in the first RRCReconfiguration, or to a second RRCReconfiguration message, if the reply to the heads-up message was an RRCReconfiguration message;
8. In an alternative solution, receive a heads-up indication from the UE, performing the reconfiguration to the new MN configuration, while the UE is doing the same reconfiguration after having waited a certain period of time. The time (network processing time) may have been configured earlier, e.g. in RRCReconfiguration or in system information or a maximum value for network processing time may have been specified.

Figure 16:
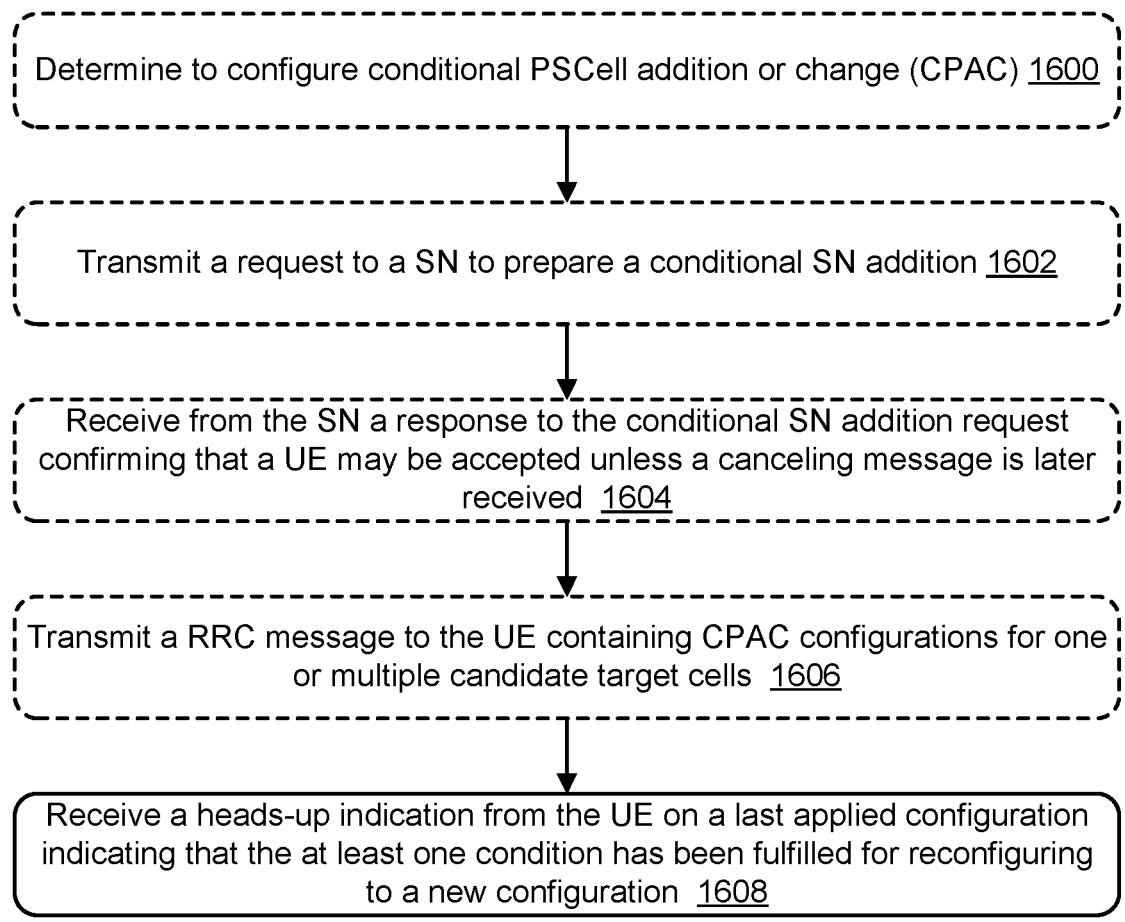

FIG. 16 is a flowchart of a corresponding method of operating a master node (MN) in a wireless communication network in accordance with some embodiments. Referring to FIG. 16, the method may include determining (1600) to configure conditional PSCell addition or change (CPAC), transmitting (1602) a request to a secondary node (SN) to prepare a conditional SN addition, and receiving (1604) from the SN a response to the conditional SN addition request confirming that a UE may be accepted unless a canceling message is later received. The method may further include transmitting (1606) a radio resource control (RRC)

message to the UE containing CPAC configurations for one or multiple candidate target cells, where the RRC message contains at least one condition which the UE should monitor and message to be applied when the at least one condition is fulfilled. The steps 1600-1606 are optional.

The method includes receiving (1608) a heads-up indication from the UE on a last applied configuration indicating that the at least one condition has been fulfilled for reconfiguring to a new configuration.

Figure 17:
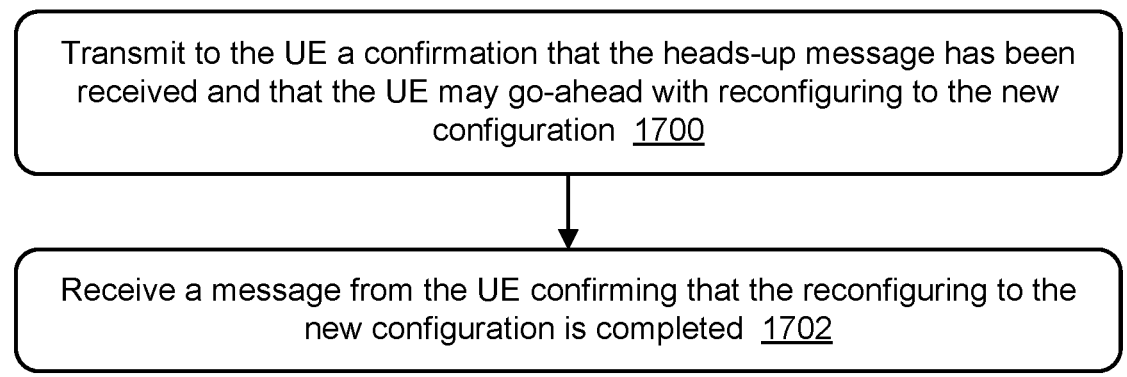

In one further embodiment illustrated in the flowchart of FIG. 17, the method by the MN further includes transmitting (1700) to the UE a confirmation that the heads-up message has been received and that the UE may go-ahead with reconfiguring to the new configuration, and receiving (1702) a message from the UE confirming that the reconfiguring to the new configuration is completed.

Figure 18:
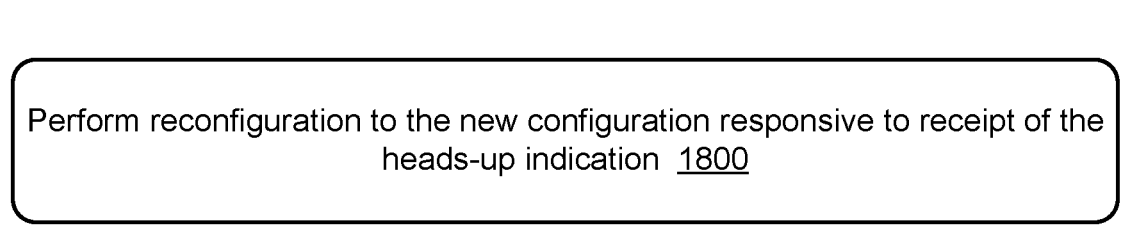

In an alternative further embodiment illustrated in the flowchart of FIG. 18, the method by the MN further includes performing (1800) reconfiguration to the new configuration responsive to receipt of the heads-up indication.

Some embodiments are directed to operations and method executed by a user equipment (UE), which include any one or more of the following:

1. Receive an RRC message, e.g. RRC Reconfiguration, from the network, containing CPAC configurations for one or multiple candidate target cells. The RRC message contains the condition(s) which the UE should monitor and the message to be applied when the condition(s) are fulfilled; The message to be applied includes the SN configuration and it may contain reconfiguration of the current MN configuration;
2. Transmit a heads-up indication to the network on the old configuration, that the condition(s) have been fulfilled and that it is time to reconfigure to the new configuration. The heads-up indication may be implemented as a new RRC message, as a new IE in existing RRC message, e.g. UEAssistanceInformation, MeasurementReport or as a MAC Control Element (MAC CE) etc.;
3. Receive, from the network, a confirmation that the heads-up message has been received and that the UE may go-ahead with the reconfiguration. The confirmation may be the layer 2 acknowledgement to the heads-up message, an RRC message or a MAC CE. In one option, the MN reconfiguration is received here instead, e.g. in RRCReconfiguration, instead of in the RRC message containing the conditional reconfiguration;
4. Transmit a message to the network, e.g. an RRCReconfigurationComplete message, confirming that the reconfiguration to the new configuration is completed. The RRCReconfigurationComplete may be a reply to an embedded RRCReconfiguration in the first RRCReconfiguration, or to a second RRCReconfiguration message, if the reply to the heads-up message was an RRCReconfiguration message;
5. In an alternative solution, transmit a heads-up indication to the network, waiting a period of time and then performing the reconfiguration to the new MN configuration. The time (network processing time) may have been configured earlier, e.g. in RRCReconfiguration or in system information or a maximum value for network processing time may have been specified.

FIG. 19 is a flowchart of a corresponding method of operating a UE in a wireless communication network in accordance with some embodiments. Referring to FIG. 19, the method receiving (1900) a radio resource control (RRC) message from a MN (or other network node) containing CPAC configurations for one or multiple candidate target cells, where the RRC message contains at least one condition which the UE should monitor and message to be applied when the at least one condition is fulfilled. The method further includes transmitting (1902) a heads-up indication to the MN on a last applied configuration indicating that the at least one condition has been fulfilled for reconfiguring to a new configuration.

In one further embodiment illustrated in the flowchart of FIG. 20, the method by the UE further includes receiving (2000) from the MN a confirmation that the heads-up message has been received and that the UE may go-ahead with reconfiguring to the new configuration. The method further includes transmitting (2002) a message to the MN confirming that the reconfiguring to the new configuration is completed.

In an alternative embodiment illustrated in the flowchart of FIG. 21, the method by the UE further includes performing (2100) reconfiguration to the new configuration responsive to expiration of a threshold time since the transmission (1902) of the heads-up indication.

An example implementation of various of these embodiments in 3GPP TS 38.331 V16.2.0 (2020 Oct. 7) is now described.

Figure 12:
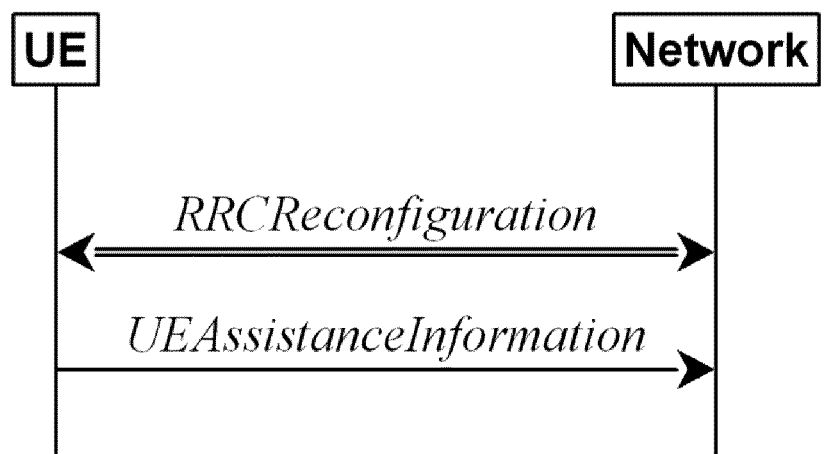
FIG. 12 illustrates UE assistance information being provided by a UE to a network node.

UE Assistance Information:

FIG. 12 illustrates UE assistance information being provided by a UE to a network node.

The purpose of this procedure is for the UE to inform the network of any one or more of:

its delay budget report carrying desired increment/decrement in the connected mode DRX cycle length, or;

its overheating assistance information, or;

its IDC assistance information, or;

its preference on DRX parameters for power saving, or;

its preference on the maximum aggregated bandwidth for power saving, or;

its preference on the maximum number of secondary component carriers for power saving, or;

its preference on the maximum number of MIMO layers for power saving, or;

its preference on the minimum scheduling offset for cross-slot scheduling for power saving, or;

assistance information to transition out of RRC CONNECTED state when the UE does not expect to send or receive data in the near future, or;

configured grant assistance information for NR sidelink communication, or;

its preference in being provisioned with reference time information.

Initiation:

1> if configured with referenceTimePreferenceReporting to provide preference in being provisioned with reference time information:

2> if the UE did not transmit a UEAssistanceInformation message with referenceTimeInfoPreference since it was configured to provide preference; or 2> if the UE's preference changed from the last time UE initiated transmission of the UEAssistanceInformation message including referenceTimeInfoInterestPreference:

3> initiate transmission of the UEAssistanceInformation message in accordance with 5.7.4.3 to provide preference in being provisioned with reference time information.

1> if configured to provide information when condition(s) for conditional reconfiguration have been fulfilled:

2> initiate transmission of the UEAssistanceInformation message in accordance with 5.7.4.3 to provide conditional reconfiguration information;

OtherConfig:
 The IE OtherConfig contains configuration related to miscellaneous other configurations:

---

OtherConfig information element

---

```
-- ASN1START
-- TAG-OTHERCONFIG-START
OtherConfig ::=          SEQUENCE {
  delayBudgetReportingConfig    CHOICE{
    release       NULL,
    setup       SEQUENCE{
      delayBudgetReportingProhibitTimer    ENUMERATED {s0, s0dot4, s0dot8,
s1dot6, s3, s6, s12, s30}
    }
  }                                                       OPTIONAL
-- Need M
}
OtherConfig-v1540 ::=    SEQUENCE {
  overheatingAssistanceConfig    SetupRelease {OverheatingAssistanceConfig}
OPTIONAL, -- Need M
  ...
}
CandidateServingFreqListNR-r16 ::= SEQUENCE (SIZE (1..maxFreqIDC-r16)) OF
ARFCN-ValueNR
OtherConfig-v1610 ::=        SEQUENCE {
  idc-AssistanceConfig-r16        SetupRelease {IDC-AssistanceConfig-r16}
OPTIONAL, -- Need M
  drx-PreferenceConfig-r16        SetupRelease {DRX-PreferenceConfig-r16}
OPTIONAL, -- Need M
  maxBW-PreferenceConfig-r16    SetupRelease {MaxBW-
PreferenceConfig-r16}    OPTIONAL, -- Need M
  maxCC-PreferenceConfig-r16    SetupRelease {MaxCC-PreferenceConfig-
r16}      OPTIONAL, -- Need M
  maxMIMO-LayerPreferenceConfig-r16    SetupRelease {MaxMIMO-
LayerPreferenceConfig-r16}    OPTIONAL, -- Need M
  minSchedulingOffsetPreferenceConfig-r16 SetupRelease
{MinSchedulingOffsetPreferenceConfig-r16}    OPTIONAL, -- Need M
  releasePreferenceConfig-r16    SetupRelease {ReleasePreferenceConfig-
r16}      OPTIONAL, -- Need M
  referenceTimePreferenceReporting-r16    ENUMERATED {true}
OPTIONAL, -- Need R
  btNameList-r16        SetupRelease {BT-NameList-r16}
OPTIONAL, -- Need M
  wlanNameList-r16        SetupRelease {WLAN-NameList-r16}
OPTIONAL, -- Need M
  sensorNameList-r16        SetupRelease {Sensor-NameLIst-r16}
OPTIONAL, -- Need M
  obtainCommonLocation-r16        ENUMERATED {true}
OPTIONAL, -- Need R
  sl-AssistanceConfigNR-r16        ENUMERATED{true}
OPTIONAL, Need R
}
OtherConfig-v17xy ::=        SEQUENCE {
  conditionFulfilledReporting-r17    BOOLEAN                OPTIONAL,
  nonCriticalExtension          SEQUENCE { }              OPTIONAL
}
OverheatingAssistanceConfig ::=    SEQUENCE {
  overheatingIndicationProhibitTImer    ENUMERATED {s0, s0dot5, s1, s2, s5,
s10, s20, s30,
                                                    s60, s90, s120, s300, s600, spare3, spare2, spare1}
}
IDC-AssistanceConfig-r16 ::=    SEQUENCE {
  candidateServingFreqListNR-r16 CandidateServingFreqListNR-r16
OPTIONAL, -- Need R
  ...
}
DRX-PreferenceConfig-r16 ::=    SEQUENCE {
  drx-PreferenceProhibitTimer-r16    ENUMERATED {
                  s0, s0dot5, s1, s2, s3, s4, s5, s6, s7,
                  s8, s9, s10, s20, s30, spare2, spare1}
}
MaxBW-PreferenceConfig-r16 ::=   SEQUENCE {
  maxBW-PreferenceProhibitTimer-r16    ENUMERATED {
                  s0, s0dot5, s1, s2, s3, s4, s5, s6, s7,
                  s8, s9, s10, s20, s30, spare2, spare1}
}
MaxCC-PreferenceConfig-r16 ::=   SEQUENCE {
  maxCC-PreferenceProhibitTimer-r16    ENUMERATED {
                  s0, s0dot5, s1, s2, s3, s4, s5, s6, s7,
```

| OtherConfig information element |
| --- |
| ```
                         s8, s9, s10, s20, s30, spare2, spare1}
}
MaxMIMO-LayerPreferenceConfig-r16 ::=    SEQUENCE {
   maxMIMO-LayerPreferenceProhibitTimer-r16    ENUMERATED {
                         s0, s0dot5, s1, s2, s3, s4, s5, s6, s7,
                         s8, s9, s10, s20, s30, spare2, spare1}
}
MinSchedulingOffsetPreferenceConfig-r16 ::=    SEQUENCE {
   minSchedulingOffsetPreferenceProhibitTimer-r16    ENUMERATED {
                         s0, s0dot5, s1, s2, s3, s4, s5, s6, s7,
                         s8, s9, s10, s20, s30, spare2, spare1}
}
ReleasePreferenceConfig-r16 ::=       SEQUENCE {
   releasePreferenceProhibitTimer-r16       ENUMERATED {
                         s0, s0dot5, s1, s2, s3, s4, s5, s6, s7,
                         s8, s9, s10, s20, s30, infinity, spare1},
   connectedReporting      ENUMERATED {true}
OPTIONAL -- Need R
}
-- TAG-OTHERCONFIG-STOP
-- ASN1STOP
``` |

| OtherConfig field descriptions |
| --- | candidateServingFreqListNR
Indicates for each candidate NR serving cells, the center frequency around which
UE is requested to report IDC issues.
conditionFulfilledReporting
Configuration of the UE to report when condition(s) have been fulfilled for
conditional reconfiguration.
connectedReporting
Indicates that the UE can report a preference to remain in RRC_CONNECTED
state following a report to leave RRC_CONNECTED state. If absent, the UE
cannot report a preference to stay in RRC_CONNECTED state.
delayBudgetReportingProhibitTimer
Prohibit timer for delay budget reporting. Value in seconds. Value s0 means
prohibit timer is set to 0 seconds, value s0dot4 means prohibit timer is set to 0.4
seconds, and so on.
drx-PreferenceConfig
Configuration for the UE to report assistance information to inform the gNB about
the UE's DRX preferences for power saving.
drx-PreferenceProhibitTimer
Prohibit timer for DRX preferences assistance information reporting. Value in
seconds. Value s0 means prohibit timer is set to 0 seconds, value s0dot5 means
prohibit timer is set to 0.5 seconds, value s1 means prohibit timer is set to 1
second and so on.
idc-AssistanceConfig
Configuration for the UE to report assistance information to inform the gNB about
UE detected IDC problem.
maxBW-PreferenceConfig
Configuration for the UE to report assistance information to inform the gNB about
the UE's preferred bandwidth for power saving.
maxBW-PreferenceProhibitTimer
Prohibit timer for preferred bandwidth assistance information reporting. Value in
seconds. Value s0 means prohibit timer is set to 0 seconds, value s0dot5 means
prohibit timer is set to 0.5 seconds, value s1 means prohibit timer is set to 1
second and so on.
maxCC-PreferenceConfig
Configuration for the UE to report assistance information to inform the gNB about
the UE's preferred number of carriers for power saving.
maxCC-PreferenceProhibitTimer
Prohibit timer for preferred number of carriers assistance information reporting.
Value in seconds. Value s0 means prohibit timer is set to 0 seconds, value
s0dot5 means prohibit timer is set to 0.5 seconds, value s1 means prohibit timer
is set to 1 second and so on.
maxMIMO-LayerPreferenceConfig
Configuration for the UE to report assistance information to inform the gNB about
the UE's preferred number of MIMO layers for power saving.
maxMIMO-LayerPreferenceProhibitTimer
Prohibit timer for preferred number of number of MIMO layers assistance
information reporting. Value in seconds. Value s0 means prohibit timer is set to 0
seconds, value s0dot5 means prohibit timer is set to 0.5 seconds, value s1
means prohibit timer is set to 1 second and so on.
minSchedulingOffsetPreferenceConfig

| OtherConfig field descriptions |
| --- |
| Configuration for the UE to report assistance information to inform the gNB about the UE's preferred minimumSchedulingOffset value for cross-slot scheduling for power saving.<br>minSchedulingOffsetPreferenceProhibitTimer<br>Prohibit timer for preferred minimumSchedulingOffset assistance information reporting. Value in seconds. Value s0 means prohibit timer is set to 0 seconds, value s0dot5 means prohibit timer is set to 0.5 seconds, value s1 means prohibit timer is set to 1 second and so on.<br>obtainCommonLocation<br>Requests the UE to attempt to have detailed location information available using GNSS. NR configures the field if includeCommonLocationInfo is configured for one or more measurements.<br>overheatingAssistanceConfig<br>Configuration for the UE to report assistance information to inform the gNB about UE detected internal overheating.<br>overheatingIndicationProhibitTimer<br>Prohibit timer for overheating assistance information reporting. Value in seconds. Value s0 means prohibit timer is set to 0 seconds, value s0dot5 means prohibit timer is set to 0.5 seconds, value s1 means prohibit timer is set to 1 second and so on.<br>referenceTimePreferenceReporting<br>If present, the field indicates the UE is configured to provide reference time assistance information.<br>releasePreferenceConfig<br>Configuration for the UE to report assistance information to inform the gNB about the UE's preference to leave RRC_CONNECTED state.<br>releasePreferenceProhibitTimer<br>Prohibit timer for release preference assistance information reporting. Value in seconds. Value s0 means prohibit timer is set to 0 seconds, value s0dot5 means prohibit timer is set to 0.5 seconds, value s1 means prohibit timer is set to 1 second and so on. Value infinity means that once a UE has reported a release preference, the UE cannot report a release preference again during the RRC connection.<br>sensorNameList<br>Configuration for the UE to report measurements from specific sensors.<br>sl-AssistanceConfigNR<br>Indicate whether UE is configured to provide configured grant assistance information for NR sidelink communication. |

UEAssistanceInformation:

The UEAssistanceInformation message is used for the indication of UE assistance information to the network.

Signalling radio bearer: SRB1, SRB3
RLC-SAP: AM
Logical channel: DCCH
Direction: UE to Network
UEAssistanceInformation message

```
-- ASN1START
-- TAG-UEASSISTANCEINFORMATION-START
UEAssistanceInformation ::=      SEQUENCE {
    criticalExtensions      CHOICE {
        ueAssistanceInformation         UEAssistanceInformation-IEs,
        criticalExtensionsFuture        SEQUENCE { }
    }
}
UEAssistanceInformation-IEs ::=   SEQUENCE {
    delayBudgetReport           DelayBudgetReport                OPTIONAL,
    lateNonCriticalExtension    OCTET STRING                     OPTIONAL,
    nonCriticalExtension        UEAssistanceInformation-v1540-IEs          OPTIONAL
}
DelayBudgetReport::=         CHOICE {
    type1                    ENUMERATED {
                             msMinus1280, msMinus640, msMinus320,
msMinus160,msMinus80, msMinus60, msMinus40,
                             msMinus20, ms0, ms20,ms40, ms60, ms80, ms160,
ms320, ms640, ms1280},
    ...
}
UEAssistanceInformation-v1540-IEs ::= SEQUENCE {
    overheatingAssistance       OverheatingAssistance            OPTIONAL,
    nonCriticalExtension        UEAssistanceInformation-v1610-IEs
```

```
                                        -continued

OPTIONAL
}
OverheatingAssitance ::=      SEQUENCE {
  reducedMaxCCs              ReducedMaxCCs-r16                    OPTIONAL,
  reducedMaxBW-FR1           ReducedMaxBW-FRx-r16
OPTIONAL,
  reducedMaxBw-FR2           ReducedMaxBw-FRx-r16
OPTIONAL,
  reducedMaxMIMO-LayersFR1      SEQUENCE {
    reducedMIMO-LayersFR1-DL     MIMO-LayersDL,
    reducedMIMO-LayersFR1-UL     MIMO-LayersUL
  } OPTIONAL,
  reducedMaxMIMO-LayersFR2      SEQUENCE {
    reducedMIMO-LayersFR2-DL     MIMO-LayersDL,
    reducedMIMO-LayersFR2-UL     MIMO-LayersUL
  } OPTIONAL
}
ReducedAggregatedBandwidth ::= ENUMERATED {mhz0, mhz10, mhz20,
mhx30, mhz40, mhz50, mhz60, mhz80, mhz100, mhz200, mhz300, mhz400}
UEAssistanceInformation-v1610-IEs ::= SEQUENCE {
  idc-Assistance-r16           IDC-Assitance-r16                 OPTIONAL,
  drx-Preference-r16           DRX-Preference-r16                OPTIONAL,
  maxBW-Preference-r16         MaxBW-Preference-r16
OPTIONAL,
  maxCC-Preference-r16         MaxCC-Preference-r16
OPTIONAL,
  maxMIMO-LayerPreference-r16           MaxMIMO-LayerPreference-r16
OPTIONAL,
  minSchedulingOffsetPreference-r16     MinSchedulingOffsetPreference-r16
OPTIONAL,
  releasePreference-r16        ReleasePrefernce-r16              OPTIONAL,
  sl-UE-AssistanceInformationNR-r16     SL-UE-AssistanceInformationNR-r16
OPTIONAL,
  referenceTimeInfoPreference-r16       BOOLEAN                  OPTIONAL,
  nonCriticalExtension         SEQUENCE { }                      OPTIONAL
}
UEAssistanceInformation-v17xy-IEs ::= SEQUENCE {
  conditionFulfilled-r16                CondReconfigId-r16
OPTIONAL,
  nonCriticalExtension         SEQUENCE { }                      OPTIONAL
}
IDC-Assistance-r16 ::=       SEQUENCE {
  affectedCarrierFreqList-r16     AffectedCarrierFreqList-r16
OPTIONAL,
  affectedCarrierFreqCombList-r16     AffectedCarrierFreqCombList-r16
OPTIONAL,
  . . .
}
AffectedCarrierFreqList-r16 ::= SEQUENCE (SIZE (1.. maxFreqIDC-r16)) OF
AffectedCarrierFreq-r16
AffectedCarrierFreq-r16::=    SEQUENCE {
  carrierFreq-r16              ARFCN-ValueNR,
  interferenceDirection-r16    ENUMERATED {nr, other, both, spare}
}
AffectedCarrierFreqCombList-r16 ::= SEQUENCE (SIZE (1..maxCombIDC-r16))
OF AffectedCarrierFreqComb-r16
AffectedCarrierFreq ::=      SEQUENCE {
  affectedCarrierFreqComb-r16     SEQUENCE (SIZE
(2..maxNrofServingCells)) OF    ARFCN-ValueNR    OPTIONAL,
  victimSystemType-r16         VictimSystemType-r16
}
VictimSystemType-r16 ::=     SEQUENCE {
  gps-r16              ENUMERATED {true}           OPTIONAL,
  glonass-r16          ENUMERATED {true}           OPTIONAL,
  bds-r16              ENUMERATED {true}           OPTIONAL,
  galileo-r16          ENUMERATED {true}           OPTIONAL,
  navIC-r16            ENUMERATED {true}           OPTIONAL,
  wlan-r16             ENUMERATED {true}           OPTIONAL,
  bluetooth-r16        ENUMERATED {true}           OPTIONAL,
  . . .
}
DRX-Preference-r16 ::=       SEQUENCE {
  preferredDRX-InactivityTimer-r16     ENUMERATED {
                               ms0, ms1, ms2, ms3, ms4, ms5, ms6, ms8, ms10,
ms20, ms30, ms40, ms50, ms60, ms80,
                               ms100, ms200, ms300, ms500, ms750, ms1280,
ms1920, ms2560, spare9, spare8,
                               spare7, spare6, spare5, spare4, spare3, spare2,
spare1} OPTIONAL,
```

```
    preferredDRX-LongCycle-r16        ENUMERATED {
                                      ms10, ms20, ms32, ms40, ms60, ms64, ms70,
ms80, ms128, ms160, ms256, ms320, ms512,
                                      ms640, ms1024, ms1280, ms2048, ms2560,
ms5120, ms10240, spare12, spare11, spare10,
                                      spare9, spare8, spare7, spare6, spare5, spare4,
spare3, spare2, spare1 } OPTIONAL,
    preferredDRX-ShortCycle-r16       ENUMERATED {
                                      ms2, ms3, ms4, ms5, ms6, ms7, ms8, ms10, ms14,
ms16, ms20, ms30, ms32,
                                      ms35, ms40, ms64, ms80, ms128, ms160, ms256,
ms320, ms512, ms640, spare9,
                                      spare8, spare7, spare6, spare5, spare4, spare3,
spare2, spare1 } OPTIONAL,
    preferredDRX-ShortCycleTimer-r16  INTEGER (1..16)   OPTIONAL
}
MaxBW-Preference-r16 ::=     SEQUENCE {
    reducedMaxBW-FR1-r16             ReducedMaxBW-FRx-r16
OPTIONAL,
    reducedMaxBW-FR2-r16             ReducedMaxBW-FRx-r16
OPTIONAL
}
MaxCC-Preference-r16 ::=     SEQUENCE {
    reducedMaxCCs-r16                ReducedMaxCCs-r16
OPTIONAL
}
MaxMIMO-LayerPreference-r16 ::=   SEQUENCE {
    reducedMaxMIMO-LayersFR1-r16        SEQUENCE {
        reducedMIMO-LayersFR1-DL-r16        INTEGER (1..8),
        reducedMIMO-LayersFR1-UL-r16        INTEGER (1..4)
    } OPTIONAL,
    reducedMaxMIMO-LayersFR2-r16    SEQUENCE {
        reducedMIMO-LayersFR2-DL-r16        INTEGER (1..8),
        reducedMIMO-LayersFR2-UL-r16        INTEGER (1..4)
    } OPTIONAL
}
MinSchedulingOffsetPreference-r16 ::=   SEQUENCE {
    preferredK0-r16         SEQUENCE {
        preferredK0-SCS-15kHz-r16       ENUMERATED {sl1, sl2, sl4, sl6}
OPTIONAL,
        preferredK0-SCS-30kHz-r16       ENUMERATED {sl1, sl2, sl4, sl6}
OPTIONAL,
        preferredK0-SCS-60kHz-r16       ENUMERATED {sl2, sl4, sl8, sl12}
OPTIONAL,
        preferredK0-SCS-120kHz-r16      ENUMERATED {sl2, sl4, sl8, sl12}
OPTIONAL
    }                               OPTIONAL,
    preferredK2-r16         SEQUENCE {
        preferredK2-SCS-15kHz-r16       ENUMERATED {sl1, sl2, sl4, sl6}
OPTIONAL,
        preferredK2-SCS-30kHz-r16       ENUMERATED {sl1, sl2, sl4, sl6}
OPTIONAL,
        preferredKs-SCS-60kHz-r16       ENUMERATED {sl2, sl4, sl8, sl12}
OPTIONAL,
        preferredK2-SCS-120kHz-r16      ENUMERATED {sl2, sl4, sl8, sl12}
OPTIONAL
    }                               OPTIONAL
}
ReleasePreference-r16 ::=        SEQUENCE {
    preferredRRC-State-r16           ENUMERATED {idle, inactive, connected,
outOfConnected}
}
ReducedMaxBW-Frx-r16 ::=             SEQUENCE {
    reducedBW-DL-r16             ReducedAggregatedBandwidth,
    reducedBW-UL-r16             ReducedAggregatedBandwidth
}
ReducedMaxCCs-r16 ::=            SEQUENCE {
    reducedCCsDL-r16             INTEGER (0..31),
    reducedCCsUL-r16             INTEGER (0..31)
}
SL-UE-AssistanceInformationNR-r16 ::= SEQUENCE (SIZE
(1..maxNrofTrafficPattern-r16)) OF SL-TrafficPatternInfo-r16
SL-TrafficPatternInfo-r16::=         SEQUENCE {
    trafficPeriodicity-r16           ENUMERATED {ms20,ms50, ms100, ms200,
ms300, ms400, ms500, ms600, ms700, ms800, ms900, ms1000},
    timingOffset-r16                 INTEGER (0.. 10239),
    messageSize-r16                  BIT STRING (SIZE (8)),
    sl-QoS-FlowIdentity-r16          SL-QoS-FlowIdentity-r16
}
```

-continued

-- TAG-UEASSISTANCEINFORMATION-STOP
-- ASN1STOP

| UEAssistanceInformation field descriptions |
| --- | affectedCarrierFreqList
Indicates a list of NR carrier frequencies that are affected by IDC problem.
affectedCarrierFreqCombList
Indicates a list of NR carrier frequencie combinations that are affected by IDC
problems due to Inter-Modulation Distortion and harmonics from NR when
configured with UL CA.
conditionFulfilled
Indicates that the condition(s) has been fulfilled for the indicated CondReconfigId.
delayBudgetReport
Indicates the UE-preferred adjustment to connected mode DRX.
interferenceDirection
Indicates the direction of IDC interference. Value nr indicates that only NR is
victim of IDC interference, value other indicates that only another radio is victim
of IDC interference and value both indicates that both NR and another radio are
victims of IDC interference. The other radio refers to either the ISM radio or
GNSS (see TR 36.816 [44]).
messageSize
Indicates the maximum TB size based on the observed traffic pattern. The value
refers to the index of TS 38.321 [3], table 6.1.3.1-2.
minSchedulingOffsetPreference
Indicates the UE's preferences on minimumSchedulingOffset of cross-slot
scheduling for power saving.
preferredDRX-InactivityTimer
Indicates the UE's preferred DRX inactivity timer length for power saving. Value
in ms (milliSecond). ms0 corresponds to 0, ms1 corresponds to 1 ms, ms2
corresponds to 2 ms, and so on. If the field is absent from the DRX-Preference
IE, it is interpreted as the UE having no preference for the DRX inactivity timer.
preferredDRX-LongCycle
Indicates the UE's preferred long DRX cycle length for power saving. Value in
ms. ms10 corresponds to 10ms, ms20 corresponds to 20 ms, ms32 corresponds
to 32 ms, and so on. If preferredDRX-ShortCycle is provided, the value of
preferredDRX-LongCycle shall be a multiple of the preferredDRX-ShortCycle
value. If the field is absent from the DRX-Preference IE, it is interpreted as the
UE having no preference for the long DRX cycle.
preferredDRX-ShortCycle
Indicates the UE's preferred short DRX cycle length for power saving. Value in
ms. ms2 corresponds to 2ms, ms3 corresponds to 3 ms, ms4 corresponds to 4
ms, and so on. If the field is absent from the DRX-Preference IE, it is interpreted
as the UE having no preference for the short DRX cycle.
preferredDRX-ShortCycleTimer
Indicates the UE's preferred short DRX cycle timer for power saving. Value in
multiples of preferredDRX-ShortCycle. A value of 1 corresponds to
preferredDRX-ShortCycle, a value of 2 corresponds to 2 * preferredDRX-
ShortCycle and so on. If the field is absent from the DRX-Preference IE, it is
interpreted as the UE having no preference for the short DRX cycle timer. A
preference for the short DRX cycle is indicated when a preference for the short
DRX cycle timer is indicated.
preferredK0
Indicates the UE's preferred value of k0 (slot offset between DCI and its
scheduled PDSCH - see TS 38.214 [19], clause 5.1.2.1) for cross-slot scheduling
for power saving. Value is defined for each subcarrier spacing (numerology) in
units of slots. sl1 corresponds to 1 slot, sl2 corresponds to 2 slots, sl4
corresponds to 4 slots, and so on. If a value for a subcarrier spacing is absent, it
is interpreted as the UE having no preference on k0 for cross-slot scheduling for
that subcarrier spacing. If the field is absent from the
MinSchedulingOffsetPreference IE, it is interpreted as the UE having no
preference on k0 for cross-slot scheduling.
preferredK2
Indicates the UE's preferred value of k2 (slot offset between DCI and its
scheduled PUSCH - see TS 38.214 [19], clause 6.1.2.1) for cross-slot scheduling
for power saving. Value is defined for each subcarrier spacing (numerology) in
units of slots. sl1 corresponds to 1 slot, sl2 corresponds to 2 slots, sl4
corresponds to 4 slots, and so on. If a value for a subcarrier spacing is absent, it
is interpreted as the UE having no preference on k2 for cross-slot scheduling for
that subcarrier spacing. If the field is absent from the
MinSchedulingOffsetPreference IE, it is interpreted as the UE having no
preference on k2 for cross-slot scheduling.
preferredRRC-State
Indicates the UE's preferred RRC state. The value idle is indicated if the UE
prefers to be released from RRC_CONNECTED and transition to RRC_IDLE.
The value inactive is indicated if the UE prefers to be released from

| UEAssistanceInformation field descriptions |
| --- |

RRC_CONNECTED and transition to RRC_INACTIVE. The value connected is
indicated if the UE prefers to revert an earlier indication to leave
RRC_CONNECTED state. The value outOfConnected is indicated if the UE
prefers to be released from RRC_CONNECTED and has no preferred RRC state
to transition to. The value connected can only be indicated if the UE is configured
with connectedReporting.
reducedBW-FR1
Indicates the UE's preference on reduced configuration corresponding to the
maximum aggregated bandwidth across all downlink carrier(s) and across all
uplink carrier(s) of FR1, to address overheating or power saving. This field is
allowed to be reported only when UE is configured with serving cell(s) operating
on FR1. The aggregated bandwidth across all downlink carrier(s) of FR1 is the
sum of bandwidth of active downlink BWP(s) across all activated downlink
carrier(s) of FR1. The aggregated bandwidth across all uplink carrier(s) of FR1 is
the sum of bandwidth of active uplink BWP(s) across all activated uplink carrier(s)
of FR1. If the field is absent from the MaxBW-Preference IE or the
OverheatingAssistance IE, it is interpreted as the UE having no preference on the
maximum aggregated bandwidth of FR1.
When indicated to address overheating, this maximum aggregated bandwidth
includes carrier(s) of FR1 of both the NR MCG and the SCG. This maximum
aggregated bandwidth only includes carriers of FR1 of the SCG in (NG)EN-DC.
Value mhz0 is not used when indicated to address overheating.
When indicated to address power saving, this maximum aggregated bandwidth
includes carrier(s) of FR1 of the cell group that this UE assistance information is
associated with. The aggregated bandwidth can only range up to the current
active configuration when indicated to address power savings.
reducedBW-FR2
Indicates the UE's preference on reduced configuration corresponding to the
maximum aggregated bandwidth across all downlink carrier(s) and across all
uplink carrier(s) of FR2, to address overheating or power saving. This field is
allowed to be reported only when UE is configured with serving cell(s) operating
on FR2. The aggregated bandwidth across all downlink carrier(s) of FR2 is the
sum of bandwidth of active downlink BWP(s) across all activated downlink
carrier(s) of FR2. The aggregated bandwidth across all uplink carrier(s) of FR2 is
the sum of bandwidth of active uplink BWP(s) across all activated uplink carrier(s)
of FR2. If the field is absent from the MaxBW-Preference IE or the
OverheatingAssistance IE, it is interpreted as the UE having no preference on the
maximum aggregated bandwidth of FR2.
When indicated to address overheating, this maximum aggregated bandwidth
includes carrier(s) of FR2 of both the NR MCG and the NR SCG. This maximum
aggregated bandwidth only includes carriers of FR2 of the SCG in (NG)EN-DC.
When indicated to address power saving, this maximum aggregated bandwidth
includes carrier(s) of FR2 of the cell group that this UE assistance information is
associated with. The aggregated bandwidth can only range up to the current
active configuration when indicated to address power savings.
reducedCCsDL
Indicates the UE's preference on reduced configuration corresponding to the
maximum number of downlink SCells indicated by the field, to address
overheating or power saving.
When indicated to address overheating, this maximum number includes both
SCells of the NR MCG and PSCell/SCells of the SCG. This maximum number
only includes PSCell/SCells of the SCG in (NG)EN-DC.
When indicated to address power saving, this maximum number includes
PSCell/SCells of the cell group that this UE assistance information is associated
with. The maximum number of downlink SCells can only range up to the current
active configuration when indicated to address power savings.
reducedCCsUL
Indicates the UE's preference on reduced configuration corresponding to the
maximum number of uplink SCells indicated by the field, to address overheating
or power saving.
When indicated to address overheating, this maximum number includes both
SCells of the NR MCG and PSCell/SCells of the SCG. This maximum number
only includes PSCell/SCells of the SCG in (NG)EN-DC.
When indicated to address power saving, this maximum number includes
PSCell/SCells of the cell group that this UE assistance information is associated
with. The maximum number of uplink SCells can only range up to the current
active configuration when indicated to address power savings.
reducedMIMO-LayersFR1-DL
Indicates the UE's preference on reduced configuration corresponding to the
maximum number of downlink MIMO layers of each serving cell operating on FR1
indicated by the field, to address overheating or power saving. This field is
allowed to be reported only when UE is configured with serving cells operating on
FR1. The maximum number of downlink MIMO layers can only range up to the
maximum number of MIMO layers configured across all activated downlink
carrier(s) of FR1 in the cell group when indicated to address power savings.
reducedMIMO-LayersFR1-UL
Indicates the UE's preference on reduced configuration corresponding to the

| UEAssistanceInformation field descriptions |
|---|
| maximum number of uplink MIMO layers of each serving cell operating on FR1 indicated by the field, to address overheating or power saving. This field is allowed to be reported only when UE is configured with serving cells operating on FR1. The maximum number of uplink MIMO layers can only range up to the maximum number of MIMO layers configured across all activated uplink carrier(s) of FR1 in the cell group when indicated to address power savings.<br>reducedMIMO-LayersFR2-DL<br>Indicates the UE's preference on reduced configuration corresponding to the maximum number of downlink MIMO layers of each serving cell operating on FR2 indicated by the field, to address overheating or power saving. This field is allowed to be reported only when UE is configured with serving cells operating on FR2. The maximum number of downlink MIMO layers can only range up to the maximum number of MIMO layers configured across all activated downlink carrier(s) of FR2 in the cell group when indicated to address power savings.<br>reducedMIMO-LayersFR2-UL<br>Indicates the UE's preference on reduced configuration corresponding to the maximum number of uplink MIMO layers of each serving cell operating on FR2 indicated by the field, to address overheating or power saving. This field is allowed to be reported only when UE is configured with serving cells operating on FR2. The maximum number of uplink MIMO layers can only range up to the maximum number of MIMO layers configured across all activated uplink carrier(s) of FR2 in the cell group when indicated to address power savings.<br>referenceTimeInfoPreference<br>Indicates whether the UE prefers being provisioned with the timing information specified in the IE ReferenceTimeInfo.<br>sl-QoS-FlowIdentity<br>This identity uniquely identifies one sidelink QoS flow between the UE and the network in the scope of UE, which is unique for different destination and cast type.<br>sl-UE-AssistanceInformationNR<br>indicates the traffic characteristic of sidelink logical channel(s) that are setup for NR sidelink communication,<br>timingOffset<br>This field indicates the estimated timing for a packet arrival in a SL logical channel. Specifically, the value indicates the timing offset with respect to subframe#0 of SFN#0 in milliseconds.<br>trafficPeriodicity<br>This field indicates the estimated data arrival periodicity in a SL logical channel. Value ms20 corresponds to 20 ms, ms50 corresponds to 50 ms and so on.<br>type1<br>Indicates the preferred amount of increment/decrement to the long DRX cycle length with respect to the current configuration. Value in number of milliseconds. Value ms40 corresponds to 40 milliseconds, msMinus40 corresponds to −40 milliseconds and so on.<br>victimSystemType<br>Indicate the list of victim system types to which IDC interference is caused from NR when configured with UL CA. Value gps, glonass, bds, galileo and navIC indicates the type of GNSS. Value wlan indicates WLAN and value bluetooth indicates Bluetooth. |

RRCReconfigurationComplete Sent to Target SN:

In this option the MN generates the RRC message, e.g. RRCReconfiguration, containing the condition(s) which the UE should monitor and the message to be applied when the condition(s) are fulfilled. The RRC message also contains a reconfiguration of the current MN configuration. In this option there are no restrictions on what the MN is allowed to reconfigure and the MN also does not have to monitor several configurations. Instead the UE sends an RRCReconfigurationComplete to the target SN when the condition(s) are fulfilled. The RRCReconfiguraitonComplete to the SN is a response to the RRCReconfiguration** created by the SN, but it also contains an embedded RRCReconfiguraitonComplete message to the MN. The RRCReconfigurationComplete message is forwarded to the MN, which then reconfigures to the new configuration.

Figure 13:
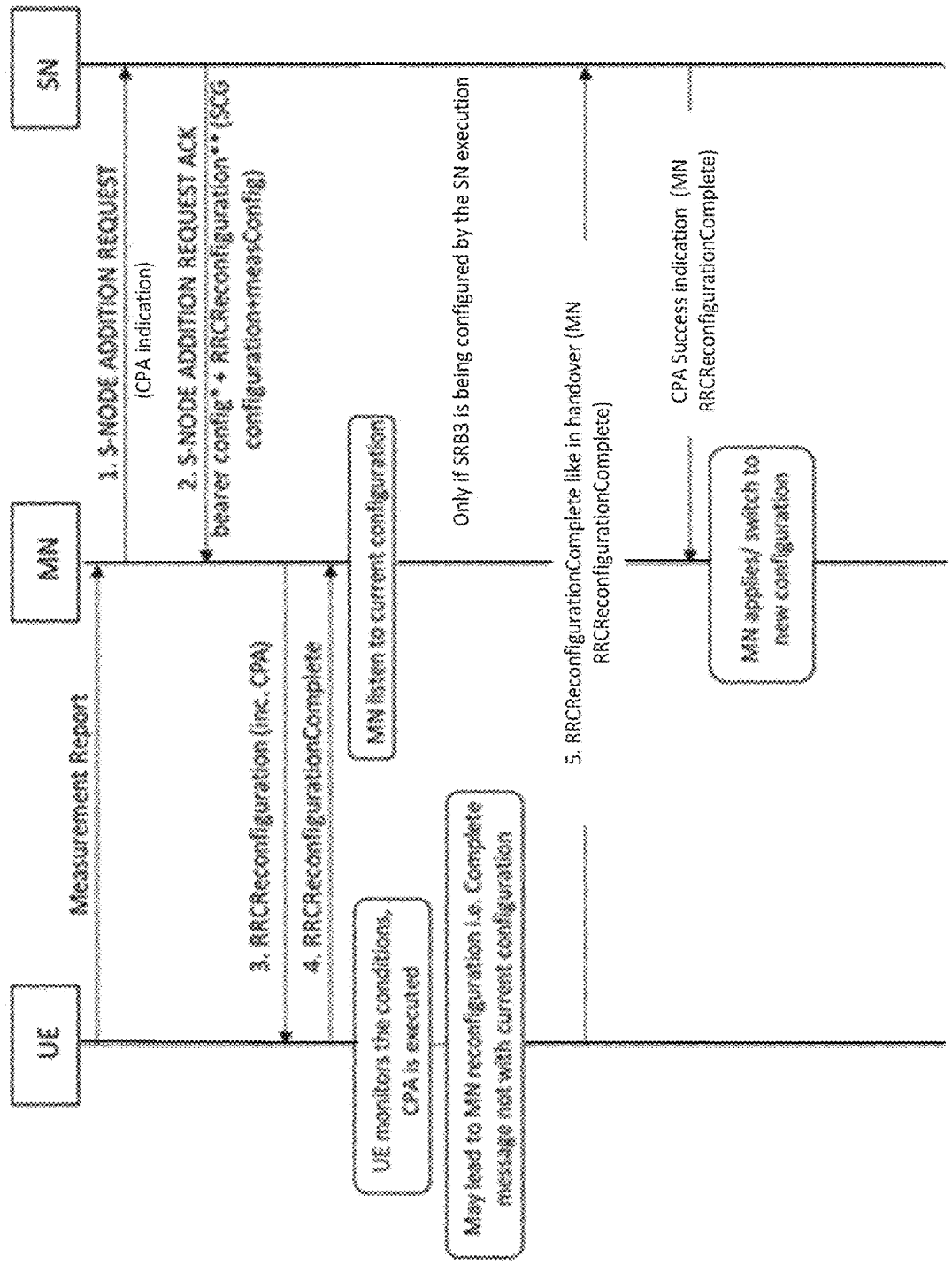
FIG. 13 illustrates RRCReconfigurationComplete sent to target SN in accordance with some embodiments.

FIG. 13 illustrates RRCReconfigurationComplete sent to target SN in accordance with some embodiments.

Some embodiments are directed to operations and method executed by a Master Node (MN), which include any one or more of the following:

1. Determine to configure CPAC;
2. Transmit a request to a Secondary Node (MN) to prepare a conditional SN addition (CPA);
3. Receive from the SN a response to the conditional SN addition request confirming that a UE may be accepted unless a canceling message is later received;
4. Transmit an RRC message, e.g. RRCReconfiguration, to the UE containing CPAC configurations for one or multiple candidate target cells. The RRC message contains the condition(s) which the UE should monitor and the message to be applied when the condition(s) are fulfilled; The message to be applied includes the SN configuration and it may contain reconfiguration of the current MN configuration;
5. Receive an RRCReconfigurationComplete message from a target SN and reconfiguring to the new configuration upon reception of the message. The RRCReconfigurationComplete may be included in an RRC TRANSFER message, such as according to the example implementation below.

Figure 22:
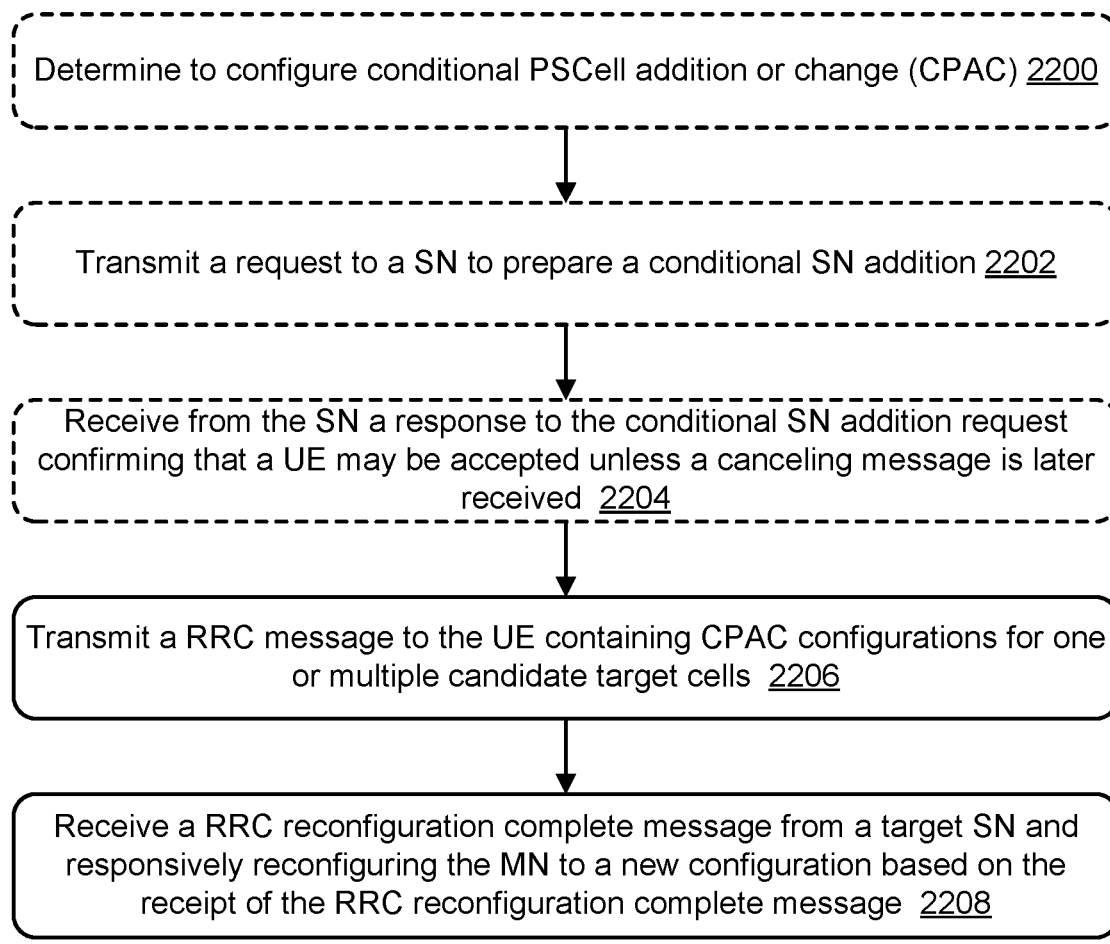
FIG. 22 is a flowchart of methods of operating a master node (MN) in a wireless communication network in accordance with some embodiments.

FIG. 22 is a flowchart of a corresponding method of operating a master node (MN) in a wireless communication network in accordance with some embodiments. Referring to FIG. 22, the method may include determining (2200) to configure conditional PSCell addition or change (CPAC), transmitting (2202) a request to a secondary node (SN) to prepare a conditional SN addition, and receiving (2204) from the SN a response to the conditional SN addition request confirming that a UE may be accepted unless a canceling message is later received. The steps 2200-2204 are optional. The method may further include transmitting (2206) a radio resource control (RRC) message to the UE containing CPAC configurations for one or multiple candidate target cells, where the RRC message contains at least one condition which the UE should monitor and message to be applied when the at least one condition is fulfilled, and where the message to be applied includes a SN configuration. The method further includes receiving (2206) a RRC reconfiguration complete message from a target SN and responsively reconfiguring the MN to a new configuration based on the receipt of the RRC reconfiguration complete message.

In a further embodiment, the reconfiguring (2206) of the MN comprises reconfiguring the MN from a current MN configuration to the SN configuration.

Some embodiments are directed to operations and method executed by a user equipment (UE), which include any one or more of the following:
1. Receive an RRC message, e.g. RRC Reconfiguration, from the network containing CPAC configurations for one or multiple candidate target cells. The RRC message contains the condition(s) which the UE should monitor and the message to be applied when the condition(s) are fulfilled; The message to be applied includes the SN configuration and it may contain reconfiguration of the current MN configuration;
2. Transmit an RRCReconfigurationComplete message to a target SN when condition(s) have been fulfilled.

Figure 23:
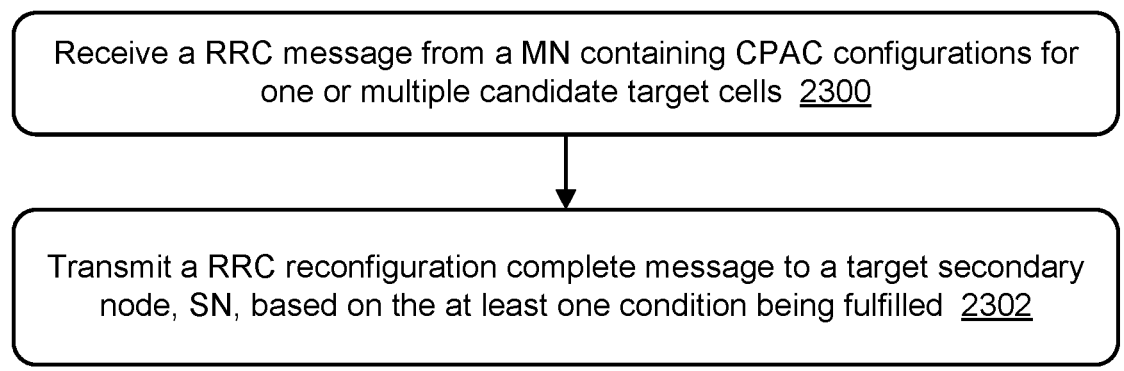
FIG. 23 is a flowchart of a corresponding method of operating a UE in a wireless communication network in accordance with some embodiments.

FIG. 23 is a flowchart of a corresponding method of operating a UE in a wireless communication network in accordance with some embodiments. Referring to FIG. 23, the method includes receiving (2300) a radio resource control (RRC) message from a MN containing CPAC configurations for one or multiple candidate target cells, where the RRC message contains at least one condition which the UE should monitor and message to be applied when the at least one condition is fulfilled, and where the message to be applied includes a SN configuration. The method further includes transmitting (2302) a RRC reconfiguration complete message to a target secondary node (SN) based on the at least one condition being fulfilled.

An example implementation of some of these embodiments are explained below in the context of 3GPP TS 38.423.

RRC Transfer:

This message is sent by the M-NG-RAN-NODE to the S-NG-RAN-NODE to transfer an RRC message or from the S-NG-RAN-NODE to the M-NG-RAN-NODE to report the DL RRC message delivery status.

Direction: M-NG-RAN node→S-NG-RAN node or S-NG-RAN node→M-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | M | | NG-RAN node UE XnAP ID 9.2.3.16 | Allocated at the S-NG-RAN node | YES | reject |
| Split SRB | | 0...1 | | | YES | reject |
| >RRC Container | O | | OCTET STRING | Contains a PDCP-C PDU encapsulating an RRC message as defined in subclause 6.2.1 of TS 38.331 [10] or TS 36.331 [14] and ciphered with the key of the M-NG-RAN node | — | |
| >SRB Type | M | | ENUMERATED (srb1, srb2, . . .) | The SRB type to be used | — | |
| >Delivery Status | O | | 9.2.3.45 | DL RRC delivery status of split SRB | — | |
| UE Report | | 0...1 | | | YES | reject |
| >RRC Container | M | | OCTET STRING | For NGEN-DC and NR-DC, includes the UL-DCCH-Message as defined in subclause 6.2.1 of TS 38.331 [10] containing the MeasurementReport message or the FailureInformation message or the | — | |

| IE/Group Name | Presence | Range | IE type and reference | Semantics description | Criticality | Assigned Criticality |
|---|---|---|---|---|---|---|
| | | | | UEAssistanceInformation message or the RRCReconfigurationComplete message. For NE-DC, includes the UL-DCCH-Message as defined in subclause 6.2.1 of TS 36.331 [14] containing the MeasurementReport message. | | |
| Fast MCG Recovery via SRB3 from SN to MN | | 0 . . . 1 | | | YES | ignore |
| >RRC Container | M | | OCTET STRING | For NR-DC, includes the UL-DCCH-Message as defined in subclause 6.2.1 of TS 38.331 [10] containing the MCGFailureInformation, message. For NGEN-DC, includes the UL-DCCH-Message as defined in subclause 6.2.1 of TS 36.331 [14] containing the MCGFailureInformation message. | — | |
| Fast MCG Recovery via SRB3 from MN to SN | | 0 . . . 1 | | | YES | ignore |
| >RRC Container | M | | OCTET STRING | For NR-DC, includes the DL-DCCH-Message as defined in subclause 6.2.1 of TS 38.331 [10] containing the RRCReconfiguration message, or the RRCRelease message, or the MobilityFromNRCommand message. For NGEN-DC, includes the DL-DCCH-Message as defined in subclause 6.2.1 of TS 36.331 [14] containing the RRCConnectionReconfiguration message, or the RRCConnectionRelease message, or the MobilityFromEUTRACommand message. | — | |

RRCReconfigurationComplete Sent on Old Configuration:

In this option the MN generates the RRC message, e.g. RRCReconfiguration, containing the condition(s) which the UE should monitor and the message to be applied when the condition(s) are fulfilled. The RRC message also contains a reconfiguration of the current MN configuration. In this option the UE sends an RRCReconfigurationComplete on the old configuration when the condition(s) are fulfilled. Sending of RRCReconfigurationComplete message is also described in P79944, but for a different use case. After RRCReconfigurationComplete has been sent, the UE and the network reconfigures to the new configuration.

Figure 14:
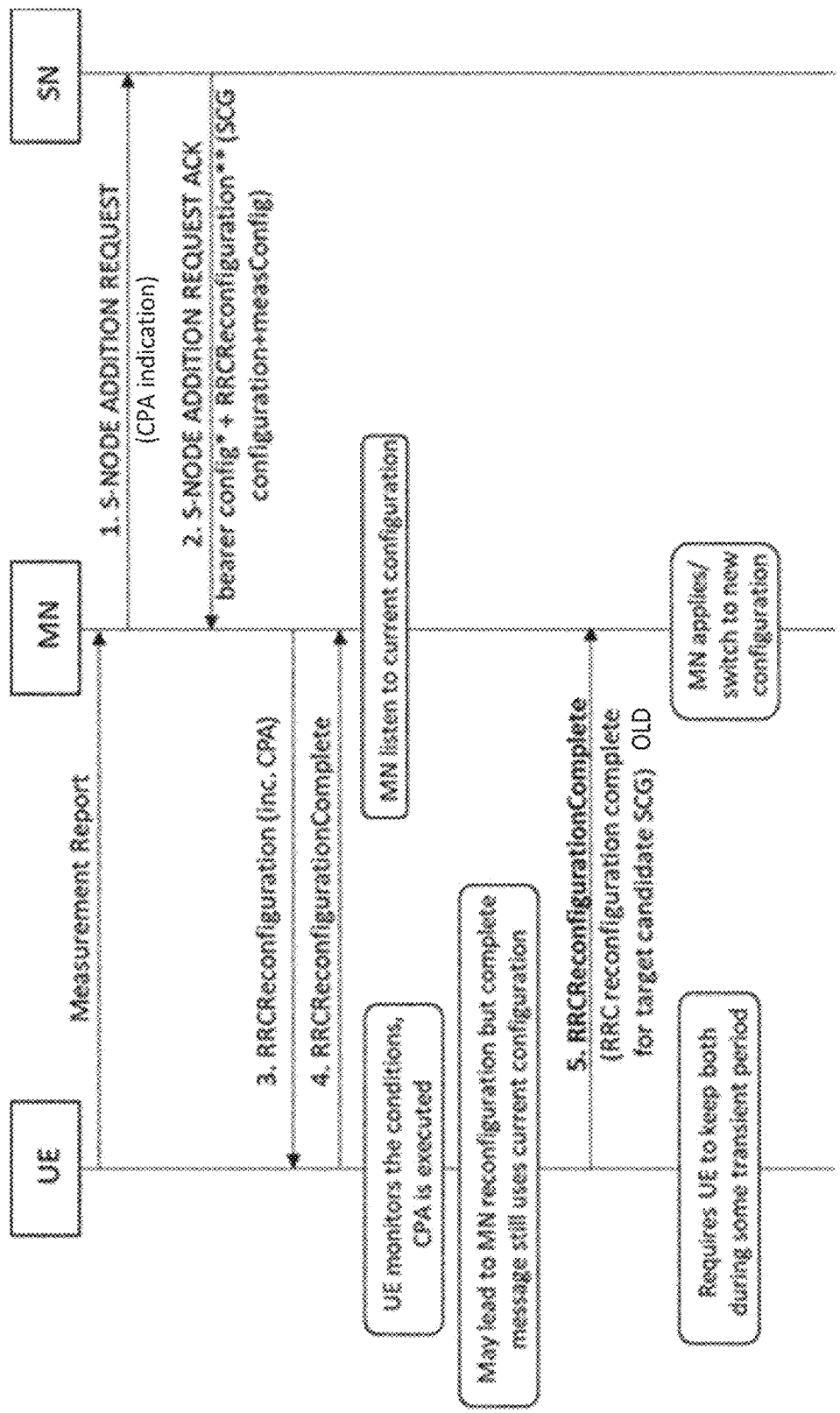
FIG. 14 illustrates RRCReconfigurationComplete sent on old configuration in accordance with some embodiments of the present disclosure.

FIG. 14 illustrates RRCReconfigurationComplete sent on old configuration in accordance with some embodiments of the present disclosure.

Some embodiments are directed to operations and method executed by a master node (MN), which include any one or more of the following:

1. Determine to configure CPAC;
2. Transmit a request to a Secondary Node (MN) to prepare a conditional SN addition (CPA);
3. Receive from the SN a response to the conditional SN addition request confirming that a UE may be accepted unless a canceling message is later received;

4. Transmit an RRC message, e.g. RRCReconfiguration, to the UE containing CPAC configurations for one or multiple candidate target cells. The RRC message contains the condition(s) which the UE should monitor and the message to be applied when the condition(s) are fulfilled; The message to be applied includes the SN configuration and it may contain reconfiguration of the current MN configuration;
 5. Receive an RRCReconfigurationComplete message from the UE on the old configuration. Reconfiguring to the new configuration upon reception of the RRCReconfigurationComplete.

Figure 24:
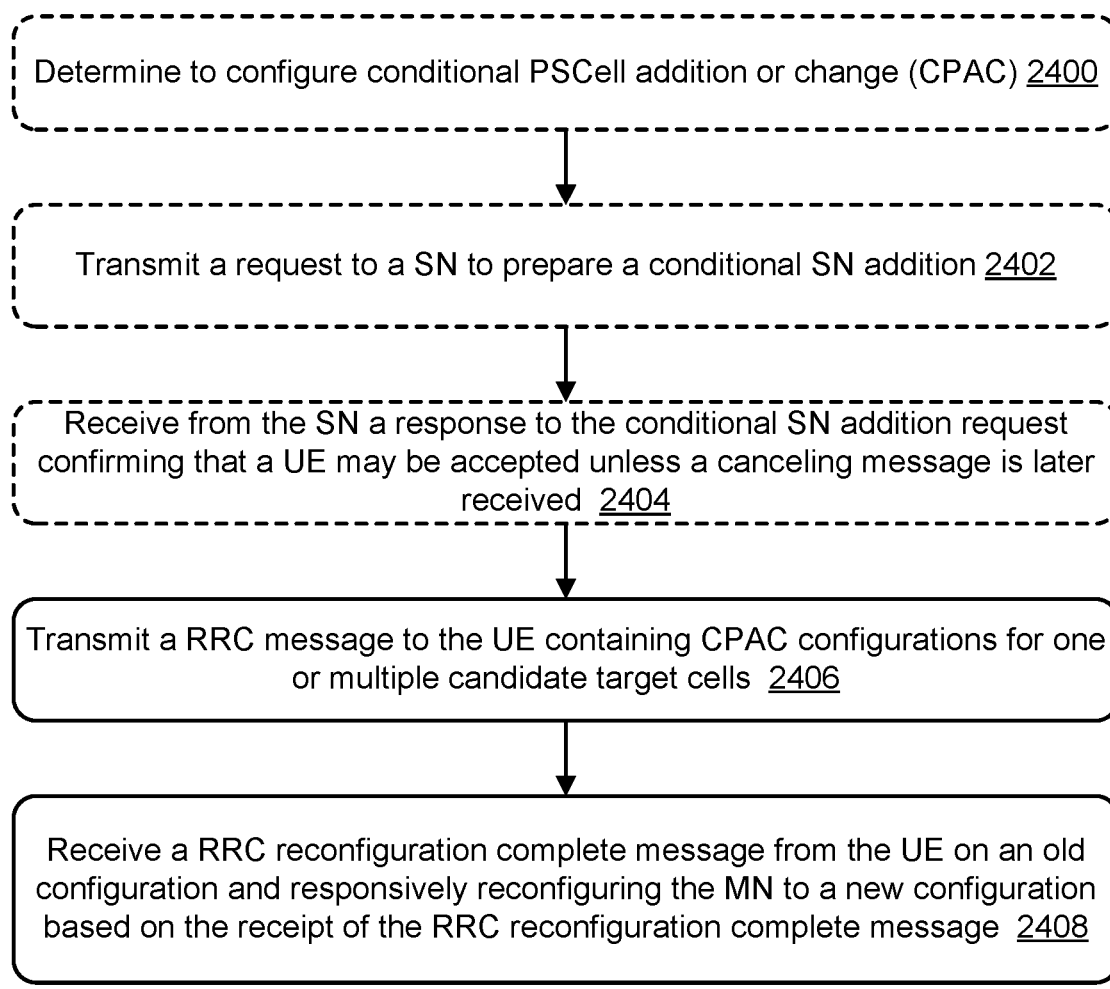
FIG. 24 is a flowchart of a corresponding method of operating a master node (MN) in a wireless communication network in accordance with some embodiments.

FIG. 24 is a flowchart of a corresponding method of operating a master node (MN) in a wireless communication network in accordance with some embodiments. Referring to FIG. 24, the method may include determining (2400) to configure conditional PSCell addition or change (CPAC), transmitting (2402) a request to a secondary node (SN) to prepare a conditional SN addition, and receiving (2404) from the SN a response to the conditional SN addition request confirming that a UE may be accepted unless a canceling message is later received. The steps 2400-2404 are optional. The method further includes transmitting (2406) a radio resource control (RRC) message to the UE containing CPAC configurations for one or multiple candidate target cells, where the RRC message contains at least one condition which the UE should monitor and message to be applied when the at least one condition is fulfilled, and where the message to be applied includes a SN configuration. The method further includes receiving (2408) a RRC reconfiguration complete message from the UE on an old configuration and responsively reconfiguring the MN from to a new configuration based on the receipt of the RRC reconfiguration complete message.

Some other embodiments are directed to operations and method executed by a user equipment (UE), which include any one or more of the following:
 1. Receive an RRC message, e.g. RRCReconfiguration, from the network containing CPAC configurations for one or multiple candidate target cells. The RRC message contains the condition(s) which the UE should monitor and the message to be applied when the condition(s) are fulfilled; The message to be applied includes the SN configuration and it may contain reconfiguration of the current MN configuration;
 2. Transmit an RRCReconfigurationComplete message to the network on the old configuration. Reconfiguring to the new configuration. In one solution, waiting a period of time and then performing the reconfiguration to the new MN configuration. The time (network processing time) may have been configured earlier, e.g. in RRCReconfiguration or in system information or a maximum value for network processing time may have been specified. In an alternative embodiment, monitoring of two configurations for a period of time.

Figure 25:
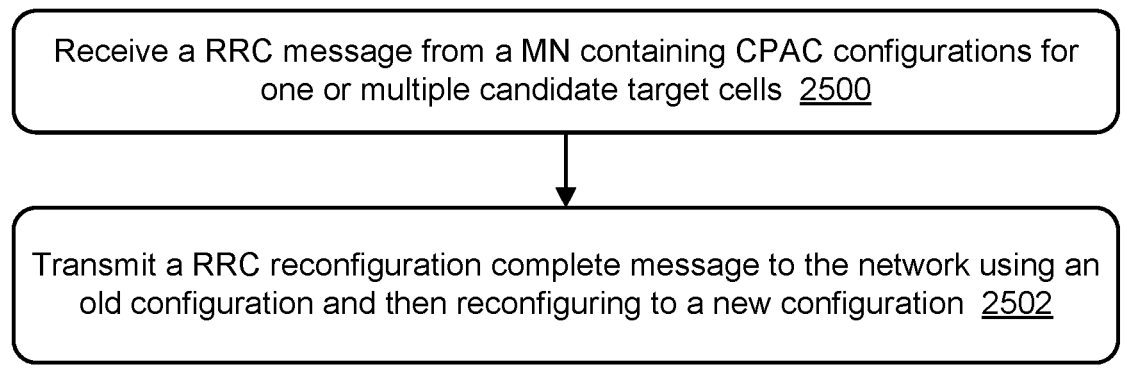
FIG. 25 is a flowchart of a corresponding method of operating a UE in a wireless communication network in accordance with some embodiments.

FIG. 25 is a flowchart of a corresponding method of operating a UE in a wireless communication network in accordance with some embodiments. Referring to FIG. 25, the method includes receiving (2500) a radio resource control (RRC) message from the network containing CPAC configurations for one or multiple candidate target cells, where the RRC message contains at least one condition which the UE should monitor and message to be applied when the at least one condition is fulfilled, and where the message to be applied includes a SN configuration. The method further includes transmitting (2502) a reconfiguration complete message to the network using an old configuration and then reconfiguring to a new configuration. The transmitting (2502) may be based on the at least one condition being fulfilled.

RRCReconfigurationComplete Sent on Old Configuration with an Embedded RRCReconfigurationComplete on New Configuration:

In some other embodiments, the MN generates the RRC message, e.g. RRCReconfiguration, containing the condition(s) which the UE should monitor and the message to be applied when the condition(s) are fulfilled. The RRC message also contains a reconfiguration of the current MN configuration. In this option the UE sends an RRCReconfigurationComplete on the old configuration when the condition(s) are fulfilled. The RRCReconfigurationComplete message on the old configuration contains an embedded RRCReconfigurationComplete message on the new configuration. This is also described in P79944, but for a different use case. After RRCReconfigurationComplete has been received, the network and the UE reconfigures to the new configuration.

FIG. 14 may also illustrate RRCReconfigurationComplete sent on old configuration with an embedded RRCReconfigurationComplete on new configuration in accordance with some embodiments of the present disclosure.

Some embodiments are directed to operations and method executed by a master node (MN), which include any one or more of the following:
 1. Determine to configure CPAC;
 2. Transmit a request to a Secondary Node (MN) to prepare a conditional SN addition (CPA);
 3. Receive from the SN a response to the conditional SN addition request confirming that a UE may be accepted unless a canceling message is later received;
 4. Transmit an RRC message, e.g. RRCReconfiguration, to the UE containing CPAC configurations for one or multiple candidate target cells. The RRC message contains the condition(s) which the UE should monitor and the message to be applied when the condition(s) are fulfilled; The message to be applied includes the SN configuration and it may contain reconfiguration of the current MN configuration;
 5. Receive an RRCReconfigurationComplete message from the UE on the old configuration with an embedded RRCReconfigurationComplete on the new configuration. Reconfiguring to the new configuration upon reception of the RRCReconfigurationComplete.

Accordingly, referring again to step 2408 in FIG. 24, in one embodiment the RRC reconfiguration complete message received from the UE on the old configuration contains an embedded RRC reconfiguration complete on the new configuration.

Some other embodiments are directed to operations and method executed by a user equipment (UE), which include any one or more of the following:
 1. Receive an RRC message, e.g. RRCReconfiguration, from the network containing CPAC configurations for one or multiple candidate target cells. The RRC message contains the condition(s) which the UE should monitor and the message to be applied when the condition(s) are fulfilled; The message to be applied includes the SN configuration and it may contain reconfiguration of the current MN configuration;
 2. Transmitting an RRCReconfigurationComplete message to the network on the old configuration with an embedded RRCReconfigurationComplete on the new configuration. Reconfiguring to the new configuration upon transmission of the RRCReconfigurationComplete.

Accordingly, referring again to step 2502 in FIG. 25, in one embodiment the RRC reconfiguration complete message received from the UE on the old configuration contains an embedded RRC reconfiguration complete on the new configuration.

Example embodiments are discussed below.

Embodiment 1. A method of operating a master node, MN, in a wireless communication network, the method comprising:
- determining (1500) to configure conditional PSCell addition or change, CPAC;
- transmitting (1502) a request to a secondary node, SN, to prepare a conditional SN addition;
- receiving (1504) from the SN a response to the conditional SN addition request confirming that a user equipment, UE, may be accepted unless a canceling message is later received;
- transmitting (1506) a radio resource control, RRC, message to the UE containing CPAC configurations for one or multiple candidate target cells, wherein the RRC message contains at least one condition which the UE should monitor and message to be applied when the at least one condition is fulfilled;
- monitoring (1508) multiple MN or master cell group, MCG, related configurations for reception of messages from the UE;
- receiving (1510) a message from the UE on one of the multiple MN or MCG related configurations that have been monitored; and
- detecting (1512) which one of the multiple MN or MCG related configurations the UE has applied and responsively reconfiguring the MN based on the detected one of the multiple MN or MCG related configurations.

Embodiment 2. The method of Embodiment 1, further comprising:
- receiving an indication from the UE indicating which one of the multiple MN or MCG related configurations the UE has applied, and
- wherein the detecting (1512) of which one of the multiple MN or MCG related configurations the UE has applied is performed based on the indication from the UE.

Embodiment 3. The method of Embodiment 2, wherein the indication from the UE identifies a conditional reconfiguration ID or a target cell.

Embodiment 4. The method of any of Embodiments 1 to 3, wherein one of the multiple MN or MCG related configurations monitored by the MN corresponds to a configuration according to a latest RRCReconfiguration the MN is aware the UE has applied, and another one of the multiple MN or MCG related configurations monitored by the MN corresponds to a configuration that the UE will apply when an execution condition is fulfilled and RRCReconfiguration* is applied.

Embodiment 5. The method of Embodiment 4, wherein the other one of the multiple MN or MCG related configurations monitored by the MN corresponds to a second MN or MCG related configuration.

Embodiment 6. The method of any of Embodiments 1 to 5, wherein:
- the RRC message to be applied is a reconfiguration of the current MN or MCG configuration and the SN configuration, and possible MN reconfigurations are restricted so that the MN can understand messages from the UE received both on an old and new configuration.

Embodiment 7. A method of operating a master node, MN, in a wireless communication network, the method comprising:
- determining (1600) to configure conditional PSCell addition or change, CPAC;
- transmitting (1602) a request to a secondary node, SN, to prepare a conditional SN addition;
- receiving (1604) from the SN a response to the conditional SN addition request confirming that a user equipment, UE, may be accepted unless a canceling message is later received;
- transmitting (1606) a radio resource control, RRC, message to the UE containing CPAC configurations for one or multiple candidate target cells, wherein the RRC message contains at least one condition which the UE should monitor and message to be applied when the at least one condition is fulfilled; and
- receiving (1608) a heads-up indication from the UE on a last applied configuration indicating that the at least one condition has been fulfilled for reconfiguring to a new configuration.

Embodiment 8. The method of Embodiment 7, further comprising:
- transmitting (1700) to the UE a confirmation that the heads-up message has been received and that the UE may go-ahead with reconfiguring to the new configuration; and
- receiving (1702) a message from the UE confirming that the reconfiguring to the new configuration is completed.

Embodiment 9. The method of Embodiment 7, further comprising:
- performing (1800) reconfiguration to the new configuration responsive to receipt of the heads-up indication.

Embodiment 10. A method of operating a user equipment, UE, in a wireless communication network, the method comprising:
- receiving (1900) a radio resource control, RRC, message from a master node, MN, containing conditional PSCell addition or change, CPAC, configurations for one or multiple candidate target cells, wherein the RRC message contains at least one condition which the UE should monitor and message to be applied when the at least one condition is fulfilled; and
- transmitting (1902) a heads-up indication to the MN on a last applied configuration indicating that the at least one condition has been fulfilled for reconfiguring to a new configuration.

Embodiment 11. The method of Embodiment 10, further comprising:
- receiving (2000) from the MN a confirmation that the heads-up message has been received and that the UE may go-ahead with reconfiguring to the new configuration; and
- transmitting (2002) a message to the MN confirming that the reconfiguring to the new configuration is completed.

Embodiment 12. The method of Embodiment 10, further comprising:
- performing (2100) reconfiguration to the new configuration responsive to expiration of a threshold time since the transmission (1902) of the heads-up indication.

Embodiment 13. A method of operating a master node, MN, in a wireless communication network, the method comprising:
- determining (2200) to configure conditional PSCell addition or change, CPAC;
- transmitting (2202) a request to a secondary node, SN, to prepare a conditional SN addition;
- receiving (2204) from the SN a response to the conditional SN addition request confirming that a user equipment, UE, may be accepted unless a canceling message is later received;
- transmitting (2206) a radio resource control, RRC, message to the UE containing CPAC configurations for one or multiple candidate target cells, wherein the RRC message contains at least one condition which the UE should monitor and message to be applied when the at least one condition is fulfilled, and wherein the message to be applied includes a SN configuration;
- receiving (2206) a RRC reconfiguration complete message from a target SN and responsively reconfiguring the MN to a new configuration based on the receipt of the RRC reconfiguration complete message.

Embodiment 14. The method of Embodiment 13, wherein:
- the reconfiguring (2206) of the MN comprises reconfiguring the MN from a current MN configuration to the SN configuration.

Embodiment 15. A method of operating a user equipment, UE, in a wireless communication network, the method comprising:
- receiving (2300) a radio resource control, RRC, message from a master node, MN, containing conditional PSCell addition or change, CPAC, configurations for one or multiple candidate target cells, wherein the RRC message contains at least one condition which the UE should monitor and message to be applied when the at least one condition is fulfilled, and wherein the message to be applied includes a SN configuration; and
- transmitting (2302) a RRC reconfiguration complete message to a target secondary node, SN, based on the at least one condition being fulfilled.

Embodiment 16. A method of operating a master node, MN, in a wireless communication network, the method comprising:
- determining (2400) to configure conditional PSCell addition or change, CPAC;
- transmitting (2402) a request to a secondary node, SN, to prepare a conditional SN addition;
- receiving (2404) from the SN a response to the conditional SN addition request confirming that a user equipment, UE, may be accepted unless a canceling message is later received;
- transmitting (2406) a radio resource control, RRC, message to the UE containing CPAC configurations for one or multiple candidate target cells, wherein the RRC message contains at least one condition which the UE should monitor and message to be applied when the at least one condition is fulfilled, and wherein the message to be applied includes a SN configuration; and
- receiving (2408) a RRC reconfiguration complete message from the UE on an old configuration and responsively reconfiguring the MN to a new configuration based on the receipt of the RRC reconfiguration complete message.

Embodiment 17. The method of Embodiment 16, wherein the RRC reconfiguration complete message received from the UE on the old configuration contains an embedded RRC reconfiguration complete on the new configuration.

Embodiment 18. A method of operating a user equipment, UE, in a wireless communication network, the method comprising:
- receiving (2500) a radio resource control, RRC, message from the network containing conditional PSCell addition or change, CPAC, configurations for one or multiple candidate target cells, wherein the RRC message contains at least one condition which the UE should monitor and message to be applied when the at least one condition is fulfilled, and wherein the message to be applied includes a SN configuration; and
- transmitting (2502) a RRC reconfiguration complete message to the network using an old configuration and then reconfiguring to a new configuration.

Embodiment 19. The method of Embodiment 18, wherein the RRC reconfiguration complete message transmitted to the network using the old configuration contains an embedded RRC reconfiguration complete on the new configuration.

Embodiment 20. A master node (900, 1000) in a wireless communication network, the master node comprising:
- processing circuitry (903, 1003); and
- memory (905, 1005) coupled to the processing circuitry and having instructions stored therein that are executable by the processing circuitry to cause the master node to perform operations comprising:
  - determining (1500) to configure conditional PSCell addition or change, CPAC;
  - transmitting (1502) a request to a secondary node, SN, to prepare a conditional SN addition;
  - receiving (1504) from the SN a response to the conditional SN addition request confirming that a user equipment, UE, may be accepted unless a canceling message is later received;
  - transmitting (1506) a radio resource control, RRC, message to the UE containing CPAC configurations for one or multiple candidate target cells, wherein the RRC message contains at least one condition which the UE should monitor and message to be applied when the at least one condition is fulfilled;
  - monitoring (1508) multiple MN or master cell group, MCG, related configurations for reception of messages from the UE;
  - receiving (1510) a message from the UE on one of the multiple MN or MCG related configurations that have been monitored; and
  - detecting (1512) which one of the multiple MN or MCG related configurations the UE has applied and responsively reconfiguring the MN based on the detected one of the multiple MN or MCG related configurations.

Embodiment 21. The master node of Embodiment 20, the operations further comprising any of the operations of Embodiments 2 to 6.

Embodiment 22. A master node (900, 1000) in a wireless communication network, the master node adapted to perform operations comprising:
- determining (1500) to configure conditional PSCell addition or change, CPAC;
- transmitting (1502) a request to a secondary node, SN, to prepare a conditional SN addition;
- receiving (1504) from the SN a response to the conditional SN addition request confirming that a user equipment, UE, may be accepted unless a canceling message is later received;

transmitting (1506) a radio resource control, RRC, message to the UE containing CPAC configurations for one or multiple candidate target cells, wherein the RRC message contains at least one condition which the UE should monitor and message to be applied when the at least one condition is fulfilled;

monitoring (1508) multiple MN or master cell group, MCG, related configurations for reception of messages from the UE;

receiving (1510) a message from the UE on one of the multiple MN or MCG related configurations that have been monitored; and detecting (1512) which one of the multiple MN or MCG related configurations the UE has applied and responsively reconfiguring the MN based on the detected one of the multiple MN or MCG related configurations.

Embodiment 23. The master node of Embodiment 22, wherein the master node is further adapted to perform any of the operations of Embodiments 2 to 6.

Embodiment 24. A computer program product comprising a non-transitory storage medium including program code to be executed by processing circuitry (903, 1003) of a master node (900, 1000) operating in a wireless communication network, whereby execution of the program code causes the UE to perform operations, the operations comprising:

determining (1500) to configure conditional PSCell addition or change, CPAC;

transmitting (1502) a request to a secondary node, SN, to prepare a conditional SN addition;

receiving (1504) from the SN a response to the conditional SN addition request confirming that a user equipment, UE, may be accepted unless a canceling message is later received;

transmitting (1506) a radio resource control, RRC, message to the UE containing CPAC configurations for one or multiple candidate target cells, wherein the RRC message contains at least one condition which the UE should monitor and message to be applied when the at least one condition is fulfilled;

monitoring (1508) multiple MN or master cell group, MCG, related configurations for reception of messages from the UE;

receiving (1510) a message from the UE on one of the multiple MN or MCG related configurations that have been monitored; and detecting (1512) which one of the multiple MN or MCG related configurations the UE has applied and responsively reconfiguring the MN based on the detected one of the multiple MN or MCG related configurations.

Embodiment 25. The computer program of Embodiment 24, the operations further comprising any of the operations of Embodiments 2 to 6.

Embodiment 26. A master node (900, 1000) in a wireless communication network, the master node comprising:

processing circuitry (903, 1003); and memory (905, 1005) coupled to the processing circuitry and having instructions stored therein that are executable by the processing circuitry to cause the master node to perform operations comprising:

determining (1600) to configure conditional PSCell addition or change, CPAC;

transmitting (1602) a request to a secondary node, SN, to prepare a conditional SN addition;

receiving (1604) from the SN a response to the conditional SN addition request confirming that a user equipment, UE, may be accepted unless a canceling message is later received;

transmitting (1606) a radio resource control, RRC, message to the UE containing CPAC configurations for one or multiple candidate target cells, wherein the RRC message contains at least one condition which the UE should monitor and message to be applied when the at least one condition is fulfilled; and receiving (1608) a heads-up indication from the UE on a last applied configuration indicating that the at least one condition has been fulfilled for reconfiguring to a new configuration.

Embodiment 27. The network node of Embodiment 26, the operations further comprising any of the operations of Embodiments 8 to 9.

Embodiment 28. A master node (900, 1000) in a wireless communication network, the master node adapted to perform operations comprising:

determining (1600) to configure conditional PSCell addition or change, CPAC;

transmitting (1602) a request to a secondary node, SN, to prepare a conditional SN addition;

receiving (1604) from the SN a response to the conditional SN addition request confirming that a user equipment, UE, may be accepted unless a canceling message is later received;

transmitting (1606) a radio resource control, RRC, message to the UE containing CPAC configurations for one or multiple candidate target cells, wherein the RRC message contains at least one condition which the UE should monitor and message to be applied when the at least one condition is fulfilled; and receiving (1608) a heads-up indication from the UE on a last applied configuration indicating that the at least one condition has been fulfilled for reconfiguring to a new configuration.

Embodiment 29. The master node of Embodiment 28, wherein the master node is further adapted to perform any of the operations of Embodiments 8 to 9.

Embodiment 30. A computer program product comprising a non-transitory storage medium including program code to be executed by processing circuitry (903, 1003) of a master node (900, 1000) operating in a wireless communication network, whereby execution of the program code causes the UE to perform operations, the operations comprising:

determining (1600) to configure conditional PSCell addition or change, CPAC;

transmitting (1602) a request to a secondary node, SN, to prepare a conditional SN addition;

receiving (1604) from the SN a response to the conditional SN addition request confirming that a user equipment, UE, may be accepted unless a canceling message is later received;

transmitting (1606) a radio resource control, RRC, message to the UE containing CPAC configurations for one or multiple candidate target cells, wherein the RRC message contains at least one condition which the UE should monitor and message to be applied when the at least one condition is fulfilled; and receiving (1608) a heads-up indication from the UE on a last applied configuration indicating that the at least one condition has been fulfilled for reconfiguring to a new configuration.

Embodiment 31. The computer program of Embodiment 30, the operations further comprising any of the operations of Embodiments 8 to 9.

Embodiment 32. A user equipment, UE, (800) in a wireless communication network, the UE comprising:
processing circuitry (803); and
memory (805) coupled to the processing circuitry and having instructions stored therein that are executable by the processing circuitry to cause the UE to perform operations comprising:
receiving (1900) a radio resource control, RRC, message from a master node, MN, containing conditional PSCell addition or change, CPAC, configurations for one or multiple candidate target cells, wherein the RRC message contains at least one condition which the UE should monitor and message to be applied when the at least one condition is fulfilled; and
transmitting (1902) a heads-up indication to the MN on a last applied configuration indicating that the at least one condition has been fulfilled for reconfiguring to a new configuration.

Embodiment 33. The UE of Embodiment 32, wherein the operations further comprise any of the operations of Embodiments 11 to 12.

Embodiment 34. A user equipment, UE, (800) in a wireless communication network, the UE adapted to perform operations comprising:
receiving (1900) a radio resource control, RRC, message from a master node, MN, containing conditional PSCell addition or change, CPAC, configurations for one or multiple candidate target cells, wherein the RRC message contains at least one condition which the UE should monitor and message to be applied when the at least one condition is fulfilled; and
transmitting (1902) a heads-up indication to the MN on a last applied configuration indicating that the at least one condition has been fulfilled for reconfiguring to a new configuration.

Embodiment 35. The UE of Embodiment 34, wherein the UE is further adapted to perform any of the operations of Embodiments 11 to 12.

Embodiment 36. A computer program product comprising a non-transitory storage medium including program code to be executed by processing circuitry (803) of a user equipment, UE, (800) operating in a wireless communication network, whereby execution of the program code causes the UE to perform operations, the operations comprising:
receiving (1900) a radio resource control, RRC, message from a master node, MN, containing conditional PSCell addition or change, CPAC, configurations for one or multiple candidate target cells, wherein the RRC message contains at least one condition which the UE should monitor and message to be applied when the at least one condition is fulfilled; and
transmitting (1902) a heads-up indication to the MN on a last applied configuration indicating that the at least one condition has been fulfilled for reconfiguring to a new configuration.

Embodiment 37. The computer program product of Embodiment 36, the operations further comprising any of the operations of Embodiments 11 to 12.

Embodiment 38. A master node (900, 1000) in a wireless communication network, the master node comprising:
processing circuitry (903, 1003); and
memory (905, 1005) coupled to the processing circuitry and having instructions stored therein that are executable by the processing circuitry to cause the master node to perform operations comprising:
determining (2200) to configure conditional PSCell addition or change, CPAC;
transmitting (2202) a request to a secondary node, SN, to prepare a conditional SN addition;
receiving (2204) from the SN a response to the conditional SN addition request confirming that a user equipment, UE, may be accepted unless a canceling message is later received;
transmitting (2206) a radio resource control, RRC, message to the UE containing CPAC configurations for one or multiple candidate target cells, wherein the RRC message contains at least one condition which the UE should monitor and message to be applied when the at least one condition is fulfilled, and wherein the message to be applied includes a SN configuration;
receiving (2206) a RRC reconfiguration complete message from a target SN and responsively reconfiguring the MN to a new configuration based on the receipt of the RRC reconfiguration complete message.

Embodiment 39. The master node of Embodiment 38, the operations further comprising the operations of Embodiment 14.

Embodiment 40. A master node (900, 1000) in a wireless communication network, the master node adapted to perform operations comprising:
determining (2200) to configure conditional PSCell addition or change, CPAC;
transmitting (2202) a request to a secondary node, SN, to prepare a conditional SN addition;
receiving (2204) from the SN a response to the conditional SN addition request confirming that a user equipment, UE, may be accepted unless a canceling message is later received;
transmitting (2206) a radio resource control, RRC, message to the UE containing CPAC configurations for one or multiple candidate target cells, wherein the RRC message contains at least one condition which the UE should monitor and message to be applied when the at least one condition is fulfilled, and wherein the message to be applied includes a SN configuration;
receiving (2206) a RRC reconfiguration complete message from a target SN and responsively reconfiguring the MN to a new configuration based on the receipt of the RRC reconfiguration complete message.

Embodiment 41. The master node of Embodiment 40, wherein the master node is further adapted to perform the operations of Embodiment 14.

Embodiment 42. A computer program product comprising a non-transitory storage medium including program code to be executed by processing circuitry (903, 1003) of a master node (900, 1000) operating in a wireless communication network, whereby execution of the program code causes the UE to perform operations, the operations comprising:
determining (2200) to configure conditional PSCell addition or change, CPAC;
transmitting (2202) a request to a secondary node, SN, to prepare a conditional SN addition;
receiving (2204) from the SN a response to the conditional SN addition request confirming that a user equipment, UE, may be accepted unless a canceling message is later received;
transmitting (2206) a radio resource control, RRC, message to the UE containing CPAC configurations for one or multiple candidate target cells, wherein the RRC message contains at least one condition which the UE should monitor and message to be applied when the at least one condition is fulfilled, and wherein the message to be applied includes a SN configuration;

receiving (2206) a RRC reconfiguration complete message from a target SN and responsively reconfiguring the MN to a new configuration based on the receipt of the RRC reconfiguration complete message.

Embodiment 43. The computer program of Embodiment 42, the operations further comprising the operations of Embodiment 14.

Embodiment 44. A user equipment, UE, (800) in a wireless communication network, the UE comprising:
- processing circuitry (803); and
- memory (805) coupled to the processing circuitry and having instructions stored therein that are executable by the processing circuitry to cause the UE to perform operations comprising:
  - receiving (2300) a radio resource control, RRC, message from a master node, MN, containing conditional PSCell addition or change, CPAC, configurations for one or multiple candidate target cells, wherein the RRC message contains at least one condition which the UE should monitor and message to be applied when the at least one condition is fulfilled, and wherein the message to be applied includes a SN configuration; and
  - transmitting (2302) a RRC reconfiguration complete message to a target secondary node, SN, based on the at least one condition being fulfilled.

Embodiment 45. A user equipment, UE, (800) in a wireless communication network, the UE adapted to perform operations comprising:
- receiving (2300) a radio resource control, RRC, message from a master node, MN, containing conditional PSCell addition or change, CPAC, configurations for one or multiple candidate target cells, wherein the RRC message contains at least one condition which the UE should monitor and message to be applied when the at least one condition is fulfilled, and wherein the message to be applied includes a SN configuration; and
- transmitting (2302) a RRC reconfiguration complete message to a target secondary node, SN, based on the at least one condition being fulfilled.

Embodiment 46. A computer program product comprising a non-transitory storage medium including program code to be executed by processing circuitry (803) of a user equipment, UE, (800) operating in a wireless communication network, whereby execution of the program code causes the UE to perform operations, the operations comprising:
- receiving (2300) a radio resource control, RRC, message from a master node, MN, containing conditional PSCell addition or change, CPAC, configurations for one or multiple candidate target cells, wherein the RRC message contains at least one condition which the UE should monitor and message to be applied when the at least one condition is fulfilled, and wherein the message to be applied includes a SN configuration; and
- transmitting (2302) a RRC reconfiguration complete message to a target secondary node, SN, based on the at least one condition being fulfilled.

Embodiment 47. A master node (900, 1000) in a wireless communication network, the master node comprising:
- processing circuitry (903, 1003); and
- memory (905, 1005) coupled to the processing circuitry and having instructions stored therein that are executable by the processing circuitry to cause the master node to perform operations comprising:
  - determining (2400) to configure conditional PSCell addition or change, CPAC;
  - transmitting (2402) a request to a secondary node, SN, to prepare a conditional SN addition;
  - receiving (2404) from the SN a response to the conditional SN addition request confirming that a user equipment, UE, may be accepted unless a canceling message is later received;
  - transmitting (2406) a radio resource control, RRC, message to the UE containing CPAC configurations for one or multiple candidate target cells, wherein the RRC message contains at least one condition which the UE should monitor and message to be applied when the at least one condition is fulfilled, and wherein the message to be applied includes a SN configuration; and
  - receiving (2408) a RRC reconfiguration complete message from the UE on an old configuration and responsively reconfiguring the MN to a new configuration based on the receipt of the RRC reconfiguration complete message.

Embodiment 48. The master node of Embodiment 47, the operations further comprising the operations of Embodiment 17.

Embodiment 49. A master node (900, 1000) in a wireless communication network, the master node adapted to perform operations comprising:
- determining (2400) to configure conditional PSCell addition or change, CPAC;
- transmitting (2402) a request to a secondary node, SN, to prepare a conditional SN addition;
- receiving (2404) from the SN a response to the conditional SN addition request confirming that a user equipment, UE, may be accepted unless a canceling message is later received;
- transmitting (2406) a radio resource control, RRC, message to the UE containing CPAC configurations for one or multiple candidate target cells, wherein the RRC message contains at least one condition which the UE should monitor and message to be applied when the at least one condition is fulfilled, and wherein the message to be applied includes a SN configuration; and
- receiving (2408) a RRC reconfiguration complete message from the UE on an old configuration and responsively reconfiguring the MN to a new configuration based on the receipt of the RRC reconfiguration complete message.

Embodiment 50. The master node of Embodiment 49, wherein the master node is further adapted to perform the operations of Embodiment 17.

Embodiment 51. A computer program product comprising a non-transitory storage medium including program code to be executed by processing circuitry (903, 1003) of a master node (900, 1000) operating in a wireless communication network, whereby execution of the program code causes the UE to perform operations, the operations comprising:
- determining (2400) to configure conditional PSCell addition or change, CPAC;
- transmitting (2402) a request to a secondary node, SN, to prepare a conditional SN addition;
- receiving (2404) from the SN a response to the conditional SN addition request confirming that a user equipment, UE, may be accepted unless a canceling message is later received;
- transmitting (2406) a radio resource control, RRC, message to the UE containing CPAC configurations for one or multiple candidate target cells, wherein the RRC message contains at least one condition which the UE should monitor and message to be applied when the at least one condition is fulfilled, and wherein the message to be applied includes a SN configuration; and receiving (2408) a RRC reconfiguration complete message from the UE on an old configuration and responsively reconfiguring the MN to a new configuration based on the receipt of the RRC reconfiguration complete message.

Embodiment 52. The computer program of Embodiment 51, the operations further comprising the operations of Embodiment 17.

Embodiment 53. A user equipment, UE, (800) in a wireless communication network, the UE comprising:
processing circuitry (803); and
memory (805) coupled to the processing circuitry and having instructions stored therein that are executable by the processing circuitry to cause the UE to perform operations comprising:
receiving (2500) a radio resource control, RRC, message from the network containing conditional PSCell addition or change, CPAC, configurations for one or multiple candidate target cells, wherein the RRC message contains at least one condition which the UE should monitor and message to be applied when the at least one condition is fulfilled, and wherein the message to be applied includes a SN configuration; and
transmitting (2502) a RRC reconfiguration complete message to the network using an old configuration and then reconfiguring to a new configuration.

Embodiment 54. The UE of Embodiment 53, wherein the operations further comprise the operations of Embodiment 19.

Embodiment 55. A user equipment, UE, (800) in a wireless communication network, the UE adapted to perform operations comprising:
receiving (2500) a radio resource control, RRC, message from the network containing conditional PSCell addition or change, CPAC, configurations for one or multiple candidate target cells, wherein the RRC message contains at least one condition which the UE should monitor and message to be applied when the at least one condition is fulfilled, and wherein the message to be applied includes a SN configuration; and
transmitting (2502) a RRC reconfiguration complete message to the network using an old configuration and then reconfiguring to a new configuration.

Embodiment 56. The UE of Embodiment 55, wherein the UE is further adapted to perform any of the operations of Embodiment 19.

Embodiment 57. A computer program product comprising a non-transitory storage medium including program code to be executed by processing circuitry (803) of a user equipment, UE, (800) operating in a wireless communication network, whereby execution of the program code causes the UE to perform operations, the operations comprising:
receiving (2500) a radio resource control, RRC, message from the network containing conditional PSCell addition or change, CPAC, configurations for one or multiple candidate target cells, wherein the RRC message contains at least one condition which the UE should monitor and message to be applied when the at least one condition is fulfilled, and wherein the message to be applied includes a SN configuration; and
transmitting (2502) a RRC reconfiguration complete message to the network using an old configuration and then reconfiguring to a new configuration.

Embodiment 58. The computer program product of Embodiment 57, the operations further comprising any of the operations of Embodiment 19.

Various of the following abbreviations are used herein:

Abbreviation Explanation 3G 3rd Generation
3GPP 3rd Generation Partnership Project
5GC 5G Core
5GCN 5G Core Network
AMF Access and Mobility Management Function
AR Augmented Reality
AT Attention
BAP Backhaul Adaptation Protocol
CHO Conditional Handover
CN Core Network
CP Control Plane
CU Central Unit
DAPS Dual Active Protocol Stacks
DC Dual Connectivity
DN Data Network
DRX Discontinuous Reception
DU Distributed Unit
eNB E-UTRAN NodeB/Evolved NodeB
EN-DC E-UTRA-NR Dual Connectivity
E-UTRA Evolved UTRA
E-UTRAN Evolved UTRAN
FFS For Further Study
FR Frequency Range
gNB Radio base station in NR.
GPRS General Packet Radio Service
GTP GPRS Tunneling Protocol
ID Identifier/Identity
IE Information Element
IMS IP Multimedia Subsystem
IP Internet Protocol
I-UPF Intermediate UPF
LTE Long Term Evolution
LBT Listen Before Talk
MCE Measurement Collector Entity
MCG Master Cell Group
MME Mobility Management Entity
MN Master Node
MR-DC Multi-Radio Dual Connectivity
MTSI Multimedia Telephony Service for IMS
NAI Network Assistance Information
NE-DC NR-E-UTRA Dual Connectivity
NF Network Function
NG Next Generation
NGEN-DC NG-RAN E-UTRA-NR Dual Connectivity
NG-RAN NG Radio Access Network
NR New Radio
NR-DC NR-NR Dual Connectivity
O&M Operation and Maintenance
OAM Operation and Maintenance
PDCCH Physical Downlink Control Channel
PDCP Packet Data Convergence Protocol
PDU Protocol Data Unit
PLMN Public Land Mobile Network
QoE Quality of Experience
QoS Quality of Service
RAN Radio Access Network
RAT Radio Access Technology
RRC Radio Resource Control
S1 The interface between two eNBs in LTE.
S1AP S1 Application Protocol SCG Secondary Cell Group
SN Secondary Node
SRB Signaling Radio Bearer
SRVCC Single Radio Voice Call Continuity
TCE Trace Collector Entity
TSG Technical Specification Group
UE User Equipment
UMTS Universal Mobile Telecommunication System
UP User Plane
URLLC Ultra-Reliable Low-Latency Communication
UTRA Universal Terrestrial Radio Access
UTRAN Universal Terrestrial Radio Access Network
VoLTE Voice over LTE
VR Virtual Reality Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 26:
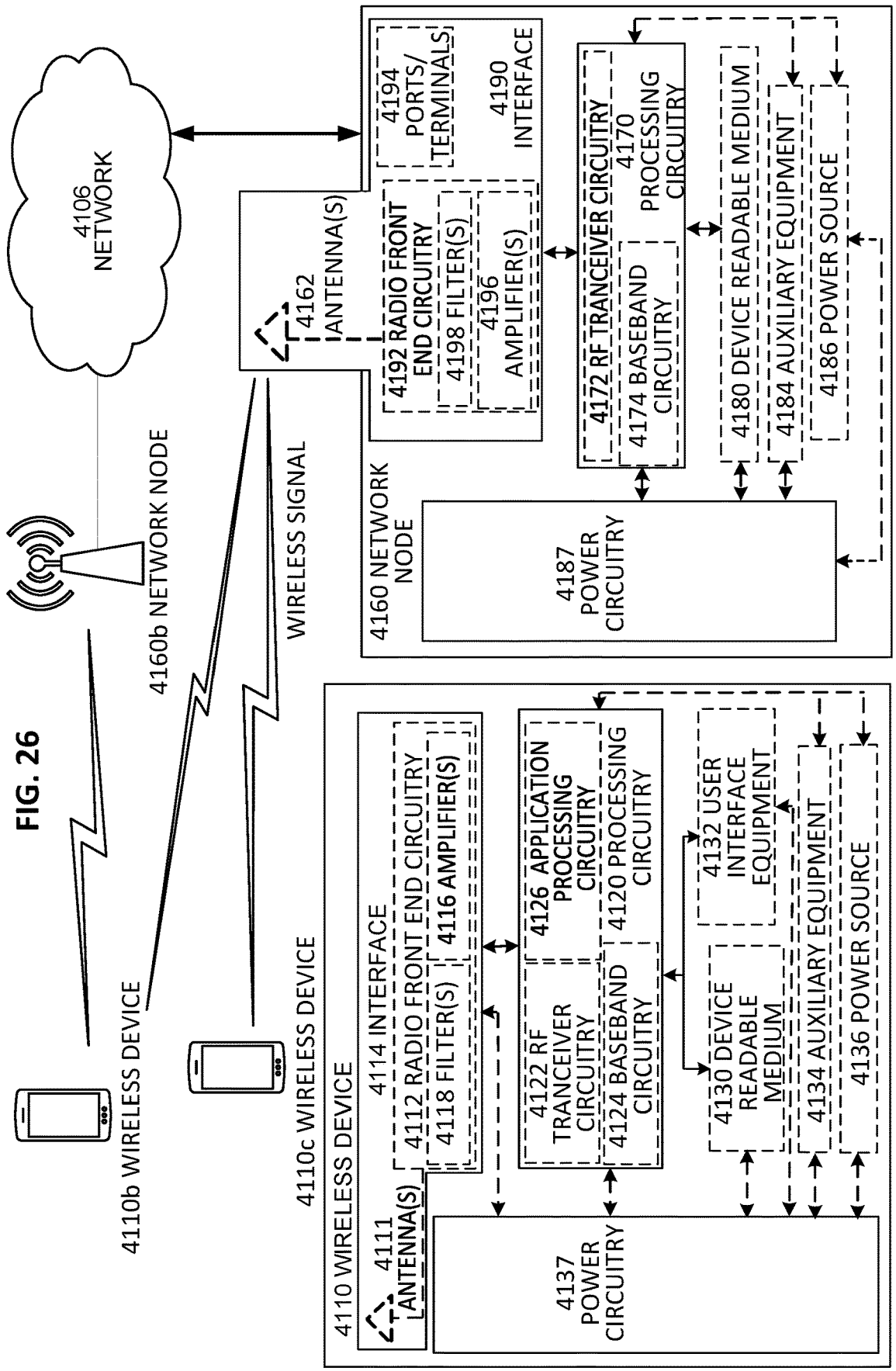
FIG. 26 is a block diagram of a wireless network in accordance with some embodiments.

FIG. 26 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 26. For simplicity, the wireless network of FIG. 26 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 26, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 26 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 26 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 27:
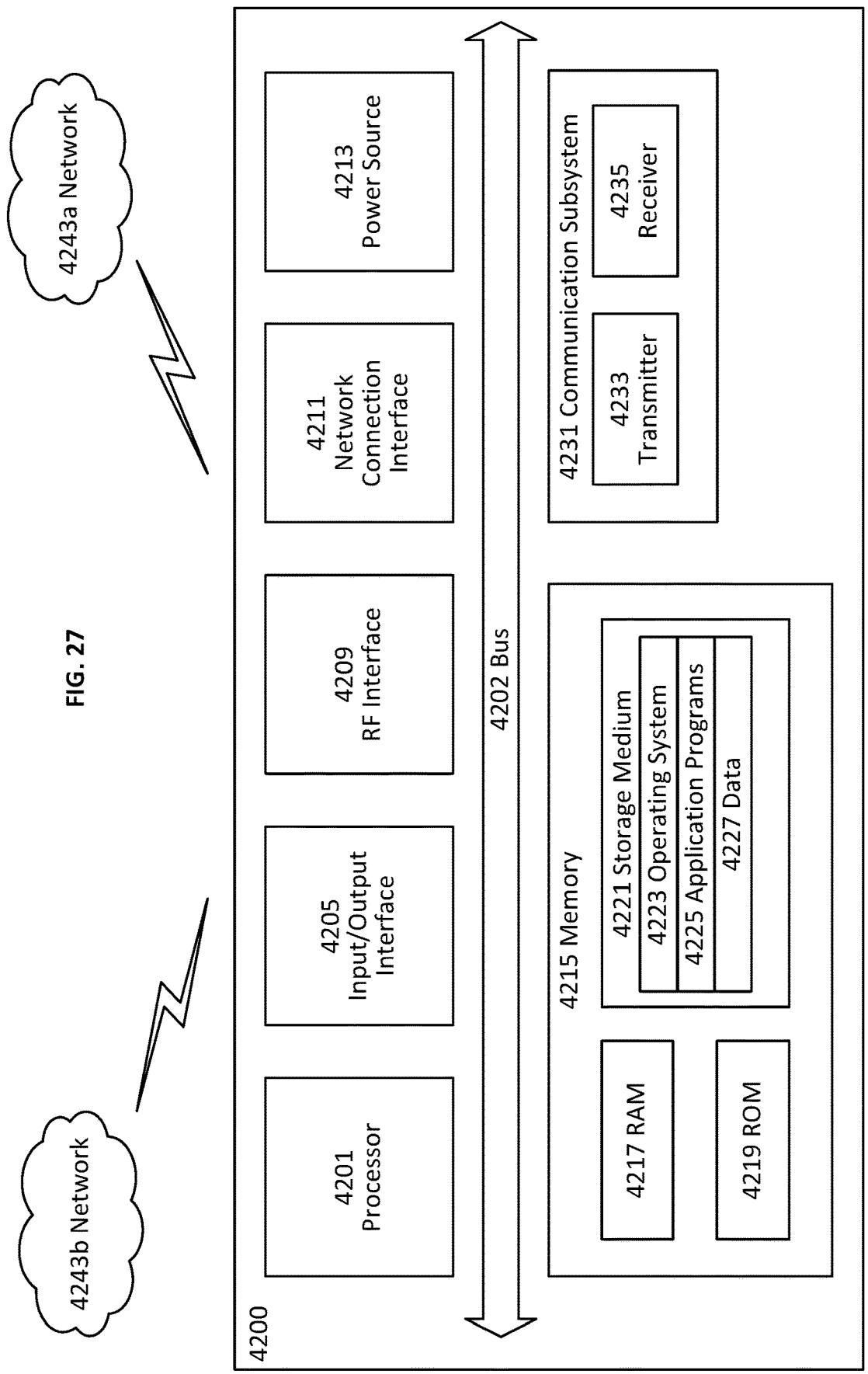
FIG. 27 is a block diagram of a user equipment in accordance with some embodiments.

FIG. 27 illustrates a user Equipment in accordance with some embodiments.

FIG. 27 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 27, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 27 is a UE, the components discussed herein are equally applicable to a WD, and vice-versa.

In FIG. 27, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 27, or only a subset of the components. The level of integration between the components may vary from one UE to another UE. Further, certain UEs may contain multiple instances of a component, such as multiple processors, memories, transceivers, transmitters, receivers, etc.

In FIG. 27, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 27, RF interface 4209 may be configured to provide a communication interface to RF components such as a transmitter, a receiver, and an antenna. Network connection interface 4211 may be configured to provide a communication interface to network 4243a. Network 4243a may encompass wired and/or wireless networks such as a local-area network (LAN), a wide-area network (WAN), a computer network, a wireless network, a telecommunications network, another like network or any combination thereof. For example, network 4243a may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 27, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243b may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 28:
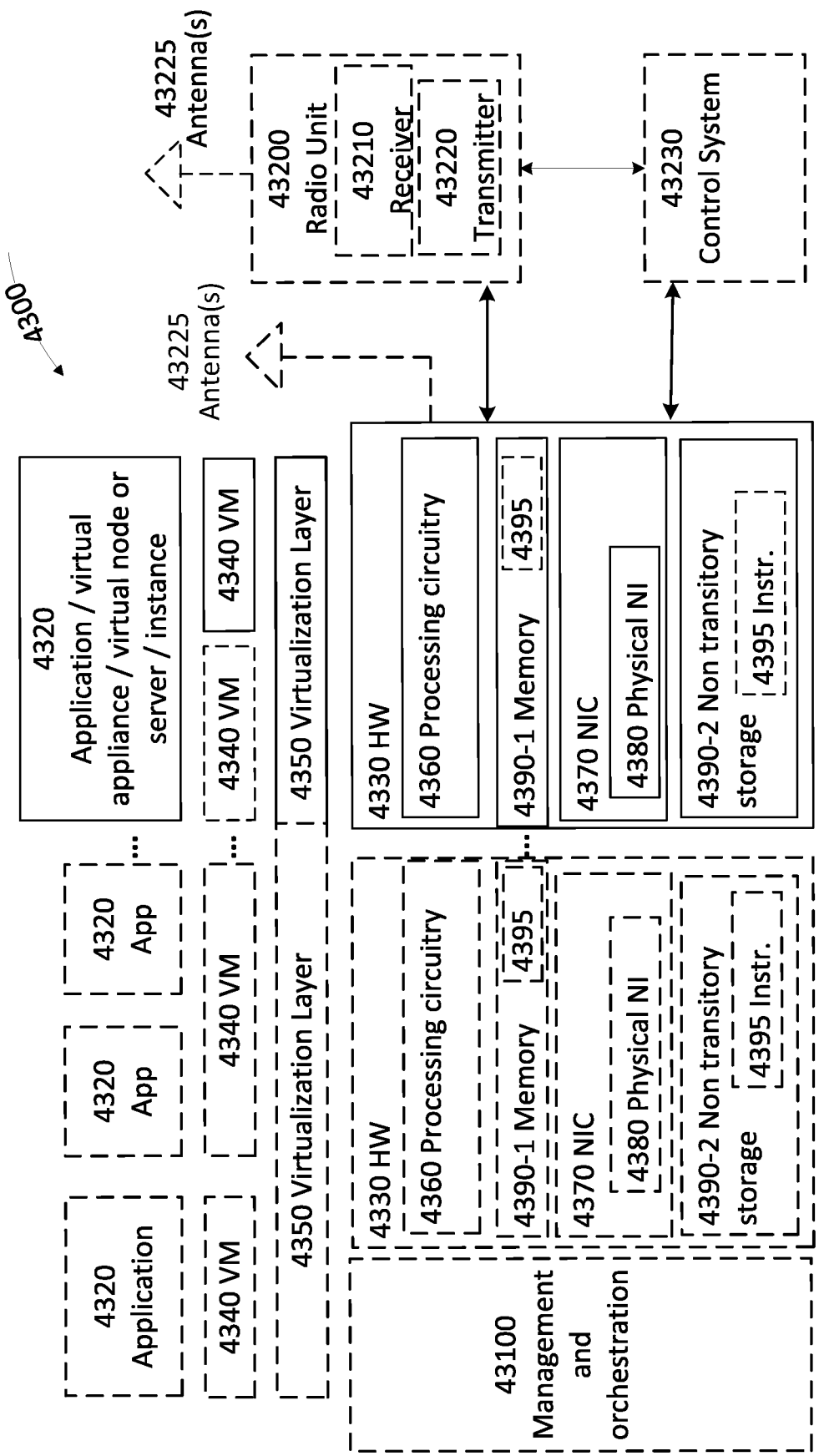
FIG. 28 is a block diagram of a virtualization environment in accordance with some embodiments.

FIG. 28 illustrates a virtualization environment in accordance with some embodiments.

FIG. 28 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 28, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 28.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 29:
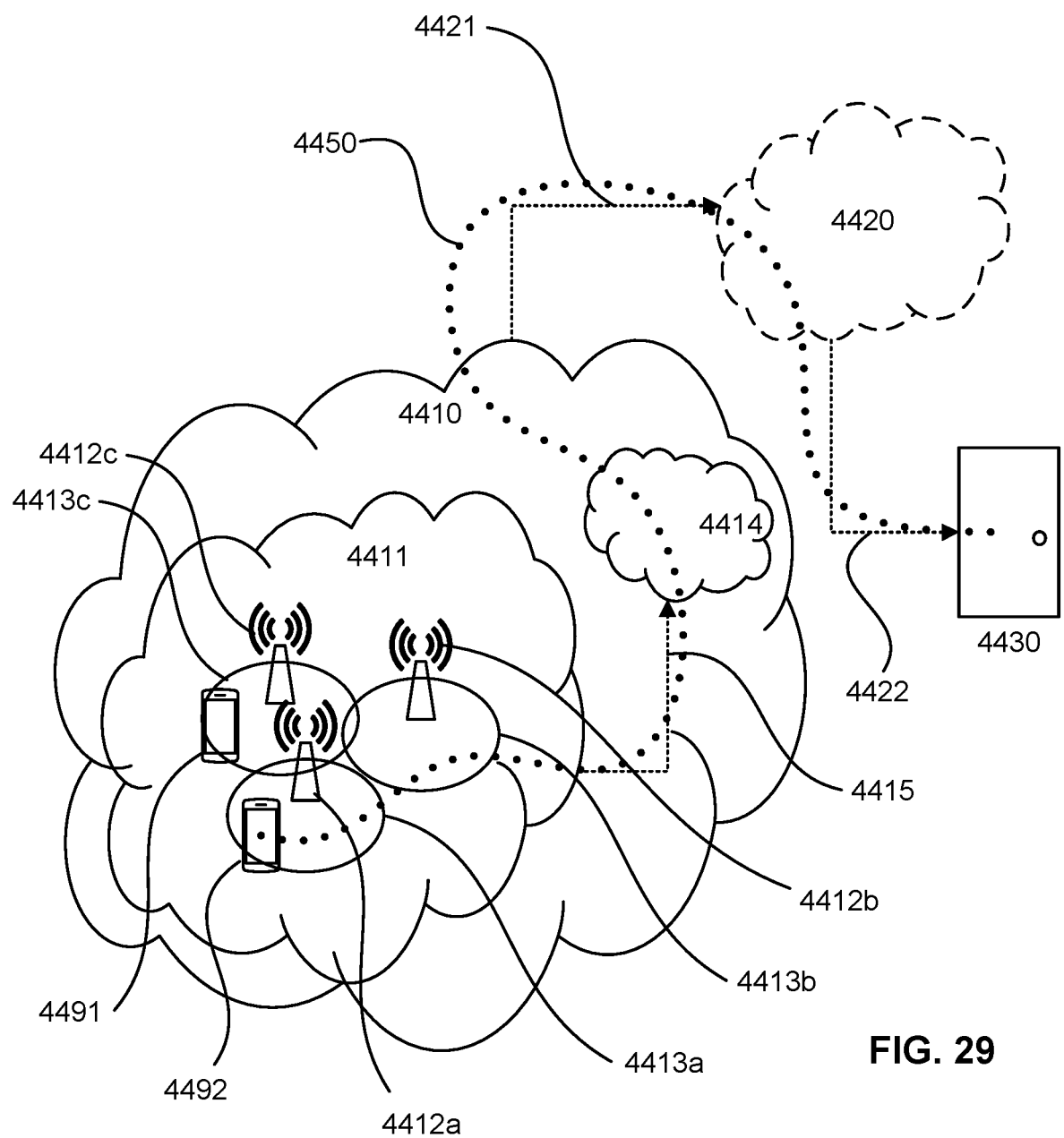
FIG. 29 is a block diagram of a telecommunication network connected via an intermediate network to a host computer in accordance with some embodiments.

FIG. 29 illustrates a telecommunication network connected via an intermediate network to a host computer in accordance with some embodiments.

With reference to FIG. 29, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 29 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 30:
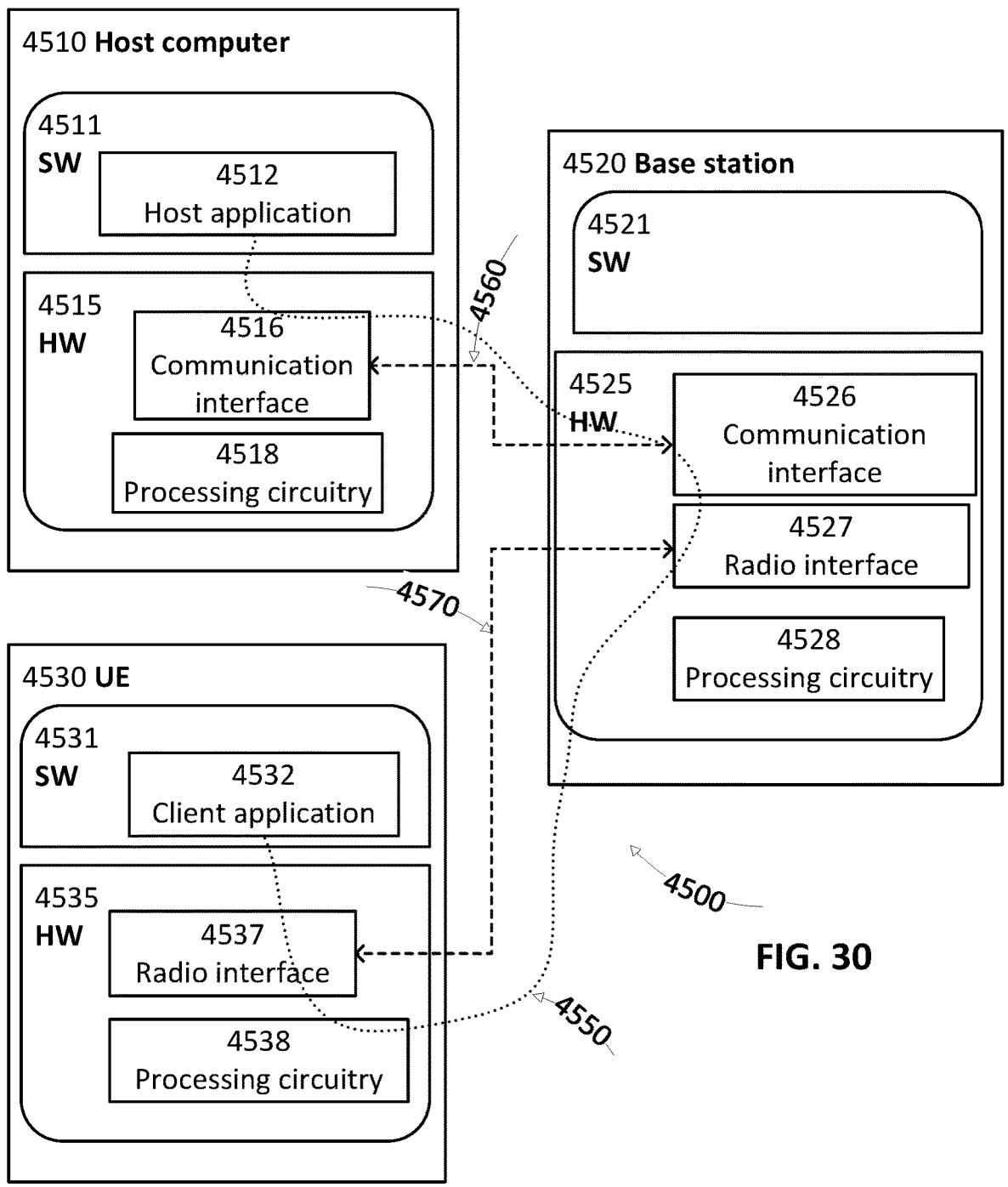
FIG. 30 is a block diagram of a host computer communicating via a base station with a user equipment over a partially wireless connection in accordance with some embodiments.

FIG. 30 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 30. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 30) served by base station 4520. Communication interface 4526 may be configured to facilitate connection 4560 to host computer 4510. Connection 4560 may be direct or it may pass through a core network (not shown in FIG. 30) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 30 may be similar or identical to host computer 4430, one of base stations 4412a, 4412b, 4412c and one of UEs 4491, 4492 of FIG. 29, respectively. This is to say, the inner workings of these entities may be as shown in FIG. 30 and independently, the surrounding network topology may be that of FIG. 29.

In FIG. 30, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figures 31, 32:
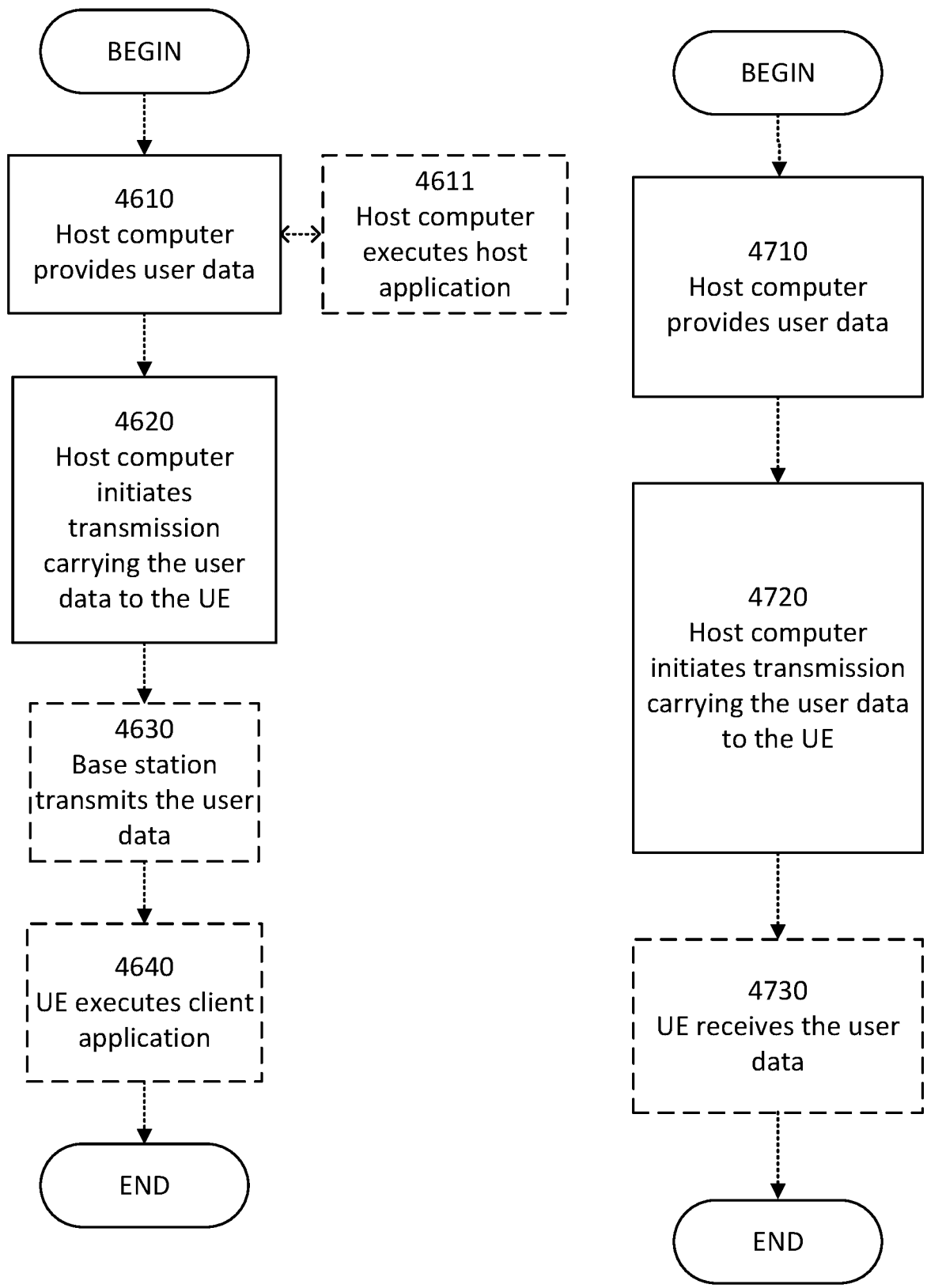
FIG. 31 is a block diagram of methods implemented in a communication system including a host computer, a base station and a user equipment in accordance with some embodiments.
FIG. 32 is a block diagram of methods implemented in a communication system including a host computer, a base station and a user equipment in accordance with some embodiments.

FIG. 31 illustrates methods implemented in a communication system including a host computer, a base station and a user equipment in accordance with some embodiments FIG. 31 is a flowchart illustrating a method implemented in a communication system, in accordance with one embodiment. The communication system includes a host computer, a base station and a UE which may be those described with reference to FIGS. 29-30. For simplicity of the present disclosure, only drawing references to FIG. 31 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

FIG. 32 illustrates methods implemented in a communication system including a host computer, a base station and a user equipment in accordance with some embodiments.

FIG. 32 is a flowchart illustrating a method implemented in a communication system, in accordance with one embodiment. The communication system includes a host computer, a base station and a UE which may be those described with reference to FIGS. 29-30. For simplicity of the present disclosure, only drawing references to FIG. 32 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 33:
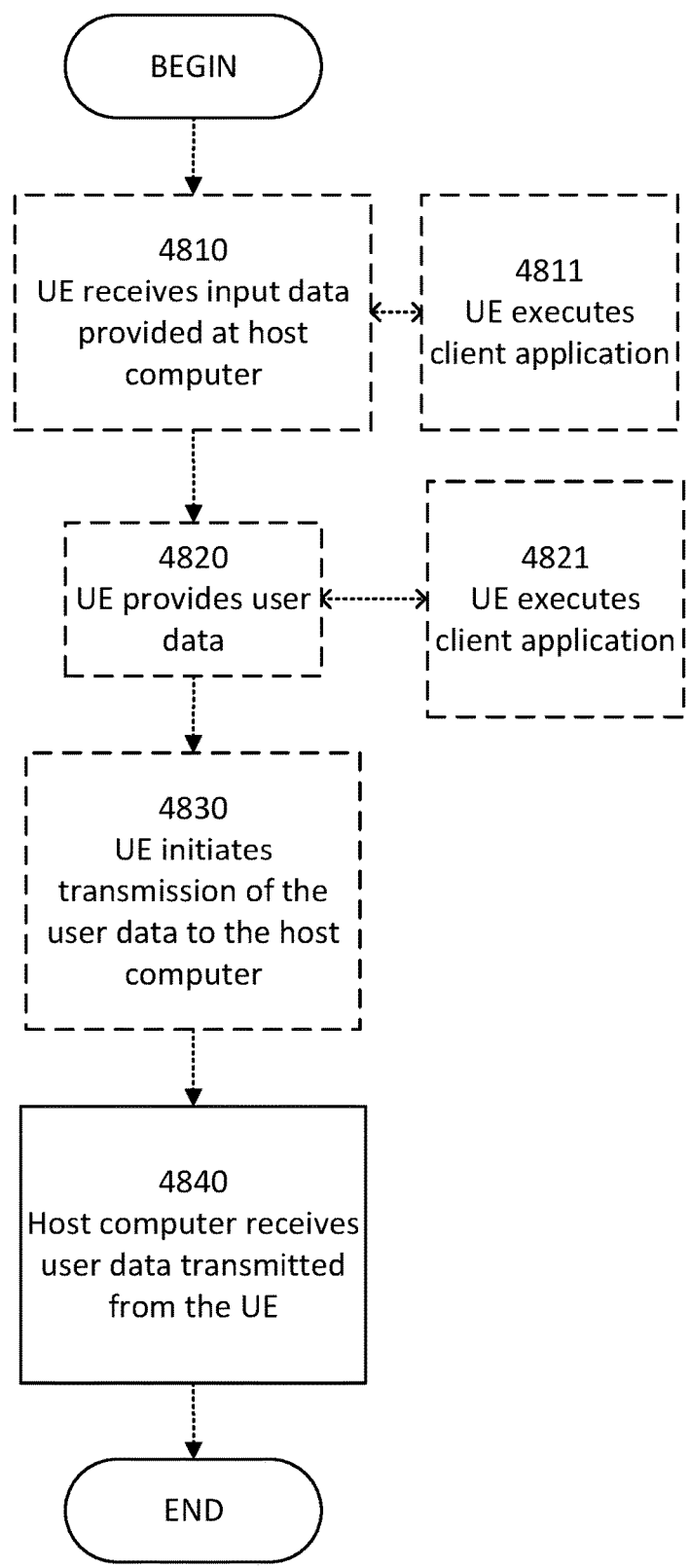
FIG. 33 is a block diagram of methods implemented in a communication system including a host computer, a base station and a user equipment in accordance with some embodiments.

FIG. 33 illustrates methods implemented in a communication system including a host computer, a base station and a user equipment in accordance with some embodiments FIG. 33 is a flowchart illustrating a method implemented in a communication system, in accordance with one embodiment. The communication system includes a host computer, a base station and a UE which may be those described with reference to FIGS. 29-30. For simplicity of the present disclosure, only drawing references to FIG. 33 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 34:
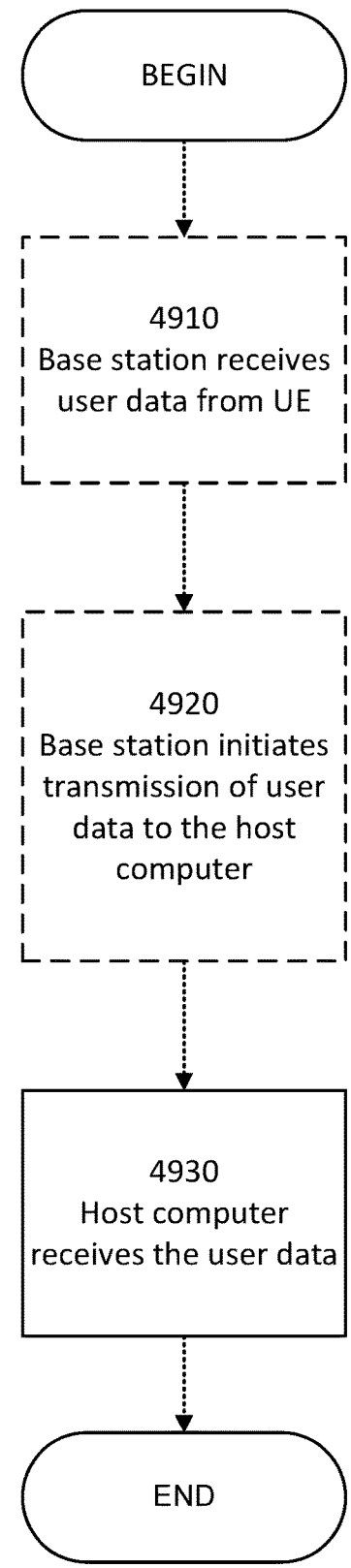
FIG. 34 is a block diagram of methods implemented in a communication system including a host computer, a base station and a user equipment in accordance with some embodiments.

FIG. 34 illustrates methods implemented in a communication system including a host computer, a base station and a user equipment in accordance with some embodiments FIG. 34 is a flowchart illustrating a method implemented in a communication system, in accordance with one embodiment. The communication system includes a host computer, a base station and a UE which may be those described with reference to FIGS. 29-30. For simplicity of the present disclosure, only drawing references to FIG. 34 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a master node, MN, in a wireless communication network, the method comprising:
   determining to configure conditional PSCell addition or change, CPAC;
   transmitting a request to a secondary node, SN, to prepare a conditional SN addition;
   receiving from the SN a response to the conditional SN addition request confirming that a user equipment, UE, may be accepted unless a canceling message is later received;
   transmitting a radio resource control, RRC, message to the UE containing CPAC configurations for one or multiple candidate target cells, wherein the RRC message contains at least one condition which the UE should monitor and message to be applied when the at least one condition is fulfilled;
   monitoring multiple MN or master cell group, MCG, related configurations for reception of messages from the UE;
   receiving a message from the UE on one of the multiple MN or MCG related configurations that have been monitored; and
   detecting which one of the multiple MN or MCG related configurations the UE has applied and responsively reconfiguring the MN based on the detected one of the multiple MN or MCG related configurations.

2. The method of claim 1, further comprising:
   receiving an indication from the UE indicating which one of the multiple MN or MCG related configurations the UE has applied, and
   wherein the detecting of which one of the multiple MN or MCG related configurations the UE has applied is performed based on the indication from the UE.

3. The method of claim 2, wherein the indication from the UE identifies a conditional reconfiguration ID or a target cell.

4. The method of claim 1, wherein one of the multiple MN or MCG related configurations monitored by the MN corresponds to a configuration according to a latest RRCReconfiguration the MN is aware the UE has applied, and another one of the multiple MN or MCG related configurations monitored by the MN corresponds to a configuration that the UE will apply when an execution condition is fulfilled and RRCReconfiguration is applied.

5. The method of claim 4, wherein the other one of the multiple MN or MCG related configurations monitored by the MN corresponds to a second MN or MCG related configuration.

6. The method of claim 1, wherein:
   the RRC message to be applied is a reconfiguration of the current MN or MCG configuration and the SN configuration, and possible MN reconfigurations are restricted so that the MN can understand messages from the UE received both on an old and new configuration.

7. A method of operating a user equipment, UE, in a wireless communication network, the method comprising:
   receiving a radio resource control, RRC, message from a master node, MN, containing conditional PSCell addition or change, CPAC, configurations for one or multiple candidate target cells, wherein the RRC message contains at least one condition which the UE should monitor and message to be applied when the at least one condition is fulfilled; and
   transmitting a heads-up indication to the MN on a last applied configuration indicating that the at least one condition has been fulfilled for reconfiguring to a new configuration.

8. The method of claim 7, further comprising:
   receiving from the MN a confirmation that the heads-up message has been received and that the UE may go-ahead with reconfiguring to the new configuration; and
   transmitting a message to the MN confirming that the reconfiguring to the new configuration is completed.

9. The method of claim 7, further comprising:
   performing reconfiguration to the new configuration responsive to expiration of a threshold time since the transmission of the heads-up indication.

10. A master node in a wireless communication network, the master node adapted to perform operations comprising:
    determining to configure conditional PSCell addition or change, CPAC;
    transmitting a request to a secondary node, SN, to prepare a conditional SN addition;
    receiving from the SN a response to the conditional SN addition request confirming that a user equipment, UE, may be accepted unless a canceling message is later received;
    transmitting a radio resource control, RRC, message to the UE containing CPAC configurations for one or multiple candidate target cells, wherein the RRC message contains at least one condition which the UE should monitor and message to be applied when the at least one condition is fulfilled;
    monitoring multiple MN or master cell group, MCG, related configurations for reception of messages from the UE;
    receiving a message from the UE on one of the multiple MN or MCG related configurations that have been monitored; and
    detecting which one of the multiple MN or MCG related configurations the UE has applied and responsively reconfiguring the MN based on the detected one of the multiple MN or MCG related configurations.

11. The master node of claim 10, wherein the master node is further adapted to perform any of the operations of receiving an indication from the UE indicating which one of the multiple MN or MCG related configurations the UE has applied.

12. A computer program product comprising a non-transitory storage medium including program code to be executed by processing circuitry of a master node operating in a wireless communication network, whereby execution of the program code causes the MN to perform operations, the operations comprising:

determining to configure conditional PSCell addition or change, CPAC;

transmitting a request to a secondary node, SN, to prepare a conditional SN addition;

receiving from the SN a response to the conditional SN addition request confirming that a user equipment, UE, may be accepted unless a canceling message is later received;

transmitting a radio resource control, RRC, message to the UE containing CPAC configurations for one or multiple candidate target cells, wherein the RRC message contains at least one condition which the UE should monitor and message to be applied when the at least one condition is fulfilled;

monitoring multiple MN or master cell group, MCG, related configurations for reception of messages from the UE;

receiving a message from the UE on one of the multiple MN or MCG related configurations that have been monitored; and detecting which one of the multiple MN or MCG related configurations the UE has applied and responsively reconfiguring the MN based on the detected one of the multiple MN or MCG related configurations.

13. The computer program product of claim 12, the operations further comprising any of the operations of receiving an indication from the UE indicating which one of the multiple MN or MCG related configurations the UE has applied.

14. The master node of claim 10, wherein the detecting of which one of the multiple MN or MCG related configurations the UE has applied is performed based on the indication from the UE.

15. The master node of claim 14, wherein the indication from the UE identifies a conditional reconfiguration ID or a target cell.

16. The master node of claim 15, wherein one of the multiple MN or MCG related configurations monitored by the MN corresponds to a configuration according to a latest RRCReconfiguration the MN is aware the UE has applied, and another one of the multiple MN or MCG related configurations monitored by the MN corresponds to a configuration that the UE will apply when an execution condition is fulfilled and RRCReconfiguration is applied.

17. The master node of claim 16, wherein the other one of the multiple MN or MCG related configurations monitored by the MN corresponds to a second MN or MCG related configuration.

18. The master node of claim 17, wherein the RRC message to be applied is a reconfiguration of the current MN or MCG configuration and the SN configuration, and possible MN reconfigurations are restricted so that the MN can understand messages from the UE received both on an old and new configuration.

* * * * *